(12) United States Patent
Wittig

(10) Patent No.: US 10,072,743 B1
(45) Date of Patent: Sep. 11, 2018

(54) ROTARY-TO-LINEAR TRANSMISSION SYSTEM

(71) Applicant: Michael Brian Wittig, Santa Clara, CA (US)

(72) Inventor: Michael Brian Wittig, Santa Clara, CA (US)

( * ) Notice: Subject to any disclaimer, the term of this patent is extended or adjusted under 35 U.S.C. 154(b) by 0 days.

(21) Appl. No.: 15/613,146

(22) Filed: Jun. 3, 2017

Related U.S. Application Data

(60) Provisional application No. 62/382,786, filed on Sep. 2, 2016, provisional application No. 62/398,457, filed on Sep. 22, 2016.

(51) Int. Cl.
*F16H 19/06* (2006.01)

(52) U.S. Cl.
CPC ................ *F16H 19/0618* (2013.01)

(58) Field of Classification Search
CPC .............. F16H 19/0618; F16H 19/06
See application file for complete search history.

(56) References Cited

U.S. PATENT DOCUMENTS

| | | | |
|---|---|---|---|
| 2,530,871 A | 11/1950 | Clement |
| 2,859,629 A | 11/1958 | Parker |
| 3,025,647 A | 1/1960 | Moody |
| 3,060,753 A | 10/1962 | Conviser |
| 3,804,370 A | 4/1974 | Woodard |
| 4,351,197 A | 9/1982 | Carson |
| 4,432,437 A | 2/1984 | McClung |
| 4,526,050 A | 7/1985 | Johnson |
| 4,616,444 A | 10/1986 | Taylor |
| 4,787,259 A | 11/1988 | Carson |
| 5,562,556 A | 10/1996 | Carson |
| 5,690,567 A | 11/1997 | DeNijs |
| 5,749,800 A | 5/1998 | Nagel et al. |
| 5,807,377 A | 9/1998 | Madhani et al. |
| 6,234,036 B1 | 5/2001 | Kopko |
| 6,786,896 B1 | 9/2004 | Madhani et al. |
| 6,860,189 B2 | 3/2005 | Perez |
| 7,073,406 B2 | 7/2006 | Garrec |
| 7,628,093 B2 | 12/2009 | Madhani et al. |
| 8,215,241 B2 | 7/2012 | Gameau et al. |
| 8,408,083 B2 | 4/2013 | Nielsen et al. |
| 8,516,913 B2 | 8/2013 | Jones |
| 8,709,000 B2 | 4/2014 | Madhani et al. |
| 8,761,927 B2 | 6/2014 | Johnson et al. |
| 8,986,232 B2 | 3/2015 | Saglia |
| 9,457,168 B2 | 10/2016 | Moll et al. |
| 9,539,948 B1 | 1/2017 | Presley et al. |
| 9,585,641 B2 | 3/2017 | Cooper et al. |

(Continued)

OTHER PUBLICATIONS

Krivoshapko and Ivanov, Encyclopedia of Analytical Surfaces, 2015, 41-42, Springer International Publishing, Cham, Switzerland.

(Continued)

*Primary Examiner* — William J Kelleher
*Assistant Examiner* — Gregory T Prather

(57) ABSTRACT

Rotary-to-linear transmission systems are disclosed comprising a support, at least one pulley coupled to the support, a rotor having an axis of rotation, a carriage, at least one pulley coupled to the carriage, and at least one piece of flexible material coupled to the rotor, wound around the rotor, wrapped around at least one pulley coupled to the carriage, wrapped around at least one pulley coupled to the support, and wound around the rotor again.

7 Claims, 32 Drawing Sheets

(56) References Cited

U.S. PATENT DOCUMENTS

| | | |
|---|---|---|
| 9,597,217 B2 | 3/2017 | Patton et al. |
| 2009/0249904 A1 | 10/2009 | Chen et al. |
| 2010/0024579 A1 | 2/2010 | Grossart |
| 2010/0259057 A1 | 10/2010 | Madhani |
| 2011/0245049 A1 | 10/2011 | Keiser |
| 2011/0306473 A1 | 12/2011 | Saglia et al. |
| 2012/0065467 A1 | 3/2012 | Moll et al. |
| 2012/0143212 A1 | 6/2012 | Madhani et al. |
| 2012/0165157 A1 | 6/2012 | Nishimura |
| 2012/0209174 A1 | 8/2012 | Moll et al. |
| 2013/0231679 A1 | 9/2013 | Wallace et al. |
| 2014/0081292 A1 | 3/2014 | Moll et al. |
| 2014/0107666 A1 | 4/2014 | Madhani et al. |
| 2014/0296875 A1 | 10/2014 | Moll et al. |
| 2015/0157412 A1 | 6/2015 | Wallace et al. |
| 2015/0292670 A1 | 10/2015 | Sweere et al. |
| 2016/0037907 A1 | 2/2016 | Ergun et al. |
| 2016/0100900 A1 | 4/2016 | Madhani et al. |
| 2016/0121156 A1 | 5/2016 | Bach et al. |
| 2016/0157600 A1 | 6/2016 | Sweere et al. |
| 2016/0354058 A1 | 12/2016 | Schlosser et al. |
| 2017/0002905 A1 | 1/2017 | Sessions |
| 2017/0049659 A1 | 2/2017 | Farris et al. |
| 2017/0095236 A1 | 4/2017 | Sharma et al. |
| 2017/0095251 A1 | 4/2017 | Thomson et al. |
| 2017/0122416 A1 | 5/2017 | Hobert |
| 2017/0144016 A1 | 5/2017 | Gordon |
| 2017/0151071 A1 | 6/2017 | Perry et al. |

OTHER PUBLICATIONS

Wikipedia.org, "Centroid" entry, 2017, https://en.wikipedia.org/wiki/Centroid.

Wikipedia.org, "Screw Thread" entry, 2017, https://en.wikipedia.org/wiki/Screw_thread.

Chironis, Nicholas P., Mechanisms & Mechanical Devices Sourcebook, 1991, 220-224, McGraw-Hill Inc., New York.

Gosselin, F. et al. "Development of a New Backdrivable Actuator for Haptic Interfaces and Collaborative Robots." Actuators 2016, vol. 5, No. 7, MDPI, Basil, Switzerland.

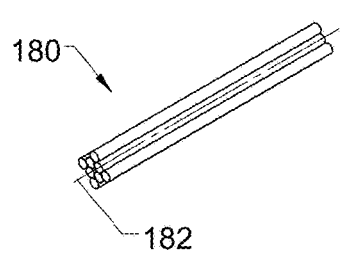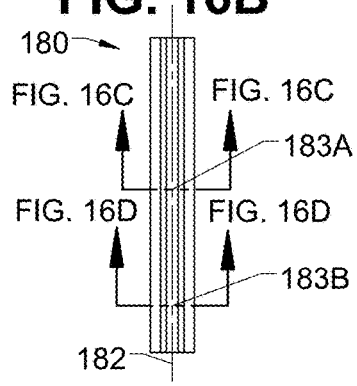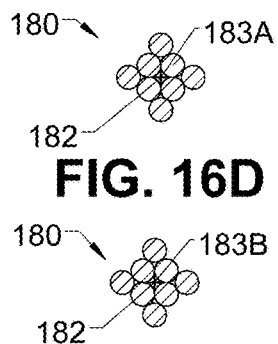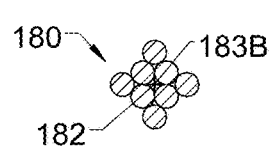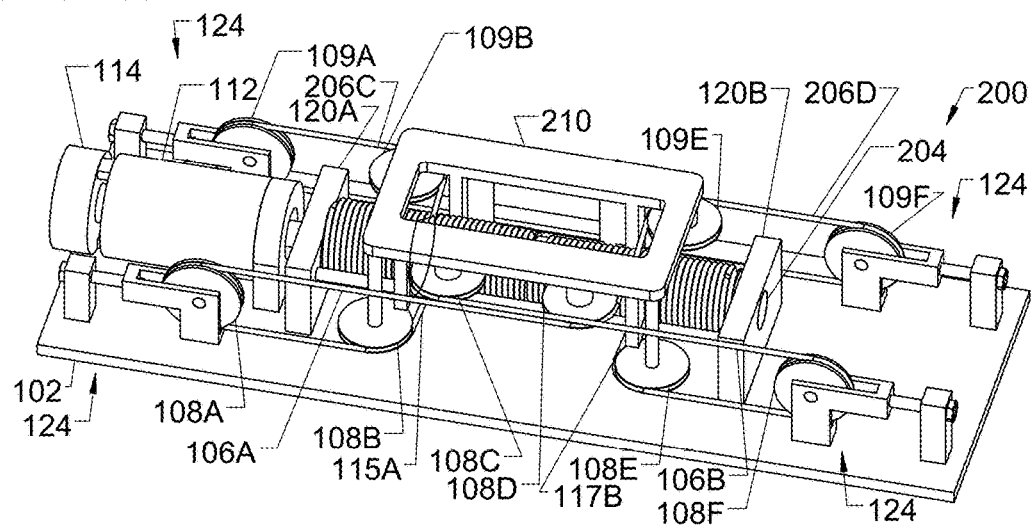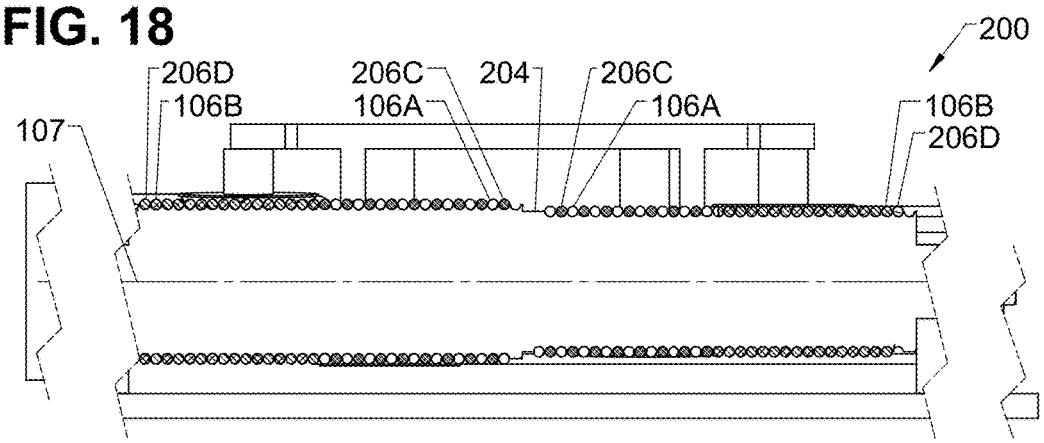

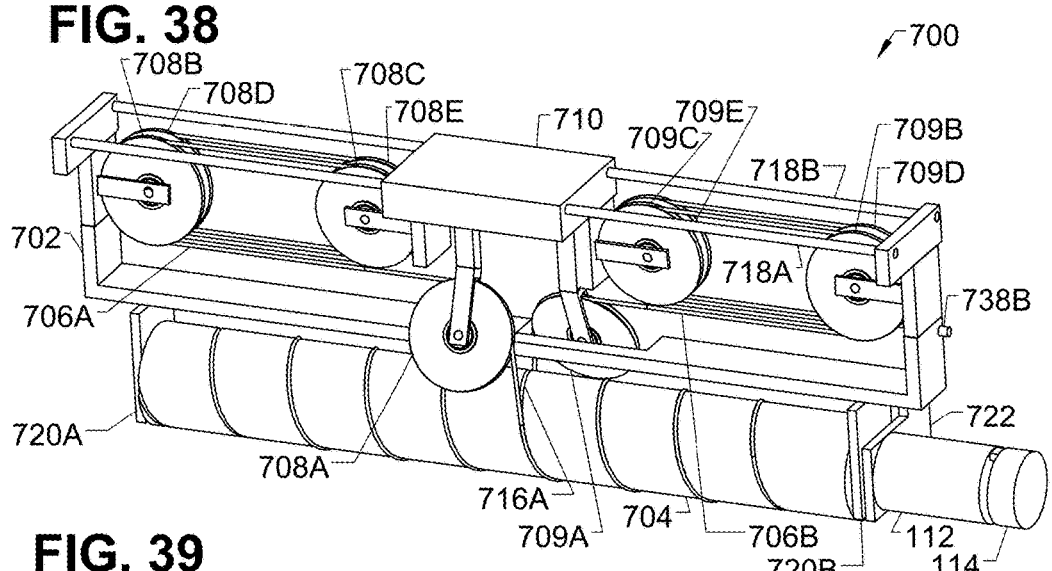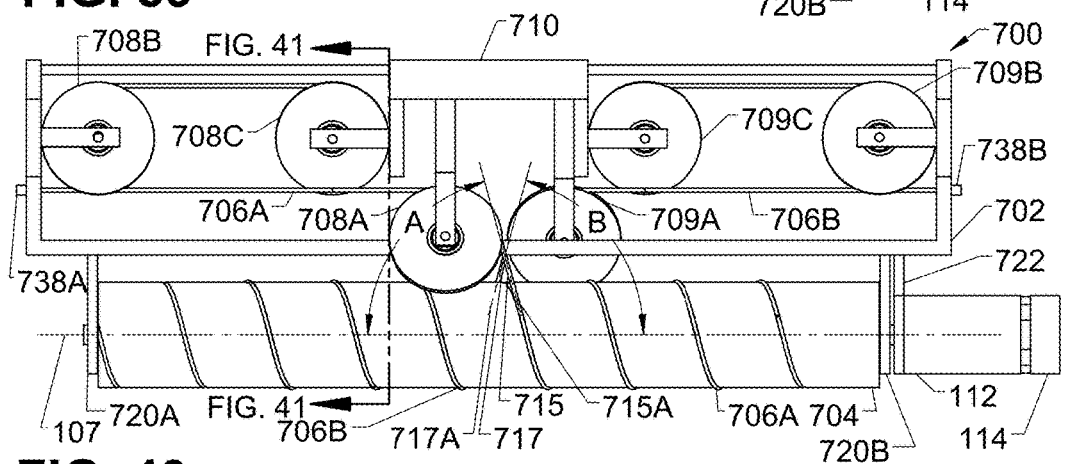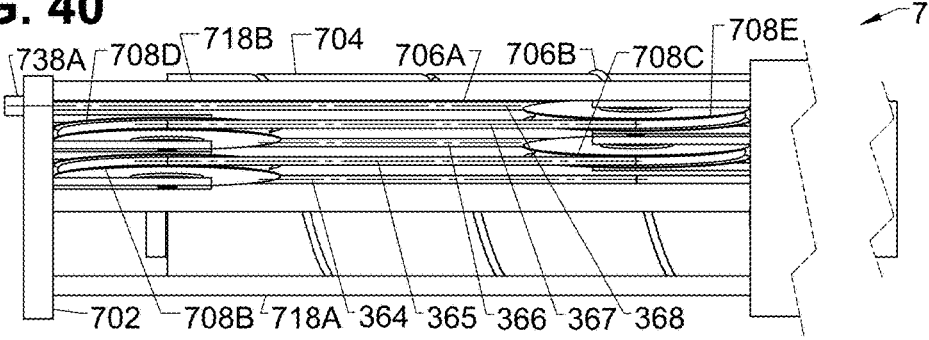

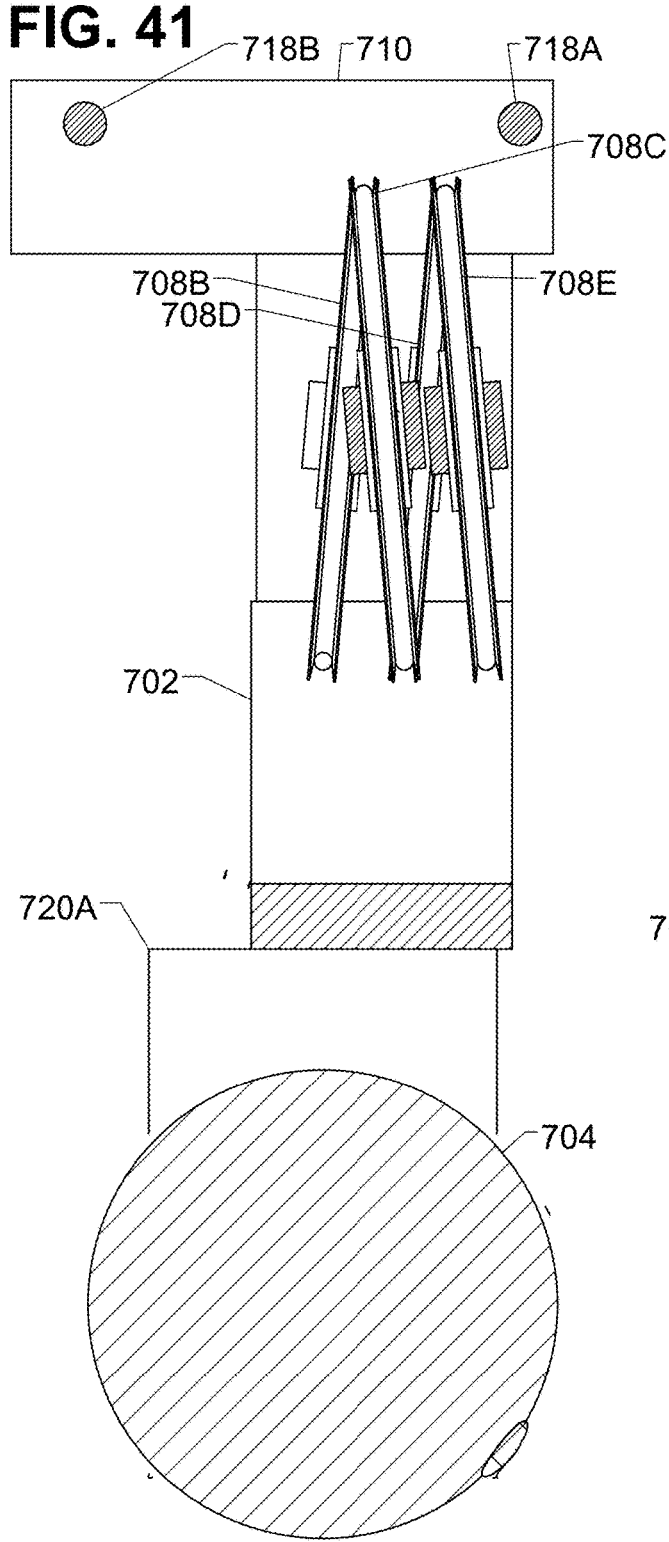
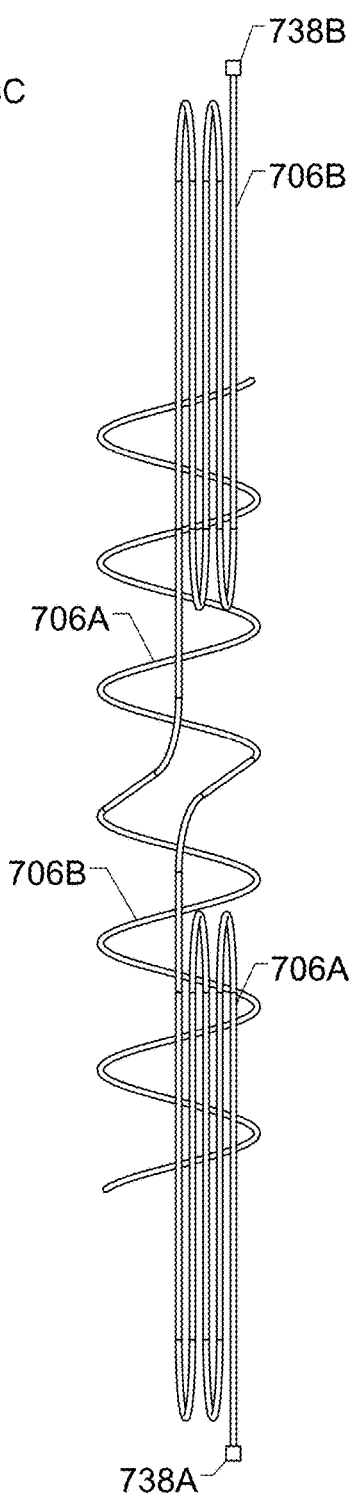

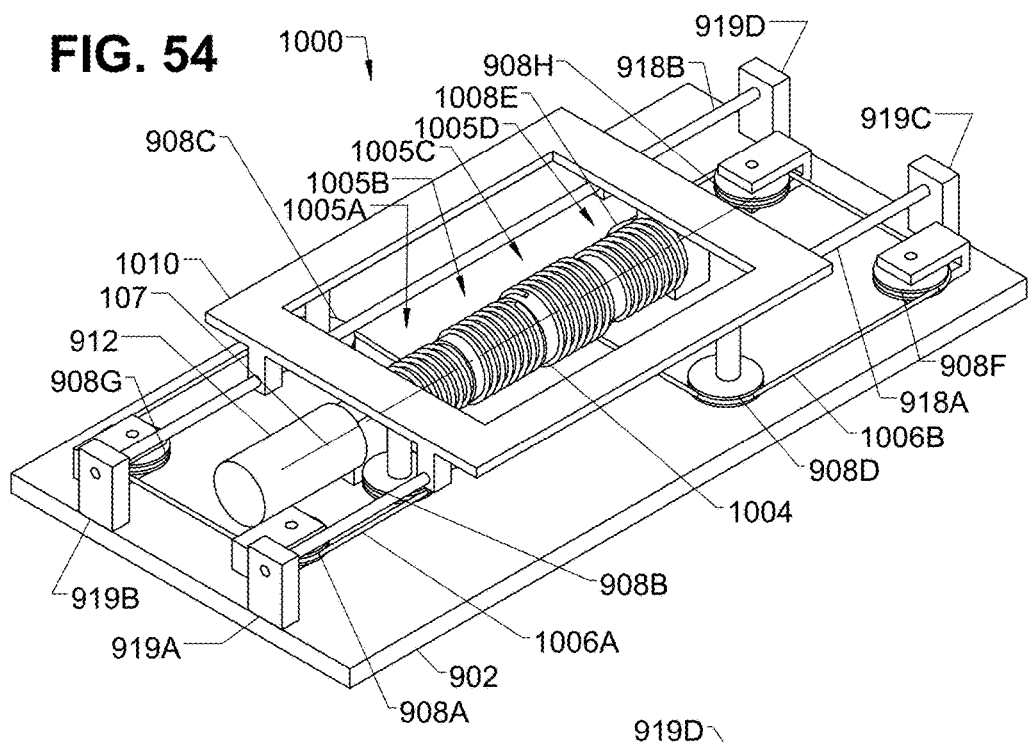

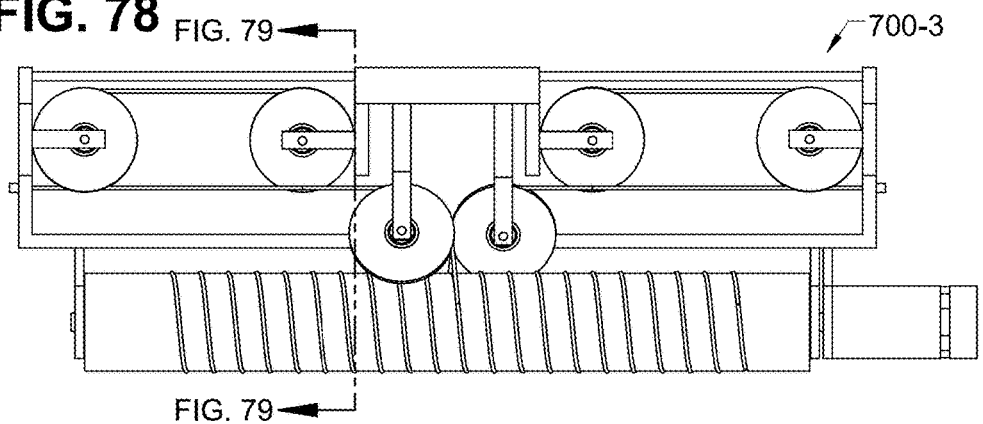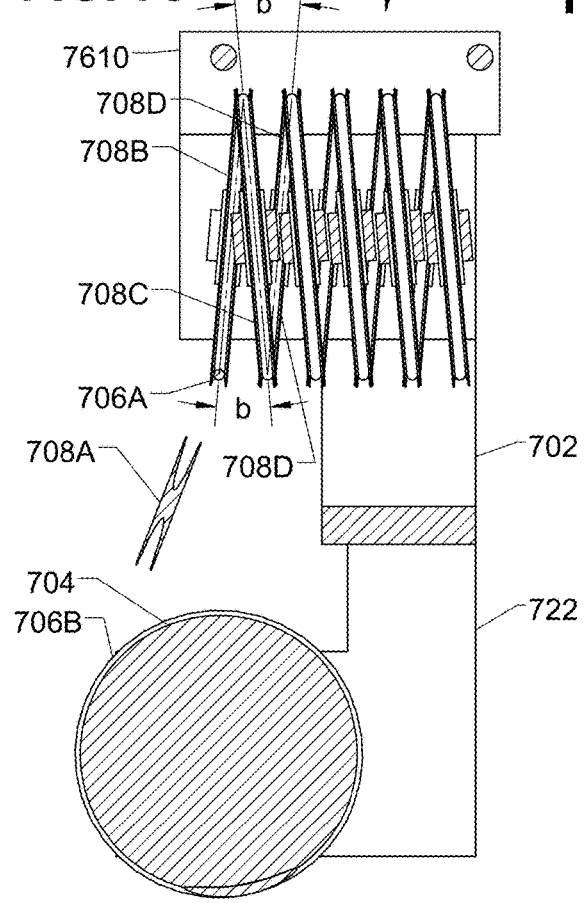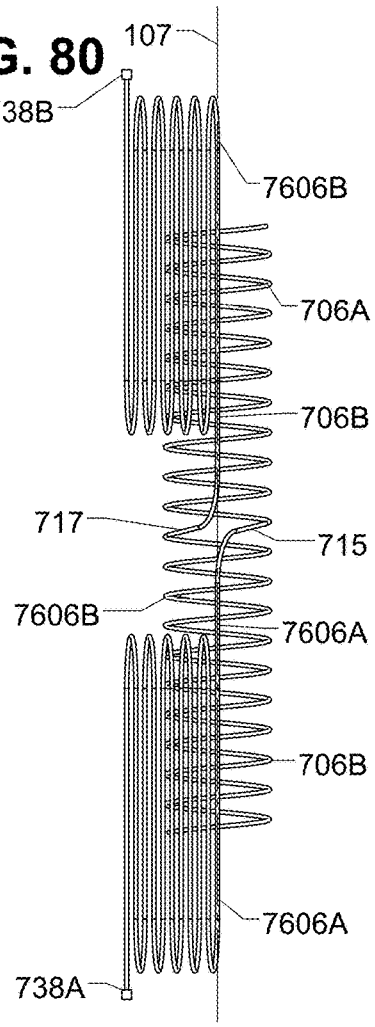

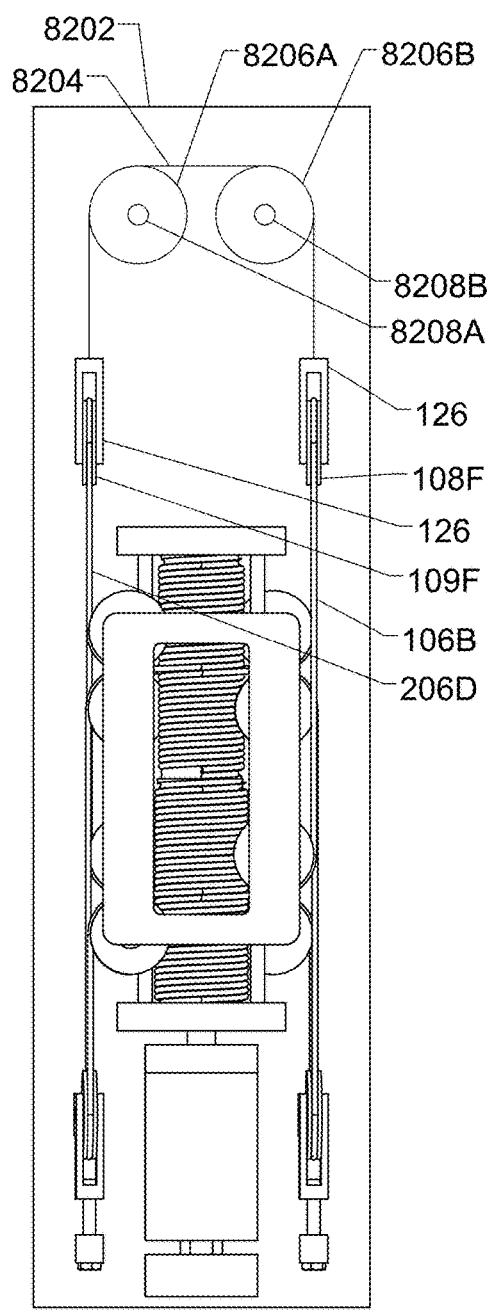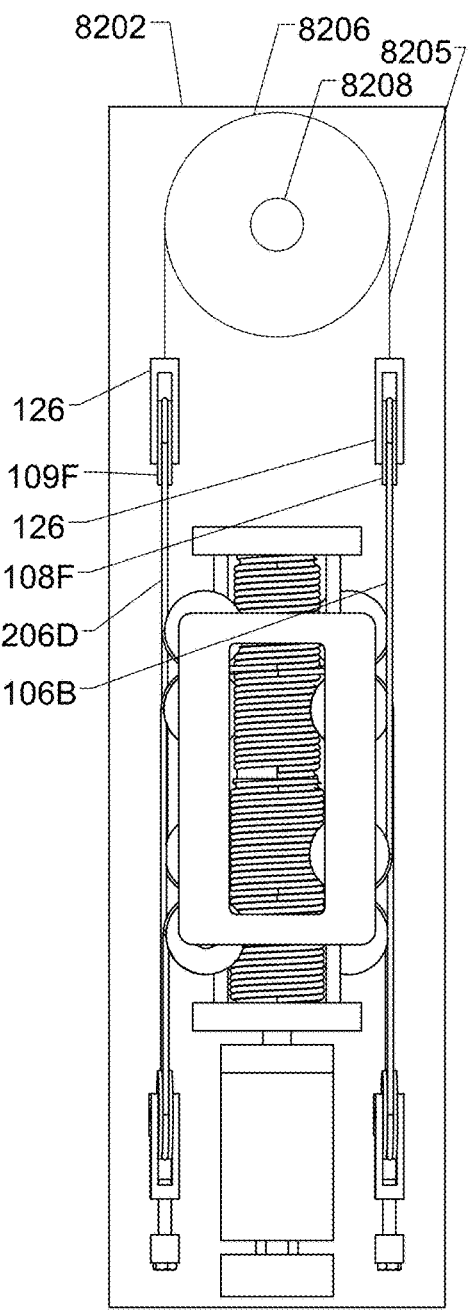

US 10,072,743 B1

ROTARY-TO-LINEAR TRANSMISSION SYSTEM

CROSS-REFERENCE TO RELATED APPLICATIONS

This application claims the benefit of U.S. Provisional Applications No. 62/382,786, filed Sep. 2, 2016, and No. 62/398,457, filed Sep. 22, 2016, the entire disclosures of which are incorporated by reference herein.

BACKGROUND

1. Field

The present application is related to rotary-to-linear transmission systems, more specifically those employing one or more pieces of flexible material, such as a piece of cable or a piece of belt.

2. Description of the Related Art

One type of rotary-to-linear transmission system is a rack and pinion. In this type of system, a pinion gear is rotated while engaged with a rack to drive the rack to move linearly. Such a system typically has significant backlash, causing a momentary disconnect in motion between the rotation of the pinion gear and the linear movement of the rack whenever the direction of rotation is changed. In numerous applications, such as robotics, backlash is undesirable, in part because it makes precise movements difficult to achieve.

A second type of rotary-to-linear transmission system employs a lead screw engaged with a nut. In this type of system, rotation of the nut causes the lead screw to move linearly. Such a system typically has significant friction due to sliding friction between the screw and nut. The friction generates heat, wasting power.

A third type of rotary-to-linear transmission system employs a ball screw. Such a system is similar to a lead screw and nut, but with ball bearings between the screw and nut to significantly reduce friction. Such a system is typically expensive, however, due to the relatively precise construction required.

A fourth type of rotary-to-linear transmission system employs a timing belt coupled to a component constrained to slide. The timing belt is wrapped around a timing pulley. When the timing pulley is rotated, the component moves linearly. Although typically low in friction, such a system typically has a lower load capacity than a comparable gear- or screw-based system.

A fifth type of rotary-to-linear transmission system employs a cable wrapped around a drum and coupled to a component. When the drum is rotated, the component moves. Such a system typically has relatively low mechanical advantage, meaning that it applies a relatively low force on the component for a given torque applied to the drum. Put another way, there is little "built-in" force multiplication in such a system, particularly compared to screw-based transmission systems.

There is a great need for a rotary-to-linear transmission system that may reduce backlash, friction, and cost while providing sufficient load capacity and mechanical advantage.

SUMMARY

In accordance with one aspect of the invention, a transmission system comprises a support, a first pulley coupled to the support, a piece of flexible material, a rotor, a carriage, and second and third pulleys coupled to the carriage. The rotor is coupled to the support such that the rotor can rotate about an axis of rotation relative to the support. The rotor has a first surface for supporting the piece of flexible material at a diameter D about the axis of rotation and a second surface for supporting the piece of flexible material at a diameter d about the axis of rotation. The diameter D differs from the diameter d. The carriage is coupled to the support such that the carriage is constrained to slide parallel to the axis of rotation of the rotor. The piece of flexible material is coupled to the rotor, then wound around the first surface of the rotor, then wrapped around the second pulley, then wrapped around the first pulley, then wrapped around the third pulley, then wound around the second surface of the rotor, then coupled to the rotor. The piece of flexible material can have a first straight portion between the first pulley and the second pulley defining a first axis and a second straight portion between the first pulley and the third pulley defining a second axis, the first and second axes both being parallel to the axis of rotation.

In accordance with another aspect of the invention, a transmission system comprises a support, a first pulley coupled to the support, a piece of flexible material, a rotor, a carriage, and second and third pulleys coupled to the carriage. The rotor is coupled to the support such that the rotor can rotate about an axis of rotation relative to the support. The rotor has a first surface for supporting the piece of flexible material at a diameter D about the axis of rotation and a second surface for supporting the piece of flexible material at a diameter d about the axis of rotation, the diameter D differing from the diameter d. The first surface for supporting the piece of flexible material at diameter D about the axis of rotation is intertwined with the second surface for supporting the piece of flexible material at diameter d about the axis of rotation so as to form a double helix. The carriage is coupled to the support such that the carriage is constrained to slide parallel to the axis of rotation relative to the support. The piece of flexible material is coupled to the rotor, then wound around the first surface of the rotor, then wrapped around the second pulley, then wrapped around the first pulley, then wrapped around the third pulley, then wound around the second surface of the rotor, then coupled to the rotor.

In accordance with another aspect of the invention, a transmission system comprises a support, a first plurality of pulleys coupled to the support, a piece of flexible material, a rotor, a carriage, and a second plurality of pulleys coupled to the carriage. The first plurality of pulleys include a first pulley and a second pulley. The rotor is coupled to the support such that the rotor can rotate about an axis of rotation relative to the support. The rotor has a first surface for supporting the piece of flexible material at a diameter D about the axis of rotation. The carriage is coupled to the support such that the carriage is constrained to slide parallel to the axis of rotation of the rotor. The second plurality of pulleys comprises a third pulley, a fourth pulley, and a fifth pulley. The piece of flexible material is coupled to the rotor, then helically wound around the first surface of the rotor with a lead l, then wrapped around the third pulley, then wrapped around the first pulley, then wrapped around the fourth pulley, then wrapped around the second pulley, then wrapped around the fifth pulley, then coupled to the support.

In accordance with another aspect of the invention, a transmission system comprises a support, a first plurality of pulleys coupled to the support, a piece of flexible material, a rotor, a carriage, and a second plurality of pulleys coupled to the carriage. The first plurality of pulleys comprises a first pulley and a second pulley. The rotor is coupled to the support such that the rotor can rotate about an axis of rotation relative to the support. The rotor has a first surface for supporting the piece of flexible material at a diameter D about the axis of rotation. The carriage is coupled to the support such that the carriage is constrained to slide parallel to the axis of rotation of the rotor. The second plurality of pulleys comprises a third pulley and a fourth pulley. The piece of flexible material is coupled to the rotor, then helically wound around the first surface of the rotor with a lead l, then wrapped around the third pulley, then wrapped around the first pulley, then wrapped around the fourth pulley, then wrapped around the second pulley, then coupled to the carriage.

These and other aspects of the invention will be detailed below.

BRIEF DESCRIPTION OF THE DRAWINGS

FIGS. 16A, 16B, 16C, and 16D are perspective, top, and two cross-sectional views respectively of a fifth exemplary piece of flexible material, a cable comprised of smaller cables.

FIG. 17 is a perspective view of transmission system 200.

FIG. 18 is a cross-sectional view of transmission system 200.

FIG. 38 is a perspective view of transmission system 700.

FIG. 39 is a side view of transmission system 700.

FIG. 40 is a side view of transmission system 700 showing the plane and direction of the cross-section of FIG. 36.

FIG. 41 is a cross-section of transmission system 700 showing the set of pulleys for piece of flexible material 706A.

FIG. 42 is a top view of pieces of flexible material 706A and 706B.

FIG. 54 is a perspective view of transmission system 1000.

FIG. 55 is a perspective view of transmission system 1000 with carriage 1010 and associated components hidden.

FIG. 78 is a side view of transmission system 700-3 showing the plane and direction of the cross-section of FIG. 79.

FIG. 79 is a cross-section of transmission system 700-3 showing the set of pulleys for piece of flexible material 706A.

FIG. 80 is a top view of transmission system 700-3 showing pieces of flexible material 706A and 706B.

FIG. 82 illustrates a schematic top view of an alternative embodiment of transmission system 200.

FIG. 83 illustrates a schematic top view of an alternative embodiment of transmission system 200 differing from that of FIG. 82.

DETAILED DESCRIPTION

Several exemplary transmission systems will be described having numerous advantages over existing transmission systems. Some may have less backlash than rack and pinion transmissions. Some may have less friction than transmissions using lead screws. Some may be less expensive than ball screw transmissions. Some may have a higher load capacity than timing belt transmissions. Some may provide greater mechanical advantage than conventional cable transmissions. Each exemplary transmission uses at least one piece of flexible material, such as a cable or belt, to carry the load borne by the transmission.

Figure 1:
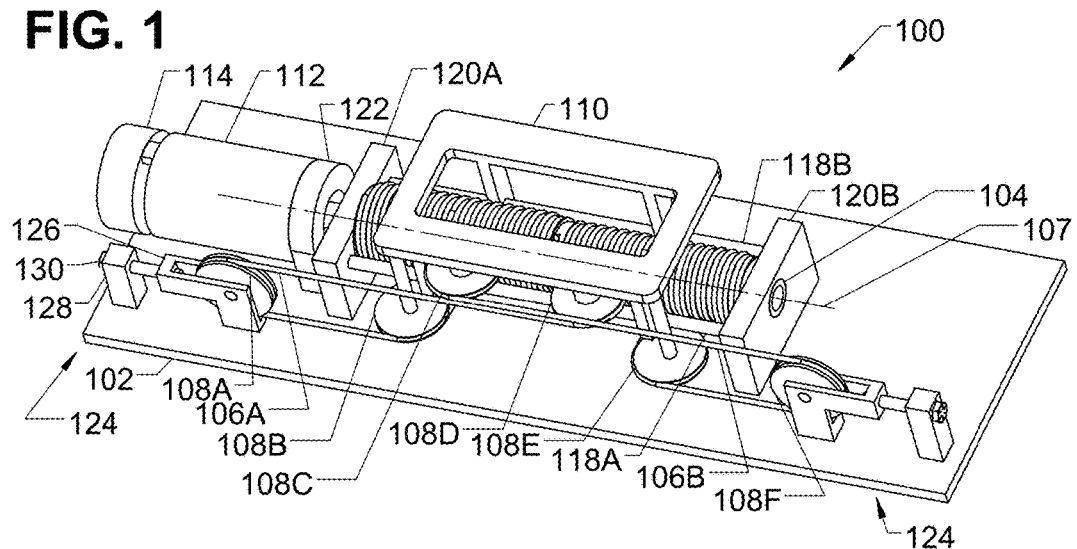
FIG. 1 is a perspective view of transmission system 100.
Figure 2:
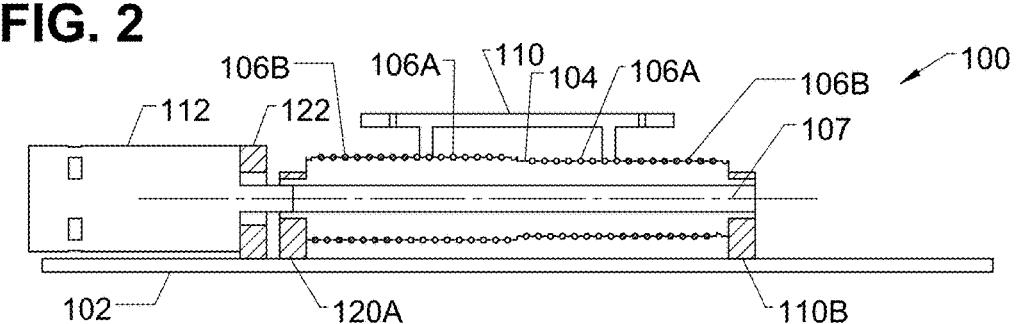
FIG. 2 is a cross-sectional side view of transmission system 100.
Figure 3:
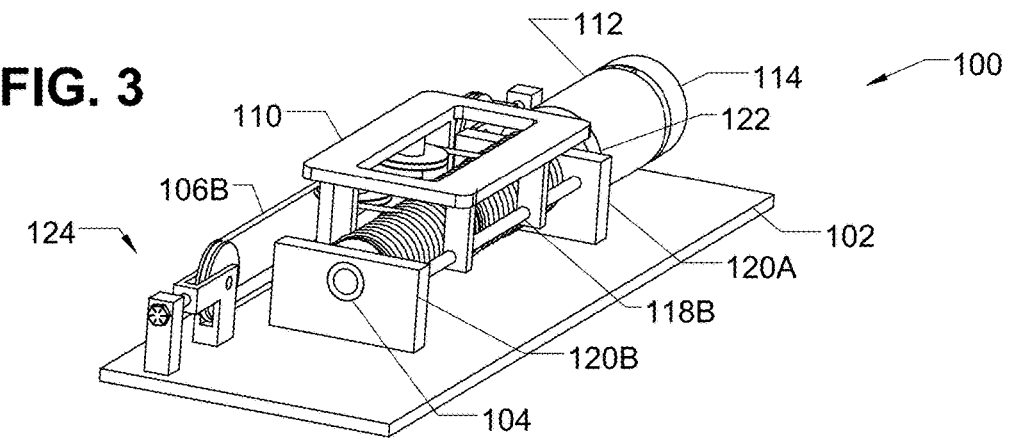
FIG. 3 is a perspective view of transmission system 100 taken from a different angle than the perspective view of FIG. 1.

FIGS. 1-11 illustrate a first exemplary transmission system 100. As shown in FIGS. 1-3, transmission system 100 comprises a support 102, a pulley 108A coupled to support 102, a piece of flexible material 106A (in this particular embodiment, a cable 106A), a rotor 104, a carriage 110, and pulleys 108B and 108D coupled to the carriage. Rotor 104 is coupled to support 102 via blocks 120A and 120B such that rotor 104 can rotate about an axis of rotation 107 relative to support 102.

Figure 4:
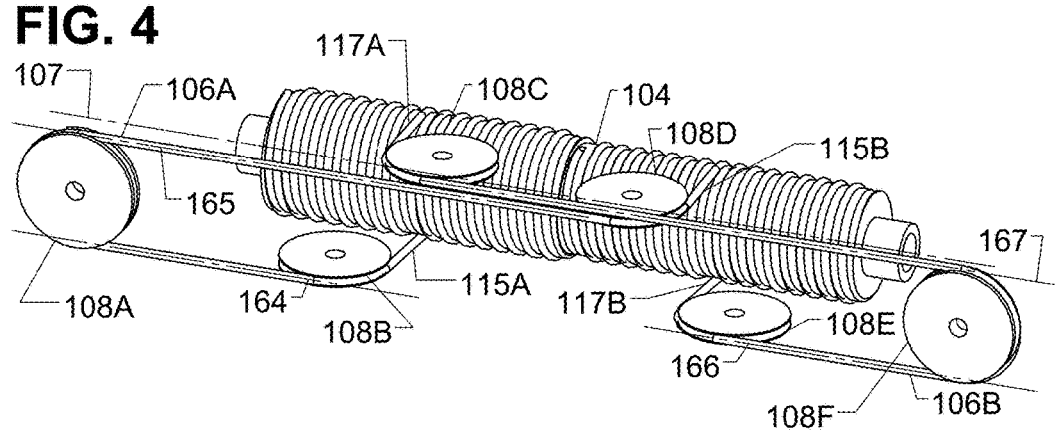
FIG. 4 is a perspective view showing how pieces of flexible material 106A and 106B are routed in transmission system 100.
Figure 5:
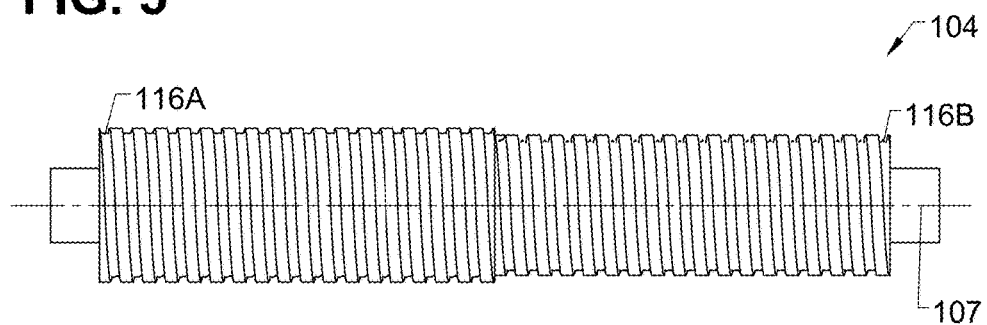
FIG. 5 is a side view of rotor 104 of transmission system 100.
Figure 6:
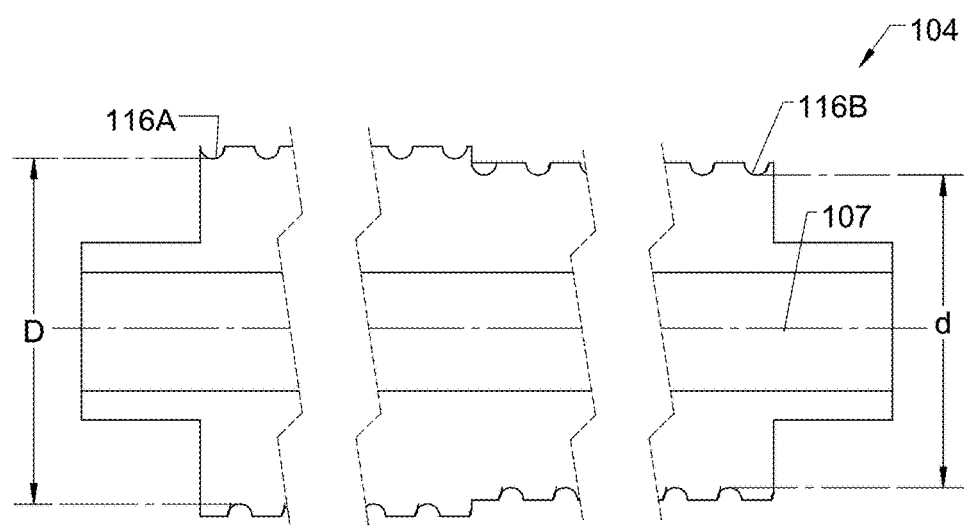
FIG. 6 is a schematic cross-sectional view of rotor 104 of transmission system 100 (with two breaks in the view to save space).

As shown in FIGS. 4, 5, and particularly 6, rotor 104 has a surface 116A for supporting cables 106A and 106B at a diameter D about axis of rotation 107 and a surface 116B for supporting cable 106A and 106B at a diameter d about axis of rotation 107. Diameter D differs from diameter d, with D being larger than d in transmission system 100. In FIG. 5, rotor 104 has a first right-handed helical groove on the left and a second right-handed helical groove on the right. Surface 116A is the concave surface of the first groove and surface 116B is the concave surface of the second groove. In other embodiments, both helical grooves may be instead left-handed. In other embodiments, one helical groove may be right-handed while the other is left-handed. In still further embodiments, only one groove can be used, with a cylindrical surface replacing the second groove for supporting a piece of flexible material. In yet other embodiments, two cylindrical surfaces may be used to support a piece of flexible material, with no grooves at all. As shown in FIG. 6, rotor 104 is hollow, with a passage or cavity running entirely along its length and formed so as to be axisymmetric about axis 107. In alternative embodiments, the rotor may be partially hollow instead.

Referring to FIG. 1, carriage 110 is coupled to support 102 such that carriage 110 is constrained with a linear guide to slide parallel to axis of rotation 107 of rotor 104. As shown in FIG. 3, in transmission 100, the linear guide in transmission 100 comprises holes in carriage 110 that ride on shafts 118A and 118B running parallel to axis of rotation 107. Other embodiments may use a different form of linear guide, such as a dovetail guide, a ball slide, or V-guide wheels on an edged track, for example.

Figure 7:
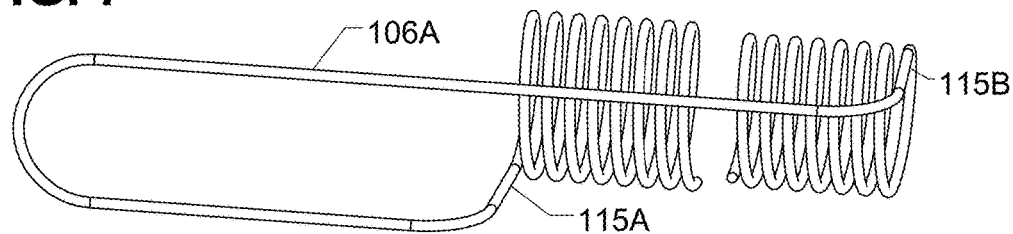
FIG. 7 is a perspective view of piece of flexible material 106A showing its installed shape in transmission system 100.
Figure 8:
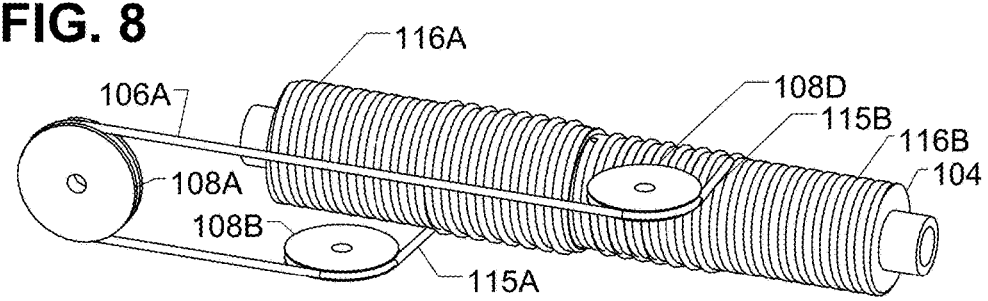
FIG. 8 is a perspective view of rotor 104, piece of flexible material 106A, and pulleys 108A, 108B, and 108D.

As shown in FIGS. 7 and 8, cable 106A is coupled to rotor 104, then wound clockwise (when viewing rotor 104 along axis 107 from the right in FIGS. 7-8) around first surface 116A of rotor 104, then wrapped around pulley 108B, then wrapped around the pulley 108A, then wrapped around the pulley 108D, then wound clockwise (when viewing rotor 104 along axis 107 from the right in FIGS. 7-8) around second surface 116B of rotor 104, then coupled to rotor 104. Referring back to FIG. 4, cable 106A has a first portion between pulley 108A and pulley 108B defining an axis 164. Cable 106A also has a second portion between pulley 108A and pulley 108D defining an axis 165. Axes 164 and 165 are both parallel to axis of rotation 107, for reasons that will be detailed below.

In transmission system 100, cables 106A and 106B are steel cables, although in other embodiments other pieces of flexible material may be used. The particular material may vary as well. In transmission system 100, coupling of the piece of steel cable 106A to rotor 104 may be accomplished using a cable stop or bead that is crimped or swaged on. In other embodiments, other methods of coupling a piece of flexible material to rotor 104 may be used.

The aforementioned components allow carriage 110 to be forcibly driven in one direction (toward pulley 108A) when rotor 104 is driven. To allow carriage 110 to be forcibly driven in two directions (toward or away from pulley 108A), transmission system 100 further comprises pulleys 108C, 108E, and 108F, and a second piece of flexible material 106B (which is, in this particular embodiment, a cable 106B). The pulley 108F is coupled to support 102 such that carriage 110 is positioned between pulley 108A and pulley 108F. Pulleys 108C and 108E are coupled to carriage 110.

Figure 9:
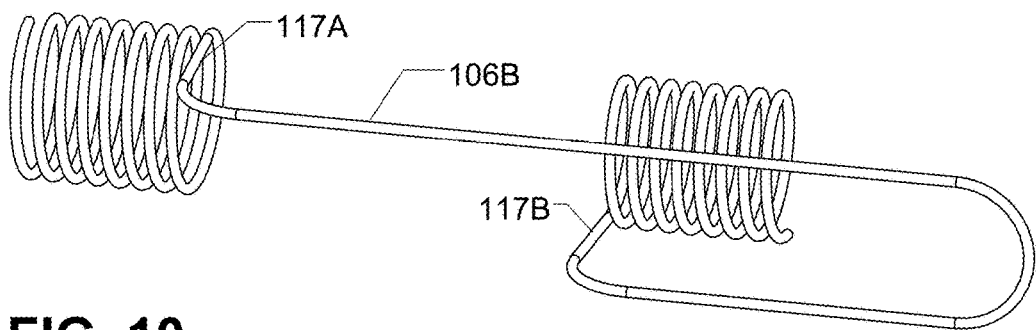
FIG. 9 is a perspective view of piece of flexible material 106B showing its installed shape in transmission system 100.
Figure 10:
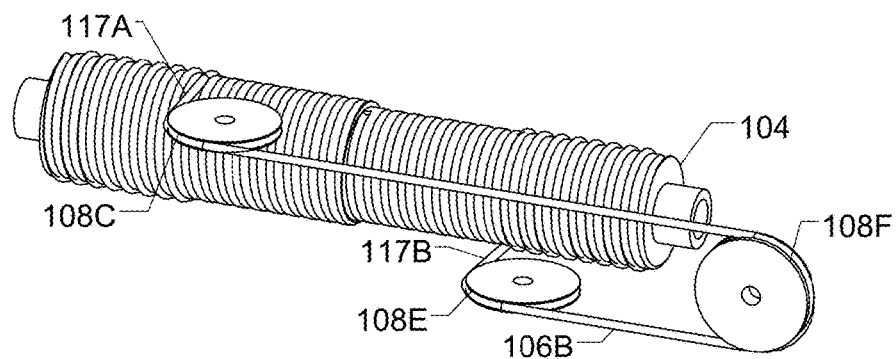
FIG. 10 is a perspective view of rotor 104, piece of flexible material 106B, and pulleys 108C, 108E, and 108F.

As shown in FIGS. 9 and 10, cable 106B is coupled to rotor 104 (on the left side of FIG. 10), then wound counterclockwise (when viewing rotor 104 along axis 107 from the right in FIG. 4) around surface 116A of rotor 104, then wrapped around pulley 108C, then wrapped around pulley 108F, then wrapped around pulley 108E, then wound counterclockwise (when viewing rotor 104 along axis 107 from the right in FIG. 4) around surface 116B of rotor 104, then coupled to rotor 104. Referring back to FIG. 4, cable 106B has a first portion between pulley 108E and pulley 108F defining an axis 166. Cable 106B also has a second portion between pulley 108C and pulley 108F defining an axis 167. Axes 166 and 167 are both parallel to axis of rotation 107, for reasons that will be detailed below.

Figure 11:
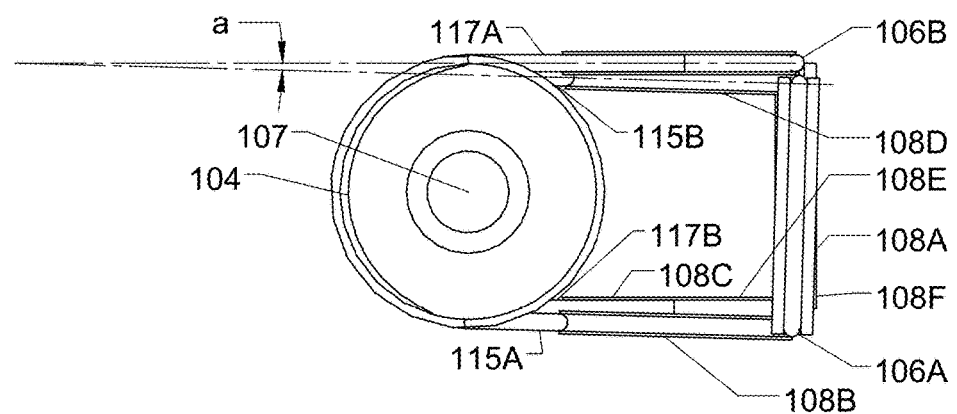
FIG. 11 is a front view of rotor 104 with pieces of flexible material 106A and 106B, and pulleys 108A, 108B, 108C, 108D, 108E, and 108F.

FIG. 11 is a front view of transmission system 100 showing only the components shown in FIG. 4. As shown in FIG. 11, pulleys 108C, 108E, and 108F are angled by an angle "a" about axis of rotation 107 relative to pulleys 108A, 108B, and 108D, to allow cable 106B to pass by cable 106A without touching it. In transmission system 100, angle "a" is approximately 1.5 degrees, although in other embodiments a different angle can be used. Alternatively, cable 106B could be routed around cable 106A (or vice versa) to avoid touching it by using different-sized pulleys or additional pulleys. Also alternatively, cable 106A and cable 106B could be allowed to touch, although this may produce wear on the pieces of flexible material.

To reduce friction in the system, pulley 108A is preferably coupled to support 102 such that it can rotate relative to support 102 via a ball bearing or roller bearing. Similarly, pulley 108B and pulley 108D are preferably coupled to carriage 110 such that they can rotate relative to carriage 110 via a ball bearing or roller bearing. In some cost-sensitive applications, however, pulley 108A could be coupled via bushings to support 102 or even fixed to support 102 (resulting in much higher friction since cable 306A would have to slide around the surface of pulley 108A). Similarly, pulleys 108B and 108D could be coupled via bushings to carriage 310 or even fixed to carriage 310. In some embodiments, one or more of pulleys could simply be a convex surface that is part of another component, the surface serving to bend the respective piece of flexible material through an angle. For example, a pulley shaped like a 90-degree arc of a cylinder could bend a piece of flexible material passing around it through 90 degrees (but with relatively high friction compared to a pulley using a ball or roller bearing).

As shown in FIGS. 1-3, transmission 100 also comprises a motor 112 coupled to support 102 via a motor mount 122. Motor 112 has a shaft coupled to rotor 104 such that when the shaft turns, rotor 104 turns. Additionally, transmission 100 comprises a position sensor 114 (in this particular embodiment, a rotary encoder 114) coupled to the shaft of motor 112 to measure the rotation of the shaft and thus the rotation of rotor 104. Since the back and forth movement of carriage 110 is related to the rotation of rotor 104, rotary encoder 114 can be used to measure the back and forth movement of carriage 110. Position sensor 114 comprises a body component and a rotating component, with the body component typically mounted to a stationary object (such as a motor housing) and the rotating component typically mounted to a rotating shaft (such as a motor shaft). In some embodiments, the rotating component of position sensor 114 could be coupled to rotor 104. In other embodiments, a linear position sensor, typically in the form a stationary strip component and a moving component, could also be used. The moving component could be coupled to carriage 110 while the stationary strip could be coupled to support 102.

Defining an Axis with a Straight Portion of Flexible Material

FIGS. 12A through 16D illustrate how a straight portion of a piece of flexible material defines an axis, using five different examples of pieces of flexible material. An axis is defined by two points taken at two different cross-sections along a straight portion of flexible material, the axis being defined so that it passes through these two points. Each point is at the centroid (the geometric center) of its section. When a piece of flexible material has repeating features, the sections should be taken from corresponding portions of the flexible material. If the first section is taken at a portion between two repeating features, then the second section should also be taken at a corresponding portion that is also between two of the repeating features, and preferably in the same position relative to the two repeating features. For example, if an axis is being defined for a timing belt, the first section could be taken midway between a first pair of teeth, with the second section being taken midway between a second pair of teeth. If the first section is instead taken through the middle of a first tooth of a timing belt, the second section should similarly be taken through the middle of a second tooth of the timing belt.

FIGS. 12A-12D illustrate how to define an axis 142 for a straight portion of piece of flexible material 140 having a circular cross-section. FIGS. 13A-13D illustrate defining an axis 152 for a straight portion of a piece of timing belt 150 that has repeating features in the form of teeth. FIGS. 14A-14D illustrate defining an axis 162 for a straight portion of a V-belt 160. FIGS. 15A-15D illustrate defining an axis 172 for a straight portion of a cable with repeating features in the form of beads 170. FIG. 16A-16D illustrates defining an axis 182 for a straight portion of a cable 180 comprised of smaller cables.

Figure 12A:
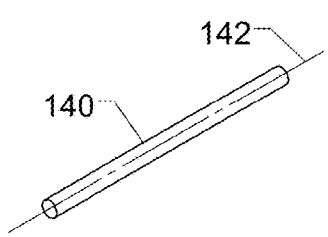
FIGS. 12A, 12B, 12C, and 12D are perspective, top, and two cross-sectional views respectively of a first exemplary piece of flexible material, a cable.
Figure 12B:
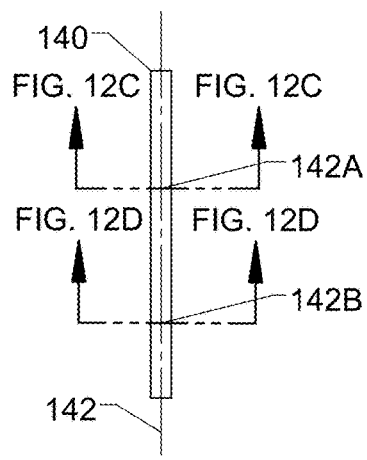
Figure 12C:
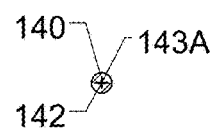
Figure 12D:
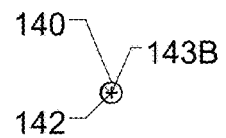

In FIG. 12A, a straight portion of flexible material 140 (in this particular embodiment, a cable 140) defines an axis 142 passing through two points on two different sections as shown in FIG. 12B: a point 143A at the centroid of a first section of cable 140, as shown in FIG. 12C, and a point 143B at the centroid of a second section of cable 140, as shown in FIG. 12D.

Figure 13A:
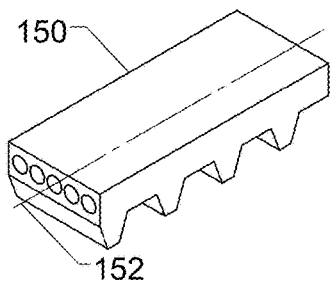
FIGS. 13A, 13B, 13C, and 13D are perspective, top, and two cross-sectional views respectively of a second exemplary piece of flexible material, a belt.
Figure 13B:
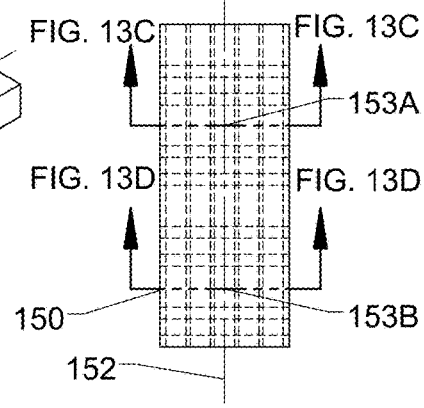
Figure 13C:
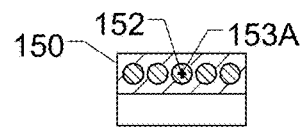
Figure 13D:
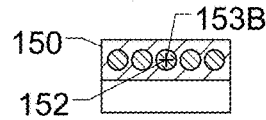

In FIG. 13A, a piece of flexible material 150 (in this particular embodiment, a timing belt 150) defines an axis 152 that passes through two points on two different sections shown in FIG. 13B: a point 153A at the centroid of a first section of timing belt 150 taken between teeth (as shown in FIG. 13C) and a point 153B at the centroid of a second section of timing belt 150 taken between teeth (as shown in FIG. 13D).

Figure 14A:
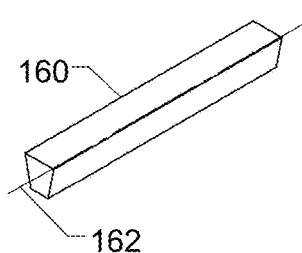
FIGS. 14A, 14B, 14C, and 14D are perspective, top, and two cross-sectional views respectively of a third exemplary piece of flexible material, a V-belt.
Figure 14B:
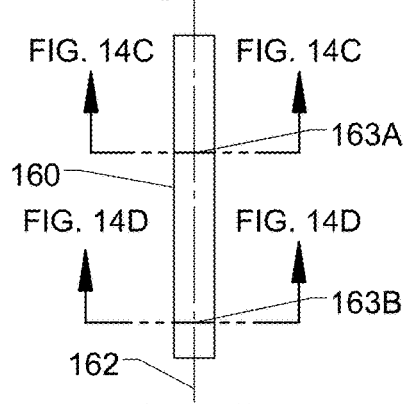
Figure 14C:
Figure 14D:
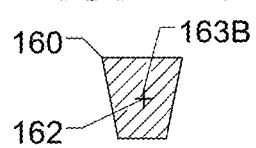

In FIG. 14A, a straight portion of flexible material 160 (in this particular embodiment, a V-belt 160) defines an axis 162 passing through two points on two different sections shown in FIG. 14B: a point 163A at the centroid of a first section of cable 160 (as shown in FIG. 14C) and a point 162B at the centroid of a second section of cable 160 (as shown in FIG. 14D).

Figure 15A:
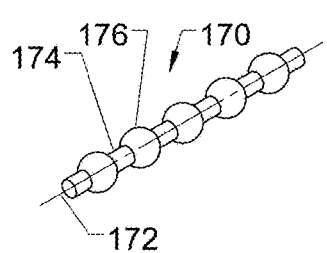
FIGS. 15A, 15B, 15C, and 15D are perspective, top, and two cross-sectional views respectively of a fourth exemplary piece of flexible material, a cable with beads acting as timing features.
Figure 15B:
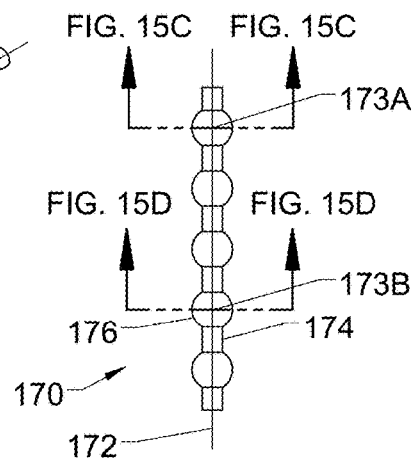
Figure 15C:
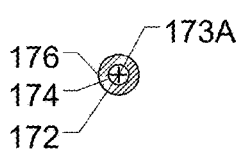
Figure 15D:
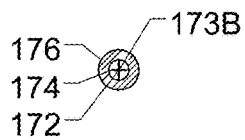
Figure 19:
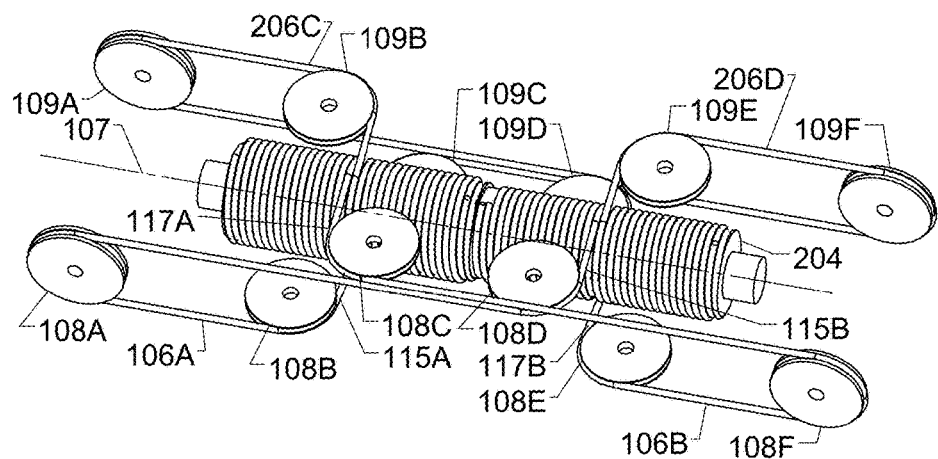
FIG. 19 is a perspective view of rotor 204, pieces of flexible material 106A, 106B, 206C and 206D, and pulleys 108A, 108B, 108C, 108D, 108E, 108F, 109A, 109B, 109C, 109D, 109E, 109F.

In FIG. 15A, a piece of flexible material 170 (more specifically a beaded cable 170) defines an axis 172 passing through two points on two different sections shown in FIG. 15B: a point 173A at the centroid of a first section of cable 170 (as shown in FIG. 15C) and a point 173B at the centroid of a second section of cable 170 (as shown in FIG. 15D).

In FIG. 16A, a piece of flexible material 180, more specifically a cable 180, defines an axis 182 passing through two points on two different sections shown in FIG. 16B: a point 183A at the centroid of a first section of cable 180 (as shown in FIG. 16C) and a point 183B at the centroid of a second section of cable 180 (as shown in FIG. 16D).

The Aspect of Keeping Axes Defined by Portions of the Flexible Material Parallel to the Axis of Rotation Referring back to FIG. 4, cable 106A has a first straight portion between pulley 108A and pulley 108B defining an axis 164 and a second straight portion between the pulley 108A and the pulley 108D defining an axis 165, axis 164 and axis 165 both being parallel to axis of rotation 107.

Figure 68:
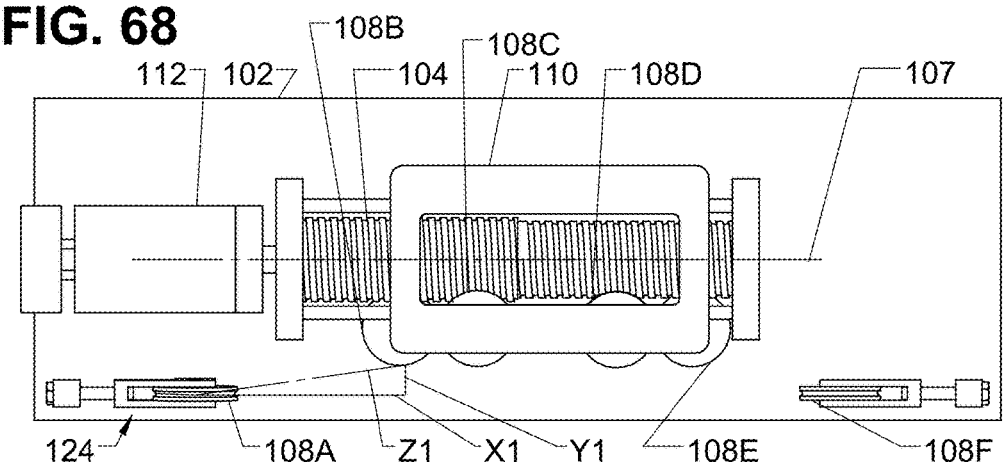
FIG. 68 is a schematic top view of transmission system 100 with carriage 110 moved further away from motor 112.
Figure 69:
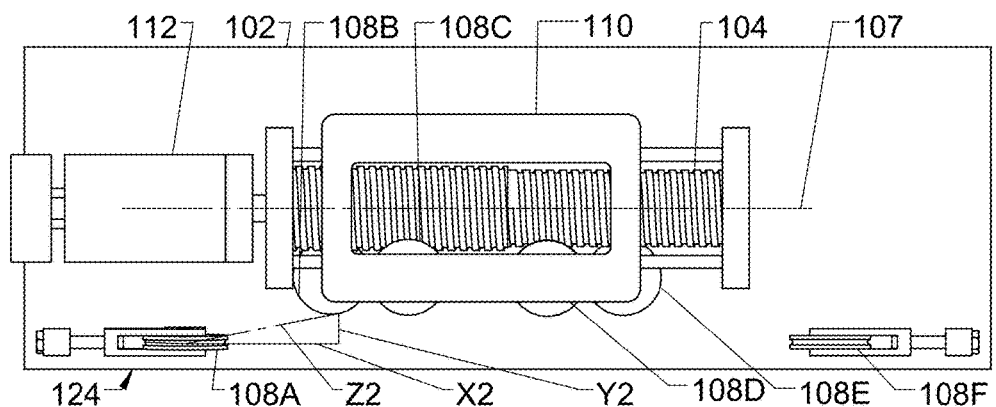
FIG. 69 is a schematic top view of transmission system 100 with carriage 110 moved closer to motor 112.
Figure 70:
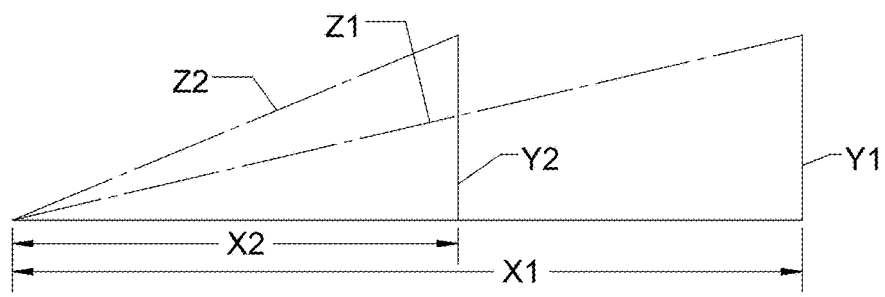
FIG. 70 is a schematic diagram illustrating how the angle of an axis defined by a piece of flexible material between pulleys 108A and 108B changes as carriage 110 moves.

The importance of keeping axis 164 and axis 165 parallel to axis of rotation 107 is more clearly understood from FIGS. 68-69, in which axis 164 is not parallel to axis of rotation 107. FIGS. 68 and 69 show top views of transmission 100, with pulleys 108A and 108F moved further away from axis of rotation 107 (toward the bottom of the figures), such that axis 164 of the portion of cable 106A between pulleys 108A and 108B wouldn't be parallel to axis of rotation 107, unlike in FIG. 4. Similarly, with pulleys 108A and 108B moved further from axis 107, axes 165, 166, and 167 of FIG. 4 wouldn't be parallel to axis of rotation 107. In FIG. 68, a line Z1 represents the portion of cable 106A between pulley 108A and 108B. In FIG. 69, a line Z2 represents the same portion of cable 106A as it would appear with carriage 110 moved closer to motor 112. In FIG. 68, lines X1 and Y1 form a right triangle with line Z1, with X1 being parallel to axis of rotation 107 and thus parallel to the direction in which carriage 110 moves back and forth. Similarly, in FIG. 69, lines X2 and Y2 form a right triangle with line Z2. In FIG. 70, both triangles are shown together. The sides of each triangle can be related by the following equation:

$$x^2 + y^2 = h^2 \quad \text{(equation 1)}$$

The speed of cable 106A can be related to the speed of carriage 110:

$$2x\frac{dx}{dt} + 2y\frac{dy}{dt} = 2h\frac{dh}{dt} \quad \text{(equation 2)}$$

Since the distance y doesn't vary as the carriage moves, equation 2 reduces to:

$$x\frac{dx}{dt} = h\frac{dh}{dt} \quad \text{(equation 3)}$$

Which can be rearranged as:

$$\frac{dx}{dt} = \frac{h}{x}\frac{dh}{dt} \quad \text{(equation 4)}$$

Equation 4 shows that with axis 164 of FIG. 4 being non-parallel to the axis of rotation 107, the speed of carriage 110 can vary with the position of carriage 110, even if rotor 104 is turned at a constant rate. As a result, controlling the position and speed of carriage 110 could be more difficult than if carriage 110 moved at a constant speed when rotor 104 is turned at a constant speed. Additionally, since axes 165, 166, and 167 would be similarly non-parallel in FIGS. 68 and 69, backlash could develop in the movement of the carriage, due to either cable 106A or cable 106B developing slack as a result of differing speeds between the two cables. In nearly all motion control applications, backlash is highly undesirable. While it would be possible to take up backlash by various techniques, such as using springs to tension pulleys that cables 106A and 106B are wrapped around, such techniques typically have the undesirable side effect of reducing the mechanical stiffness of the carriage system, again complicating control of carriage 110 and limiting how fast carriage 110 can be precisely positioned. Transmission 100 avoids these potential issues by making the portions of cable 106A between pulleys 108A and 108B, and between pulleys 108A and 108D, parallel to axis of rotation 107. Transmission 100 also avoids these potential issues during back and forth motion of carriage 110 by making the portions of cable 106B between pulleys 108C and 108F, and between pulleys 108E and 108F, parallel to axis of rotation 107.

Transmission 100 comprises a tensioner assembly 124, which comprises a tensioner support 128, an adjusting screw 130, and a pulley holder 126. Tensioner support 128 is coupled to support 102. Adjusting screw 130 passes through tensioner support 128 and threads into pulley holder 126. Pulley 108A is coupled to pulley holder 126 such that it can rotate freely. In operation, tightening adjusting screw 130 of tensioner assembly 124 draws pulley holder 126 and hence pulley 108A toward tensioner support 128, thereby tensioning cable 106A.

As shown in FIG. 6, rotor 104 has surface 116A for supporting piece of flexible material 106A at diameter D about axis of rotation 107 and surface 116B for supporting piece of flexible material 106A at a diameter d about axis of rotation 107, the diameter D differing from the diameter d. As shown in FIG. 5, rotor 104 has first and second right-handed helical grooves about axis of rotation 107, surface 116A being the concave surface of the first groove and surface 116B being the concave surface of the second groove.

Referring to FIG. 4, in transmission system 100, the movement of legs 115A and 115B of flexible segment 106A along rotor 104 is synchronized with the linear motion of carriage 110 such that 1) legs 115A and 115B move in the same direction as carriage 110, and 2) legs 115A and 115B move at the same speed as carriage 110 in that direction. This can be achieved with reasonable accuracy by making D close to:

$$d + \frac{2l}{\pi}$$

The above will be referred to as expression 1. A more accurate expression is as follows. Preferably, D is within 30%, more preferably 15%, most preferably within 5%, of:

$$\frac{\sqrt{4l^2 + 4l\sqrt{\pi^2 d^2 + l^2} + \pi^2 d^2}}{\pi}$$

The above expression will be referred to as expression 2. When rotor 104 is grooved, D and d are measured at the bottom of the groove, as shown in FIG. 6. In some transmission systems, rotor 104 may not be grooved. For example, in some transmission systems, a surface for supporting piece of flexible material 106A at diameter D about axis of rotation 107 could instead be a cylindrical surface of diameter D. Similarly, in some transmission systems, a surface for supporting piece of flexible material 106A at diameter d about axis of rotation 107 could instead be a cylindrical surface of diameter d.

l in expressions 1 and 2 is the lead of the respective helical groove on rotor 104 (surface 116A being the concave surface of the first groove and surface 116B being the concave surface of the second groove). Preferably, the leads of the two grooves of rotor 104 are the same. The lead of a helical groove is the distance between each turn of the helical groove along the axis of the helix (which corresponds to axis of rotation 107). In some transmission systems, the rotor may not be grooved. In these cases, l measures the distance between the centers of adjacent turns of the same piece of flexible material on rotor 104.

In operation, when rotor 104 is rotated counterclockwise (when viewed from the right in FIG. 4) cable 106A winds around surface 116A faster than it unwinds from surface 116B. This is due to surface 116A supporting piece of flexible material 106A at diameter D while surface 116B supports piece of flexible material 106A at diameter d about axis 107. Since D is greater than d in transmission 100, cable 106A winds faster around surface 116A than it unwinds from surface 116B. This causes the length of cable 106A between the two surfaces to shorten, drawing pulleys 108B and 108D toward pulley 108A. Since pulleys 108B and 108D are coupled to carriage 110, carriage 110 is drawn toward pulley 108A. Simultaneously, as rotor 104 is rotated counterclockwise, cable 106B unwinds from surface 116A faster than it winds onto surface 116, lengthening the portion of cable 106B between the two surfaces so as to not restrain carriage 110 from being pulled toward pulley 108A. That is, the portion of cable 106B between surfaces 116A and 116B is lengthening at the same rate as the portion of cable 106A between surfaces 116A and 116 is shortening. When rotor 104 is rotated clockwise (when viewed from the right in FIG. 4) cable 106A unwinds from surface 116A faster than it winds onto surface 116B, lengthening the cable between the two surfaces and allowing carriage 110 to be moved away from pulley 108A. Simultaneously, as rotor 104 is rotated clockwise, cable 106B winds onto surface 116A faster than it unwinds from surface 116B, causing the length of cable 106B between the two surfaces to shorten and drawing pulleys 108C and 108E, and thus carriage 110, toward pulley 108F.

Figure 20:
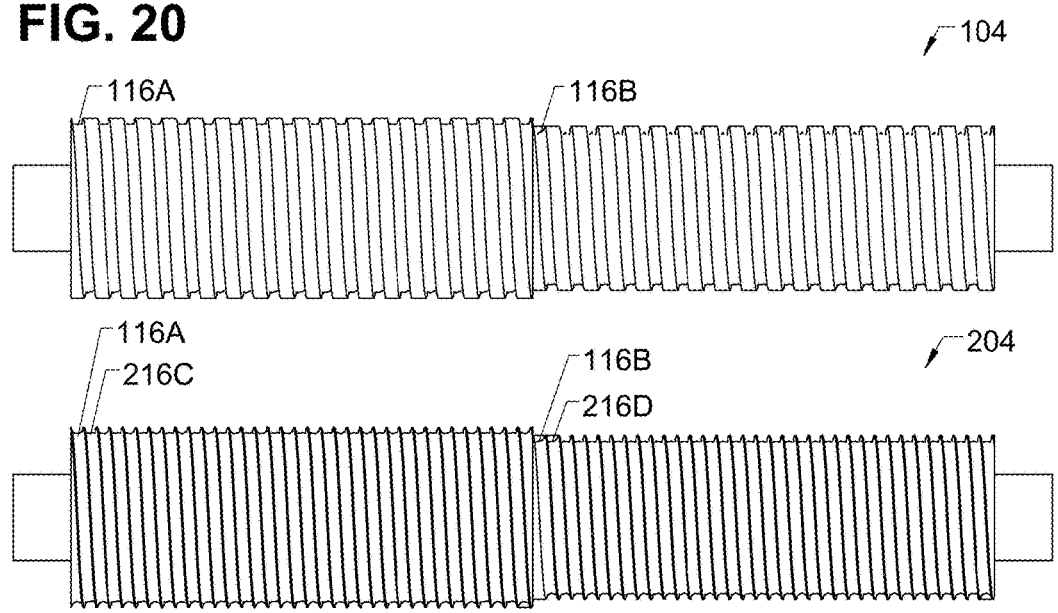
FIG. 20 is a side view showing the differences between rotor 104 of the transmission system 100 and rotor 204 of the transmission system 200.

FIGS. 17-20 illustrate an exemplary transmission system 200. Transmission system 200 comprises all of the components of transmission system 100, with the exception of rotor 104 and carriage 110. In transmission system 200, rotor 104 is replaced with a rotor 204 and carriage 110 is replaced by a carriage 210. FIG. 20 shows both rotor 104 and rotor 204 side-by-side to illustrate their differences. Carriage 210 has additional mounting points for pulleys 109B, 109C, 109D, and 109E (visible in FIG. 19) compared to carriage 110.

As shown in FIG. 20, rotor 204 has the same first and second right-handed helical grooves about axis of rotation 107 as rotor 104, with surface 116A being the concave surface of the first groove and surface 116B being the concave surface of the second groove. Additionally, rotor 204 has a third right-handed helical groove beside the first helical groove, and a fourth right-handed helical groove beside the second helical groove. As shown in FIG. 20, rotor 204 has a third surface 216C for supporting a piece of flexible material (in this particular embodiment, a cable) at diameter D about axis of rotation 107 and a fourth surface 216D for supporting the piece of flexible material 206C at diameter d about axis of rotation 107. Surface 216C is the concave surface of the third right-handed helical groove and surface 216D is the concave surface of the fourth right-handed helical groove. A pulley 109A is coupled to support 102 approximately opposite pulley 108A relative to axis of rotation 107. A pulley 109F is coupled to support 102 such that carriage 110 is positioned between pulley 109A and pulley 109F. Pulleys 109B, 109C, 109D, and 109E are coupled to carriage 210.

Transmission system 200 further comprises a third piece of flexible material 206C coupled to rotor 204, then wound clockwise (when viewing rotor 204 along axis 107 from the right in FIG. 19) around surface 216C of the rotor, then wrapped around pulley 109B, then wrapped around pulley 109A, then wrapped around pulley 109D, then wound clockwise (when viewing rotor 304 along axis 107 from the right in FIG. 19) around surface 216D of rotor 204, then coupled to rotor 204.

Transmission system 200 further comprises a fourth piece of flexible material 206D coupled to rotor 204, then wound counterclockwise (when viewing rotor 204 along axis 107 from the right in FIG. 19) around surface 216C, then wrapped around pulley 109C, then wrapped around pulley 109F, then wrapped around pulley 109E, then wound counterclockwise (when viewing rotor 204 along axis 107 from the right in FIG. 19) around surface 216D of rotor 204, then coupled to rotor 204.

Cables 106A and 206C are pretensioned by approximately the same amount so that they exert approximately the same sideload on rotor 204. Similarly, cables 106B and 206D are pretensioned approximately the same amount so that they exert approximately the same sideload on rotor 204.

Together, the additional components of transmission system 200 allow sideloads on rotor 204 due to cables 106A and 206C, and cables 106B and 206D, to be approximately balanced, thereby reducing the chance of rotor 204 bending due to tension on the cables. In transmission system 200, when rotor 204 is rotated, additional tension in cable 106A is approximately balanced by additional tension in cable 206C, and additional tension in cable 106B is approximately balanced by additional tension in cable 206D. This is particularly advantageous when rotor 204 is made long, since longer rotors are easier to bend than shorter rotors for a given rotor cross-section.

FIGS. 21-27 illustrate an exemplary transmission system 300. Advantageously, due to the double helix design of the rotor in transmission 300, the maximum travel distance of the carriage can be increased without increasing the length of the carriage. This is not the case in transmission systems 100 and 200. For example, in transmission system 100, one might expect that increasing the length of rotor 104 would lead increase the maximum travel distance of the carriage.

Figure 59:
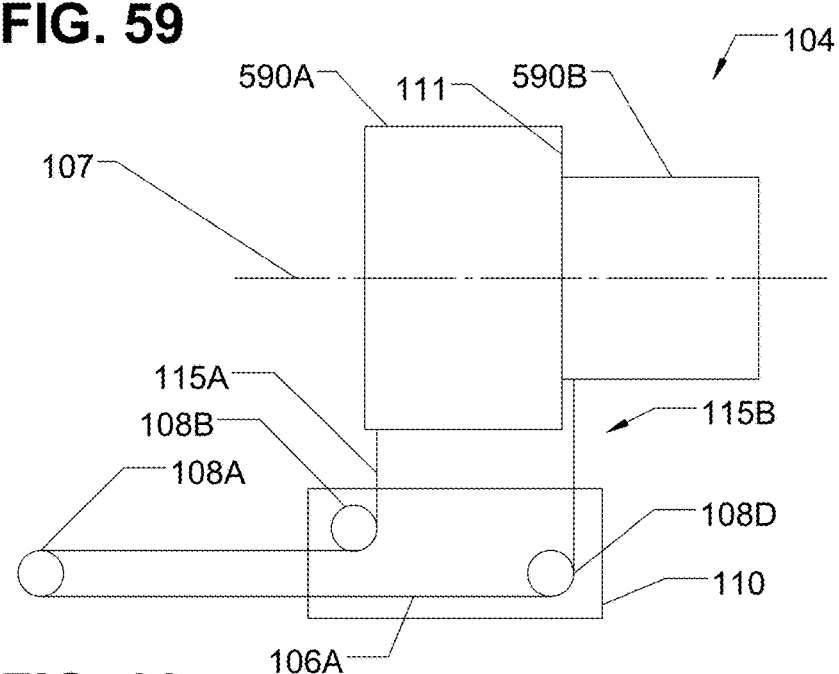
FIGS. 59 and 60 schematic top views of transmission system 100.
Figure 60:
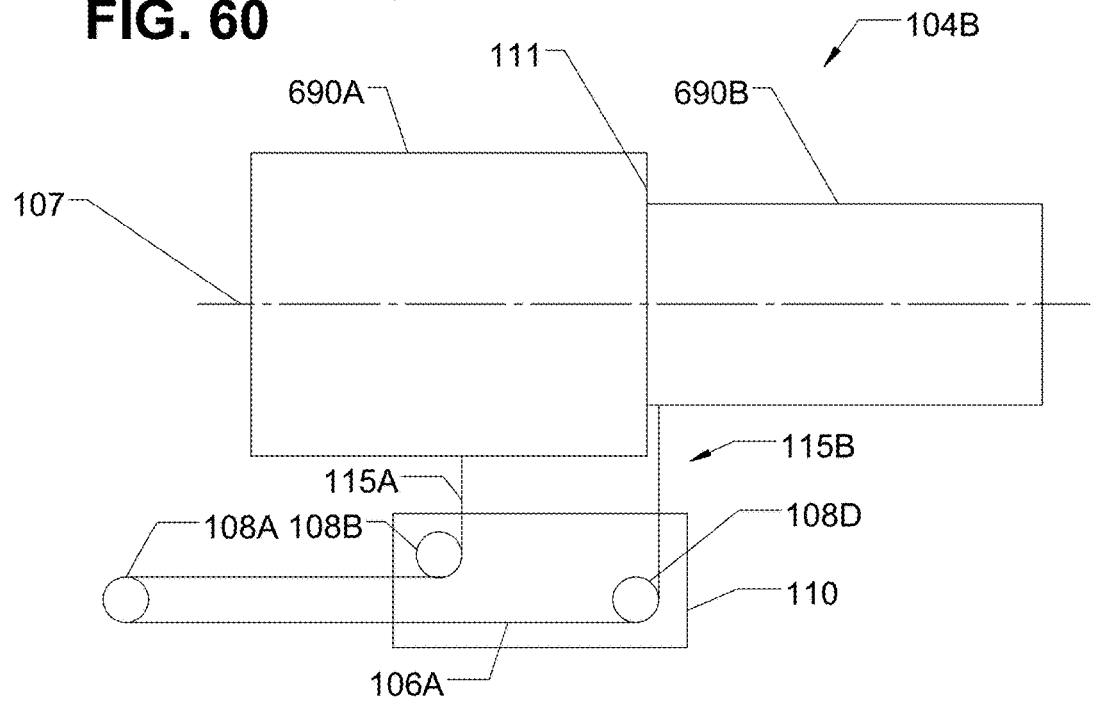
Figure 61:
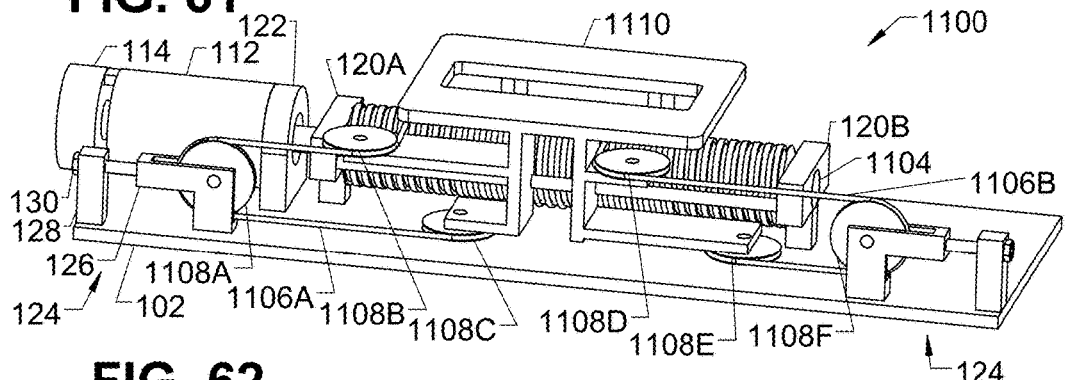
FIG. 61 is a perspective view of transmission system 1100.

However, as can be seen from FIGS. 1 and 4, pulleys 108B and 108C would also have to be moved further apart from pulleys 108D and 108E to actually increase the maximum travel distance of the carriage. In order to move pulleys 108B and 108C further apart from pulleys 108D and 108E, their mounting points on carriage 110 would have to be moved further apart. However, as can be seen by the positions where pulleys 108B and 108E are mounted on carriage 110 in FIG. 1, carriage 110 would need to grow in length to allow the mounting points of these pulleys to be moved further apart. This situation is illustrated schematically in FIGS. 59 and 60. In FIG. 59, rotor 104 is shown having a particular length. In FIG. 60, rotor 104B is approximately double the length of rotor 104 of FIG. 59, but the length of carriage 110 is the same in both FIGS. 59 and 60. In FIG. 59 a dividing surface 111 separates a cylinder 590A (representing surface 116A at diameter D) and cylinder 590B (representing surface 116B at diameter d). In FIG. 60, dividing surface 111 separates a cylinder 690A (representing a longer version of surface 116A at diameter D) and a cylinder 690B (representing a longer version of surface 116B at diameter d). As can be seen in FIG. 60, leg 115B of cable 106A still cannot move any further toward the left than it could in FIG. 59, due to leg 115B reaching dividing surface 111, despite the extra length of rotor 104B. Similarly, leg 115A of cable 106A cannot move any further toward the right than it could in FIG. 59, due to leg 115A reaching dividing surface 111. By contrast, in transmission system 300, increasing the rotor length increases the maximum travel of the carriage without any such issue.

Figure 21:
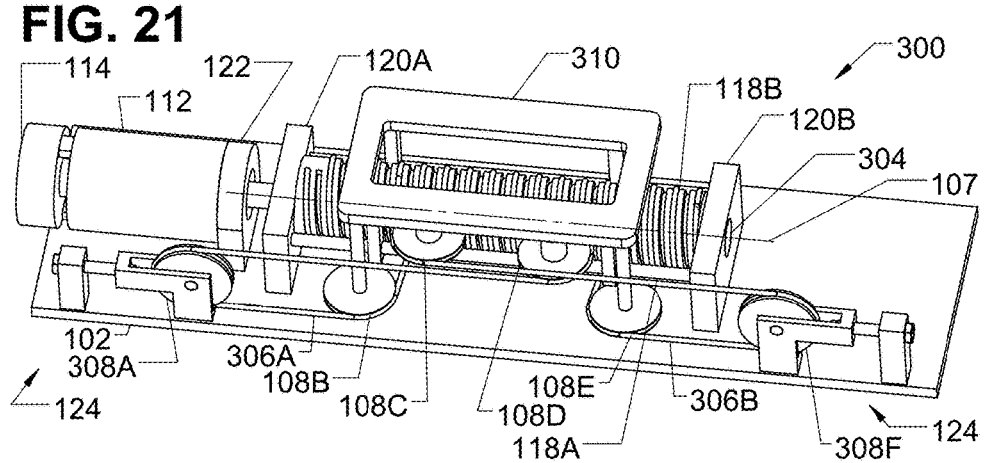
FIG. 21 is a perspective view of transmission system 300.

As shown in FIG. 21, transmission system 300 comprises support 102, a pulley 308A coupled to support 102, a piece of flexible material 306A (in this particular embodiment, a cable 306A), a rotor 304, a carriage 310, and pulleys 108B and 108D coupled to carriage 310. Rotor 304 is coupled to support 102 via blocks 120A and 120B such that rotor 304 can rotate about axis of rotation 107 relative to support 102.

Figure 22:
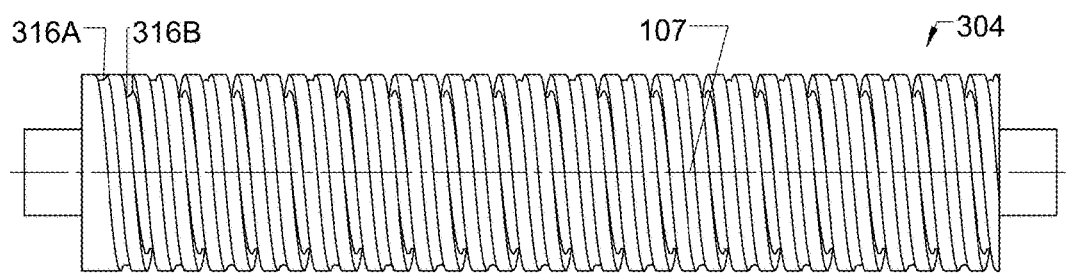
FIG. 22 is a side view of rotor 304 of the transmission system 300.
Figure 23:
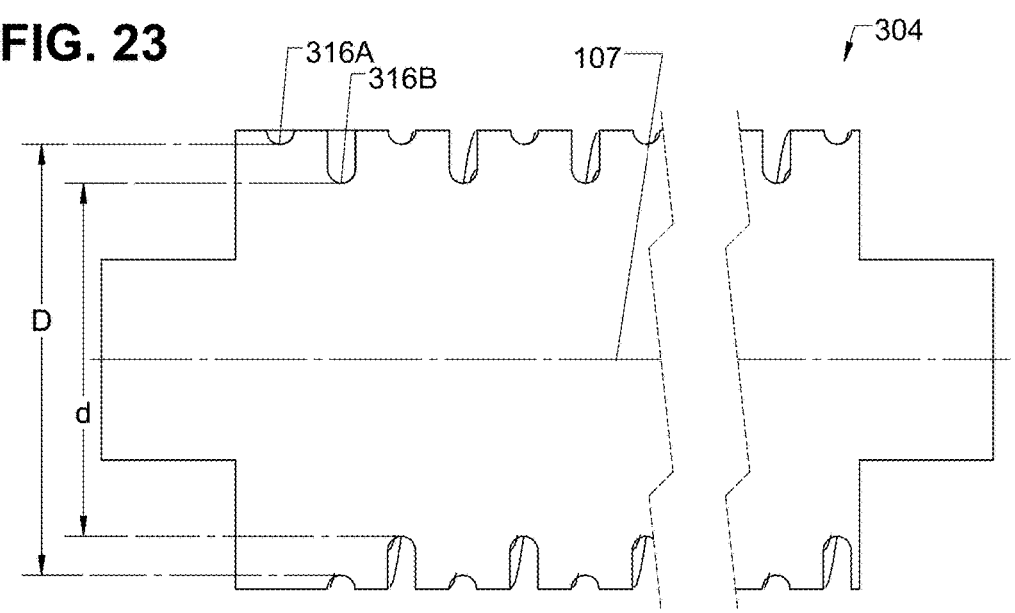
FIG. 23 is a schematic cross-sectional view of rotor 304 of transmission system 300 (with a break in the view to save space).

As shown in FIG. 23, rotor 304 has a surface 316A for supporting piece of flexible material 306A at a diameter D about axis of rotation 107 and a surface 316B for supporting piece of flexible material 306A at a diameter d about axis of rotation 107, the diameter D differing from the diameter d. In the embodiment of FIG. 21, each surface 316A and 316B is the inside surface of a right-handed helical groove formed in rotor 304 about axis 107 (in other embodiments, left-handed helical grooves can be used instead). As shown in FIGS. 22-23, surface 316A is intertwined with surface 316B so as to form a double helix.

Carriage 310 is coupled to support 102 such that carriage 310 is constrained to slide parallel to axis of rotation 107 relative to support 102.

Figure 24:
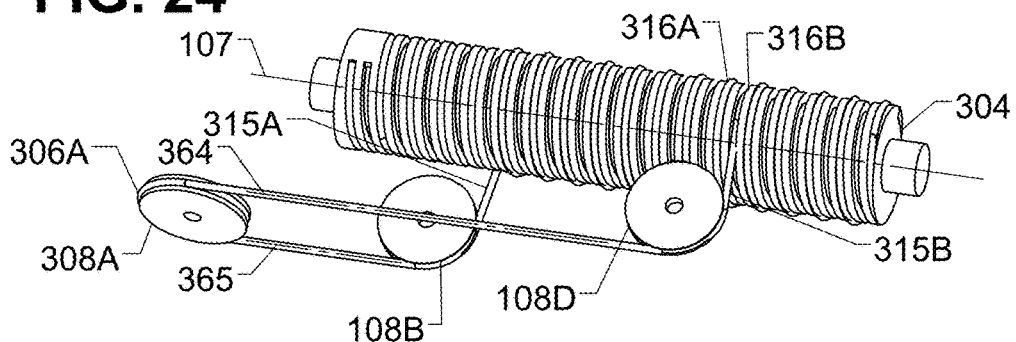
FIG. 24 is a perspective view of rotor 304, pulleys 308A, 108B, and 108D, and piece of flexible material 306A.
Figure 25:
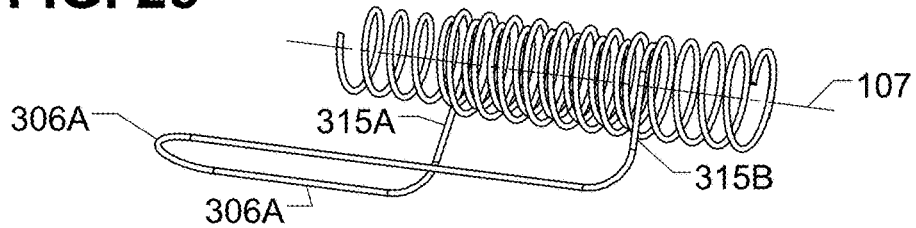
FIG. 25 is a perspective view of piece of flexible material 306A.

As shown in FIGS. 24 and 25, cable 306A is coupled to rotor 304 on the right side of FIG. 24, then wound clockwise (when viewing rotor 304 along axis 107 from the right in FIG. 24) around surface 316A of rotor 304, then wrapped around pulley 108B, then wrapped around pulley 308A, then wrapped around pulley 108D, then wound clockwise (when viewing rotor 304 along axis 107 from the right in FIG. 24) around surface 316B of rotor 304, then coupled to rotor 304 on the left side of FIG. 24.

The Aspect of Keeping Axes Parallel to the Axis of Rotation

As shown in FIG. 24, cable 306A has a first portion between pulley 308A and pulley 108D defining an axis 364. Cable 306A also has a second portion between pulley 308A and pulley 108B defining an axis 365. Axes 364 and 365 are both parallel to axis of rotation 107.

Figure 26:
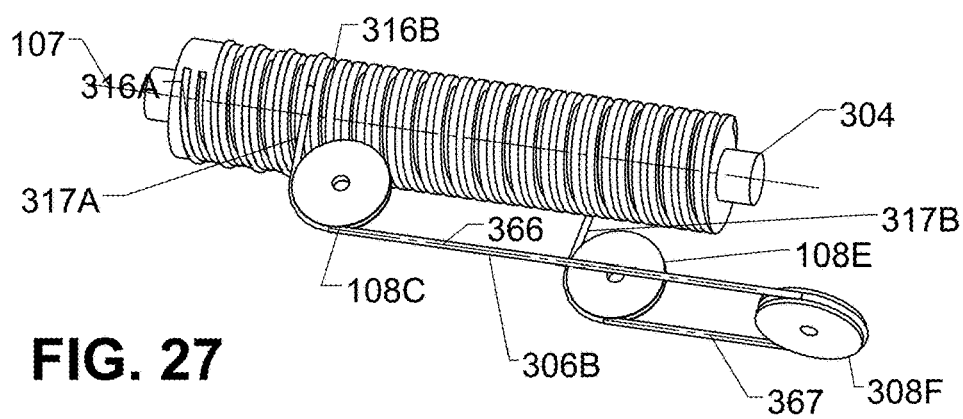
FIG. 26 is a perspective view of rotor 304, pulleys 108C, 108E, and 308F, and piece of flexible material 306B.
Figure 27:
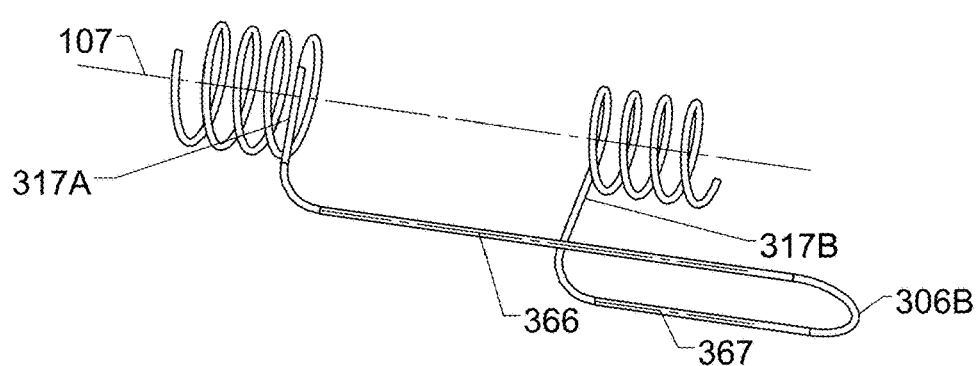
FIG. 27 is a perspective view showing the installed shape of piece of flexible material 306B.

The aforementioned components of transmission system 300 allow carriage 310 to be forcibly driven in one direction (toward pulley 308A) when rotor 304 is driven counterclockwise (when viewed along axis 107 from the right of FIG. 24). To allow carriage 310 to be forcibly driven in two directions (toward or away from pulley 308A), transmission system 300 further comprises pulleys 108C, 108E, and 308F, and a second piece of flexible material 306B (in this particular embodiment, a cable 306B). As shown in FIG. 21, pulley 308F is coupled to support 102 such that carriage 310 is positioned between pulley 308A and pulley 308F. Pulleys 108C and 108E are coupled to carriage 310. As shown in FIGS. 26 and 27, cable 306B is coupled to rotor 304 on the left side of FIG. 26, then wound counterclockwise (when viewing rotor 104 along axis 107 from the right in FIG. 26) around surface 316A of rotor 104, then wrapped around pulley 108C, then wrapped around pulley 308F, then wrapped around pulley 108E, then wound counterclockwise (when viewing rotor 104 along axis 107 from the right in FIG. 26) around surface 316B of rotor 104, then coupled to rotor 304.

As shown in FIG. 26, cable 306B has a first portion between pulley 108C and pulley 308F defining an axis 366. Cable 106B also has a second portion between pulley 108E and pulley 308F defining an axis 367. Axes 366 and 367 are both parallel to axis of rotation 107.

In operation, as shown in FIGS. 24 and 25, when rotor 304 is rotated counterclockwise (when viewed from the right in FIG. 24) cable 306A winds around surface 316A faster than it unwinds from surface 316B. This is due to surface 316A supporting piece of flexible material 306A at diameter D while surface 316B supports piece of flexible material 306A at diameter d about axis 107. Since D is greater than d in transmission 300, cable 306A winds faster around surface 316A than it unwinds from surface 316B. This causes the length of cable 306A between the two surfaces to shorten, drawing pulleys 108B and 108D toward pulley 308A. Since pulleys 108B and 108D are coupled to carriage 310, carriage 310 is drawn toward pulley 308A. Simultaneously, as can be seen in FIG. 26, as rotor 304 is rotated counterclockwise, cable 306B unwinds from surface 316A faster than it winds onto surface 316B, lengthening the portion of cable 306B between the two surfaces so as to not restrain carriage 310 from being pulled toward pulley 308A. That is, the portion of cable 306B between surfaces 316A and 316B is lengthening at the same rate as the portion of cable 306A between surfaces 316A and 316B is shortening. When rotor 304 is rotated clockwise (when viewed from the right in FIG. 24) cable 306A unwinds from surface 316A faster than it winds onto surface 316B, lengthening the cable between the two surfaces and allowing carriage 310 to be moved away from pulley 108A. Simultaneously, as can be seen in FIGS. 26 and 27, as rotor 304 is rotated clockwise, cable 306B winds onto surface 316A faster than it unwinds from surface 316B, causing the length of cable 306B between the two surfaces to shorten and drawing pulleys 108C and 108E, and thus carriage 310, toward pulley 308F.

Figure 28:
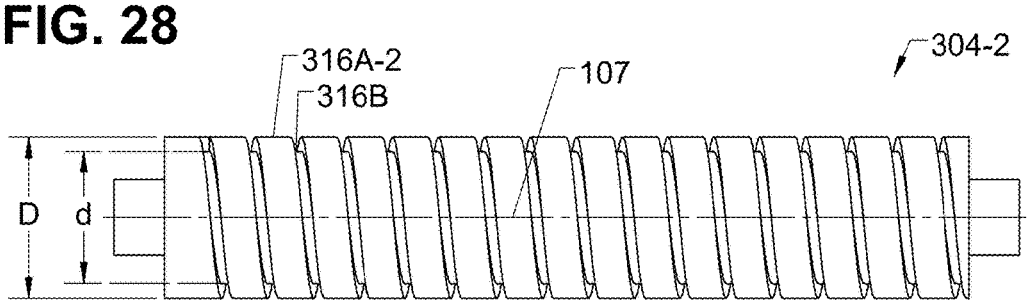
FIG. 28 is a side view of rotor 304-2, an alternative embodiment of rotor 304.
Figure 29:
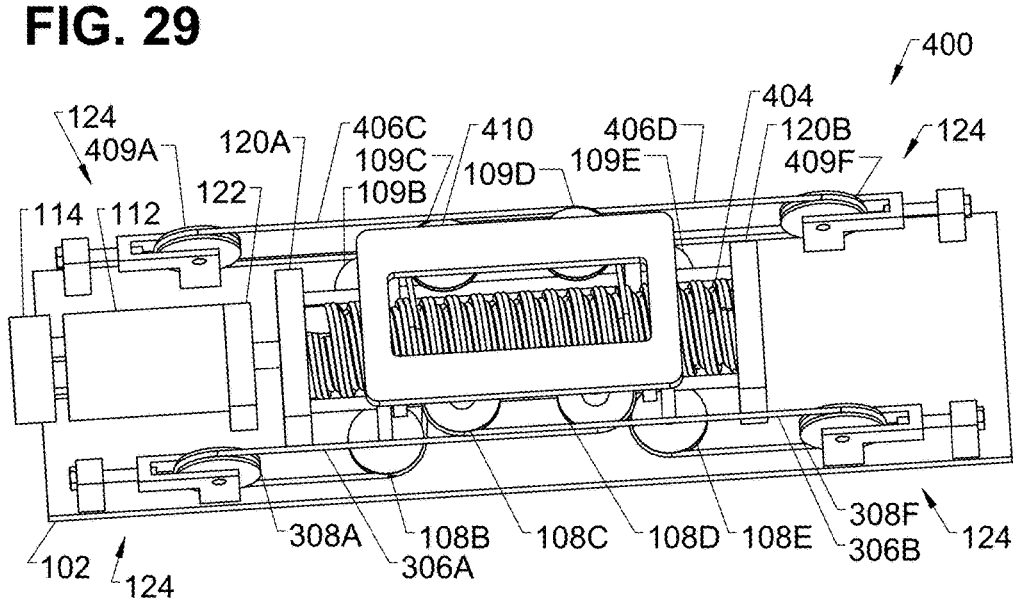
FIG. 29 is a perspective view of transmission system 400.

FIG. 28 shows another embodiment of rotor 304, a rotor 304-2. Rotor 304-2 has an outer diameter about axis of rotation 107 equal to D. Rotor 304-2 has the same right-handed helical groove for supporting a piece of flexible material at diameter d as rotor 304. Surface 316A-2 is the surface of the outer diameter of the rotor and surface 316B is the concave surface of the helical groove.

FIGS. 29-33 illustrate a transmission system 400. Transmission system 400 comprises all of the components of transmission system 300, with the exception of rotor 304 and carriage 310. In transmission system 400, rotor 304 is replaced with a rotor 404 and carriage 310 is replaced with a carriage 410. Additionally, transmission system 400 further comprises pulleys 409A and 409F coupled to support 102 and pulleys 409B, 409C, 409D, and 409E coupled to carriage 410, which has additional mounting points for these pulleys. Pulley 409A is positioned approximately opposite pulley 308A relative to axis of rotation 107, and pulley 409F is positioned approximately opposite pulley 308F relative to axis of rotation 107. Pulleys 409A and 409F are coupled to support 102 such that carriage 410 is positioned between pulleys 409A and pulley 409F.

Figure 30:
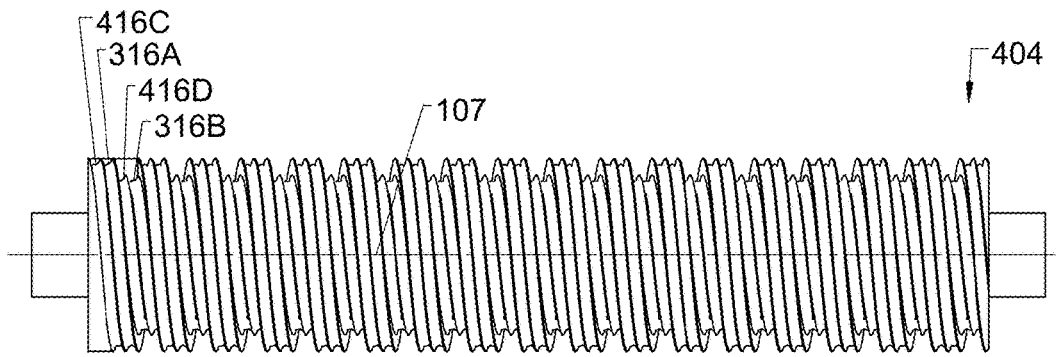
FIG. 30 is a side view of rotor 404.

As shown in FIG. 30, in transmission system 400, rotor 404 has the same first and second right-handed helical grooves about axis of rotation 107 as rotor 304 in FIG. 22, with surface 316A being the concave surface of the first groove and surface 316B being the concave surface of the second groove. Additionally, rotor 404 has a third right-handed helical groove beside the first helical groove, and a fourth right-handed helical groove beside the second helical groove. As shown in FIG. 30, rotor 404 has a third surface 416C for supporting a piece of flexible material (in this particular embodiment, a cable) at diameter D about axis of rotation 107 and a fourth surface 416D for supporting a piece of flexible material (in this particular embodiment, a cable) at diameter d about axis of rotation 107.

Figure 33:
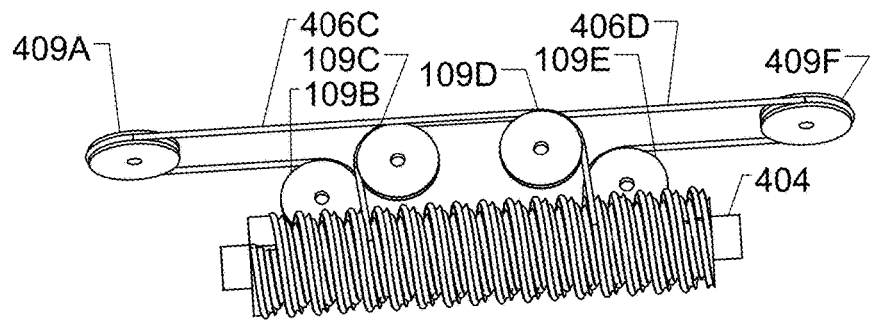
FIG. 33 is a perspective view of the installed shape of rotor 404, pieces of flexible material 406C, 406D, and pulleys 409A, 109B, 109C, 109D, 109E, 409F.

As shown in FIG. 33, transmission system 400 further comprises a third piece of flexible material 406C (in this particular embodiment, a cable 406C) coupled to rotor 404 on the right side of FIG. 33, then wound clockwise (when viewing rotor 404 along axis 107 from the right in FIG. 33) around surface 416C of the rotor, then wrapped around pulley 109D, then wrapped around pulley 409A, then wrapped around pulley 109B, then wound clockwise (when viewing rotor 404 along axis 107 from the right in FIG. 33) around surface 416D of rotor 404, then coupled to rotor 404 on the left side of FIG. 33.

As shown in FIG. 33, a piece of flexible material 406D (in this particular embodiment, a cable 406D) is coupled to rotor 404 on the right side of FIG. 33, then wound clockwise around surface 416D, then wrapped around pulley 109C, then wrapped around pulley 109F, then wrapped around pulley 109E, then wound clockwise around surface 416D of rotor 404, then coupled to rotor 404. Cables 306A and 406C are pretensioned by approximately the same amount so that they exert approximately the same sideload on each side of rotor 404. Similarly, cables 306B and 406D are pretensioned approximately the same amount so that they exert approximately the same sideload on each side of rotor 404.

Figure 31:
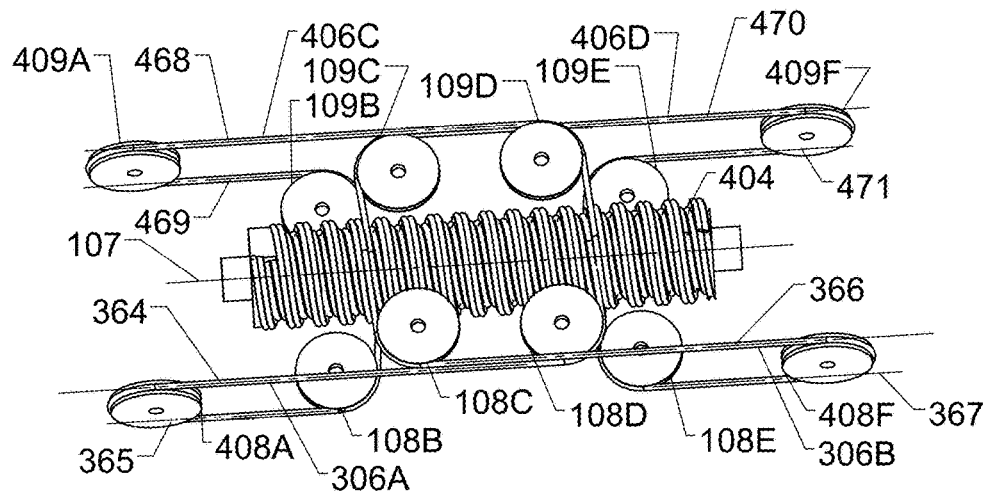
FIG. 31 is a perspective view of the installed shape of rotor 404, pieces of flexible material 306A, 306B, 406C and 406D, and pulleys 408A, 108B, 108C, 108D, 108E, 408F, 409A, 109B, 109C, 109D, 109E, 409F.
Figure 32:
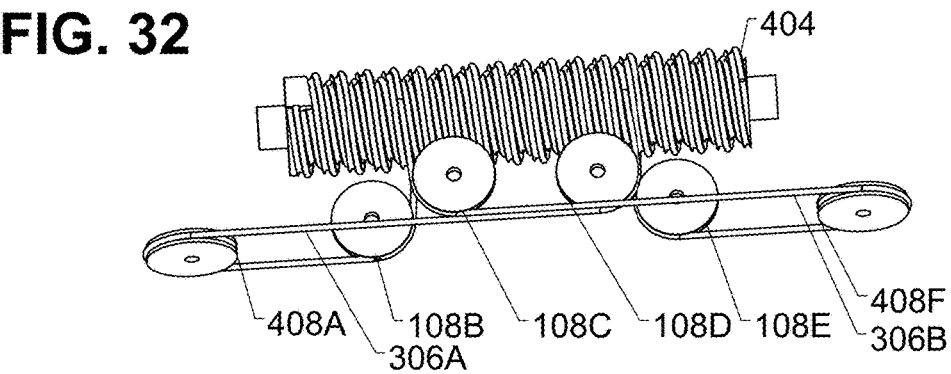
FIG. 32 is a perspective view of the installed shape of rotor 404, pieces of flexible material 306A, 306B, and pulleys 408A, 108B, 108C, 108D, 108E, 408F.

As shown in FIG. 31, cable 406C has a portion between pulley 409A and pulley 109B defining an axis 469. Cable 406C also has a portion between pulley 409A and pulley 109D defining an axis 468. Axes 468 and 469 are both parallel to axis of rotation 107. Cable 406D has a portion between pulley 409F and pulley 109C defining an axis 470. Cable 406D also has a second portion between pulley 409F and pulley 109E defining an axis 471. Axes 470 and 471 are both parallel to axis of rotation 107.

Together, the additional components of transmission system 400 allow sideloads on rotor 404 due to cables 306A, 306B, 406C, and 406D to be approximately balanced on each side of rotor 404, thereby reducing the chance of rotor 404 bending due to tension on the cables. In transmission system 400, when rotor 404 is rotated, additional tension in cable 306A is approximately balanced by additional tension in cable 406C, and additional tension in cable 306B is approximately balanced by additional tension in cable 406D.

This is particularly advantageous when rotor 404 is made long, since longer rotors are easier to bend than shorter rotors for a given rotor cross-section.

Figure 34:
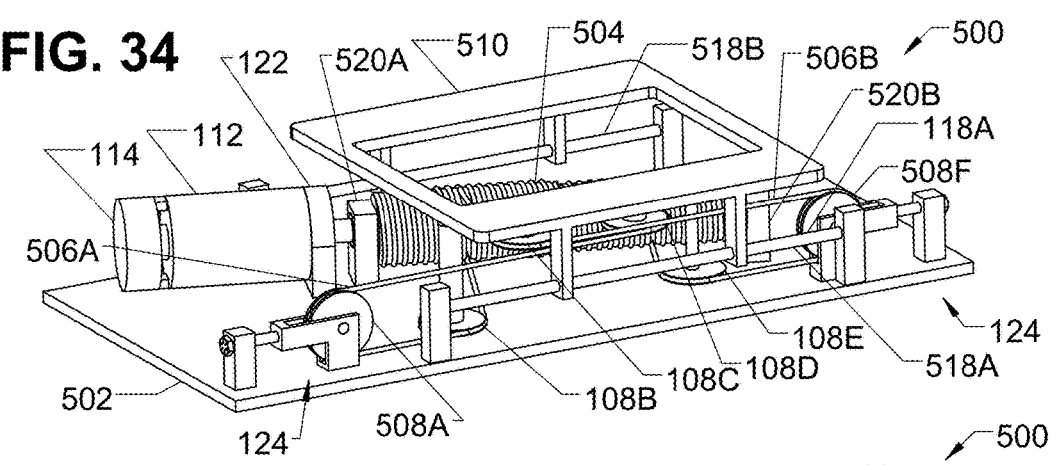
FIG. 34 is perspective view of transmission system 500.

FIG. 34 is perspective view of a transmission system 500. Transmission system 500 comprises a support 502, a rotor 504, pieces of flexible material 506A and 506B, pulleys 508A, 508B, 508C, 508D, 508E, and 508F, and a carriage 510. Blocks 520A and 520B couple rotor 504 to support 502 such that rotor 504 can rotate around axis of rotation 107 relative to support 502.

Figure 35:
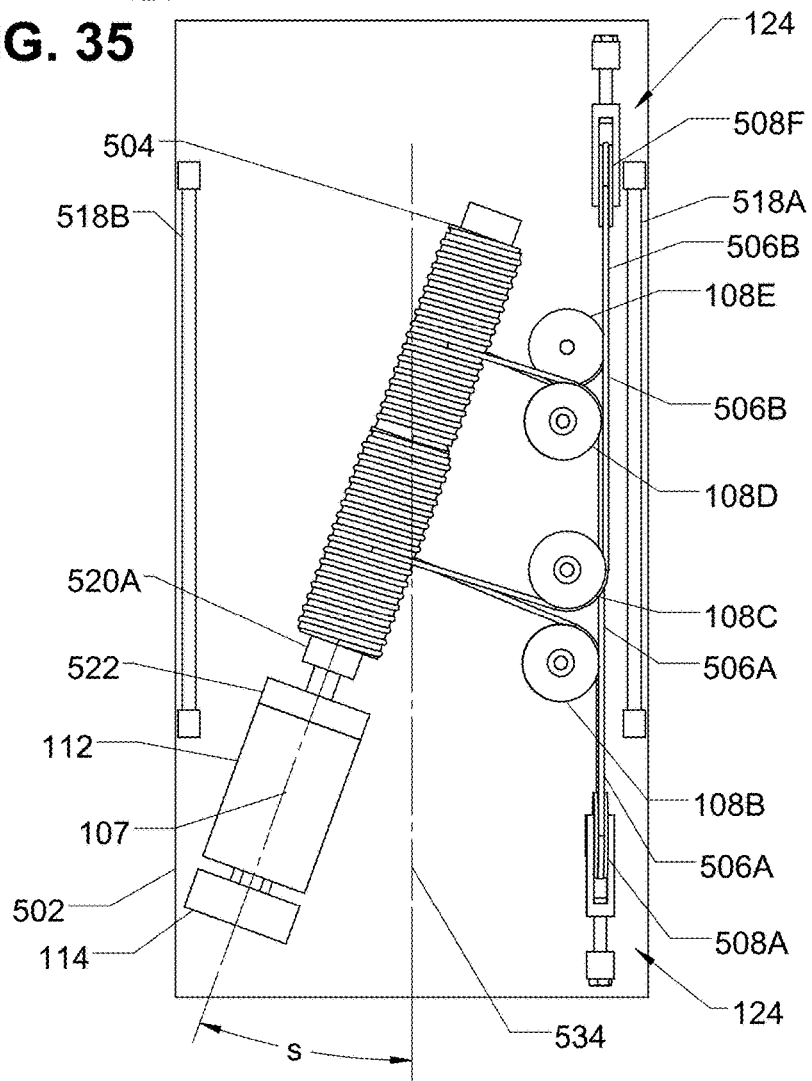
FIG. 35 is a top view of the transmission system 500.

FIG. 35 is a top view of the transmission system 500, with carriage 510 hidden. In transmission system 500, axis 107 defined by rotor 504 is at an angle "s" relative to a carriage axis 534 defined by the back and forth motion of carriage 510. Pulleys 108B, 108C, 108D, and 108E are coupled to carriage 510 such that they can rotate relative to carriage 510. As shown in FIG. 34, in transmission 500, the linear guide comprises holes in carriage 510 that ride on shafts 518A and 518B.

There are several potential advantages afforded by the angling of rotor 504 by the angle "s" relative to the direction of carriage travel. First, the relationship between the motion of carriage 510 and rotor 504 can be varied without changing rotor 504's shape. For example, by varying the angle at which rotor 504 is mounted to support 502, the relationship can be varied. Mounting rotor 504 at different angles relative to support 502 is generally easier and more convenient than replacing rotor 504 with a new and different rotor. Also, more clearance may be created along axis 534 than could otherwise be created if axis 507 and axis 534 coincided. For example, motor 112 or position sensor 114 could interfere with a large component, such as a laser or waterjet head, mounted to carriage 510 when the axis of rotor 504 and axis 534 are aligned. By skewing axis 507 of rotor 504 relative to axis 534 of carriage 510, additional clearance for such components can be made both above and below rotor 504.

Figure 36:
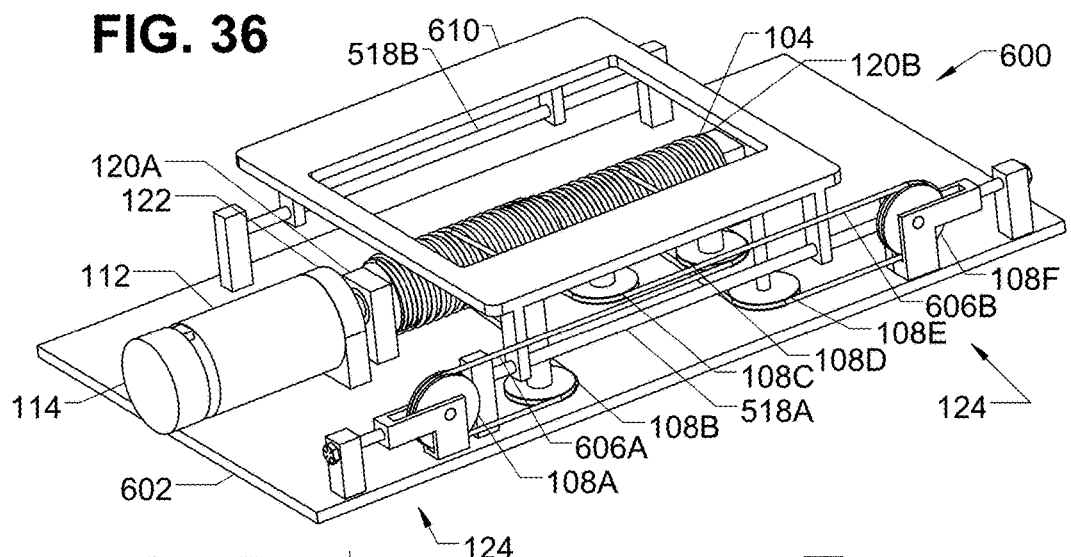
FIG. 36 is a perspective view of transmission system 600.

FIG. 36 is a perspective view of a transmission system 600. Transmission system 600 more clearly illustrates an aspect of each transmission system in the present disclosure. This aspect is the arrangement of pulleys coupled to the carriage so as to wind and unwind pieces of flexible material from the rotor at a particular angle, as illustrated in FIG. 37.

Transmission system 600 comprises a support 602, rotor 104, pieces of flexible material 606A and 606B (in this particular embodiment, cables 606A and 606B), pulleys 108A, 108B, 108C, 108D, 108E, and 108F, and a carriage 610. FIG. 37 is a top view of transmission system 600 (with two breaks to save space). As shown in FIG. 37, pulley 108D is positioned relative to carriage 610 such that portion 615B of piece of flexible material 606A makes an angle as with axis 107. Pulley 108E is positioned relative to carriage 610 such that portion 617B of piece of flexible material 606B also makes angle as with axis 107. Pulley 108C is positioned relative to carriage 610 such that portion 617A of piece of flexible material 606B makes an angle as with axis 107. Pulley 108B is positioned relative to carriage 610 such that portion 615A of piece of flexible material 606A makes an angle as with axis 107. Pulley 108C is positioned relative to carriage 610 such that portion 617A of piece of flexible material 606B makes an angle as with axis 107.

As shown in FIG. 6, rotor 104 has a surface 116A for supporting cables 606A and 606B at a diameter D about axis of rotation 107 and a surface 116B for supporting cable 606A and 606B at a diameter d about axis of rotation 107. As shown in FIG. 5, rotor 104 has first and second right-handed helical grooves about axis of rotation 107, surface 116A being the concave surface of the first groove and surface 116B being the concave surface of the second groove.

Figure 37:
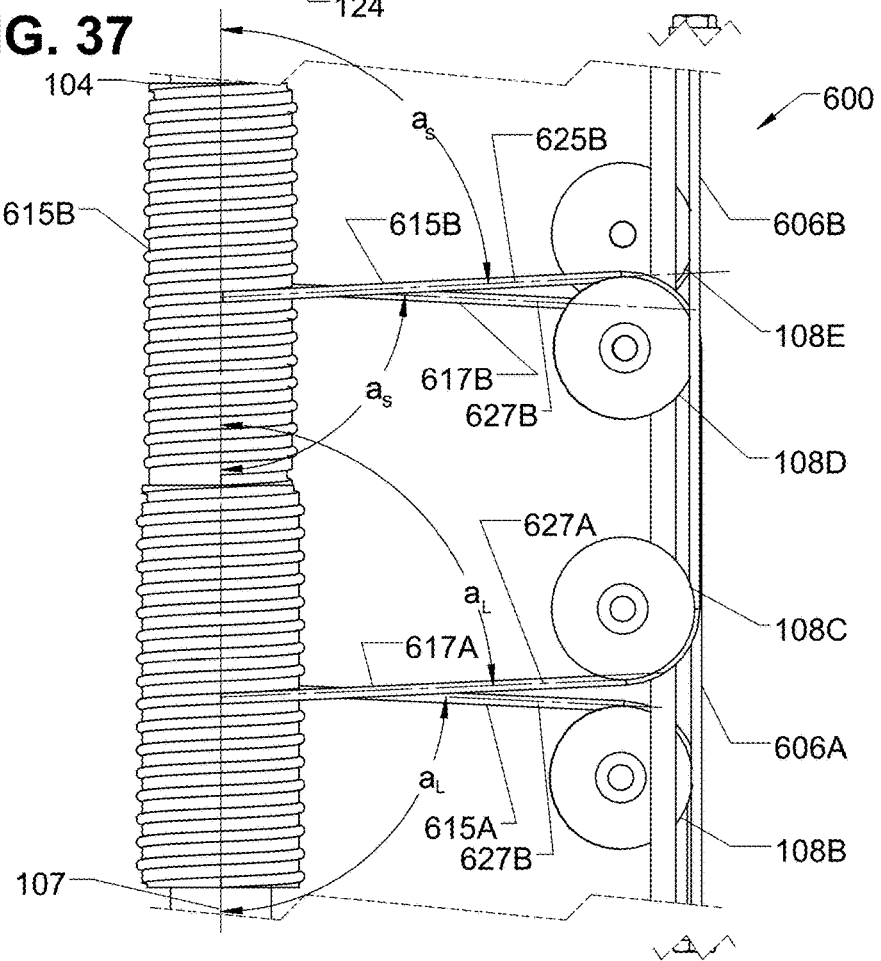
FIG. 37 is a top view of transmission system 600 (with two breaks to save space).

As shown in FIG. 37, piece of flexible material 606A is helically wound with lead l around surface 116B (as shown in FIG. 6) of rotor 104 and has a straight portion 615B between rotor 104 and pulley 108D defining an axis 625B. Axis of rotation 107 and axis 625B define an acute angle as preferably within 30%, more preferably within 15%, most preferably within 5% of the value given by:

$$\arctan\left(\frac{\pi(d+t)}{l}\right)$$

The above will be referred to as expression 3. In the expression, t is the thickness of the piece of flexible material. The thickness of a piece of flexible material wound around a surface of diameter D about axis of rotation 107 is the thickness of the piece of flexible material in the radial direction relative to axis of rotation 107. For example, if the piece of flexible material is a belt, then the thickness of the piece of flexible material would be the thickness of the belt. If the piece of flexible material was a piece of round cable, then the thickness of the piece of flexible material would be the diameter of the cable. If the thickness of the piece of flexible material is relatively small in comparison to the diameter D, $a_s$ can be approximated by assuming t is zero, reducing the above expression to:

$$\arctan\left(\frac{\pi d}{l}\right)$$

The above will be referred to as expression 4. Similarly, piece of flexible material 606B is helically wound with lead l around surface 116B (as shown in FIG. 6) of rotor 104 and has a straight portion 617B between rotor 104 and pulley 108E defining an axis 627B. Axis of rotation 107 and axis 627B define the same acute angle $a_s$ preferably within 30%, more preferably within 15%, most preferably within 5% of the value given by the above two expressions.

Similarly, piece of flexible material 606B is helically wound with lead l around surface 116A (as shown in FIG. 6) of rotor 104 and has a straight portion 617A between rotor 104 and pulley 108C defining an axis 627A. Axis of rotation 107 and axis 627A define the acute angle $a_L$ preferably within 30%, more preferably within 15%, most preferably within 5% of the value given by relationship 3 from above.

If the thickness of the piece of flexible material is relatively small in comparison to the diameter D, $a_L$ can be approximated by assuming t is zero, reducing the above expression to relationship 4 from above.

Similarly, piece of flexible material 606A is helically wound with lead l around surface 116A (as shown in FIG. 6) of rotor 104 and has a straight portion 615A between rotor 104 and pulley 108B defining an axis 627B. Axis of rotation 107 and axis 627B define the same acute angle $a_L$ preferably within 30%, more preferably within 15%, most preferably within 5% of the value given by the above two expressions.

By utilizing the angles $a_L$ and $a_s$ above, portions 615A, 615B, 617A, and 617B are less likely to slip out of the grooves, as any tension on pieces of flexible material 606A and 606B is directed substantially along the groove, instead of to the side of it. This is particularly advantageous for embodiments of rotor 104 incorporating large lead angles.

FIG. 38 is a perspective view of a transmission system 700. FIG. 39 is a side view of transmission system 700. FIG. 40 is a partial top view of transmission system 700. As shown in FIG. 38, transmission system 700 comprises a support 702, a first plurality of pulleys coupled to support 702, a piece of flexible material 706A (in this particular embodiment, a cable 706A), a rotor 704, a carriage 710, and a second plurality of pulleys coupled to carriage 710. The first plurality of pulleys comprises a pulley 708B and a pulley 708D. Rotor 704 is coupled via blocks 720A and 720B to support 702 such that rotor 704 can rotate about axis of rotation 107 relative to support 702. A motor mount 722 supports motor 112, the shaft of which is coupled to rotor 704 such that when the shaft of motor 112 rotates, rotor 704 rotates. Rotor 704 has a surface 716A (in this particular embodiment, the concave portion of a groove in rotor 704) for supporting piece of flexible material 706A at a diameter D about axis of rotation 107. Carriage 710 is coupled to support 702 such that carriage 710 is constrained to slide parallel to axis of rotation 107 of rotor 704. The second plurality of pulleys comprises a pulley 708A, a pulley 708C, and a pulley 708E. Cable 706A is coupled to rotor 704 near the right side of FIG. 38, then helically wound clockwise (when viewing transmission 700 from the right in FIG. 38) around surface 716A of rotor 704 with a lead l, then wrapped around pulley 708A, then wrapped around the pulley 708B, then wrapped around pulley 708C, then wrapped around pulley 708D, then wrapped around pulley 708E, then coupled to support 702 via a stop 738A (which is hidden from view in FIG. 38, but visible on the left side of FIG. 39). Surface 716A in this particular embodiment is the concave inside surface of a helical groove of semi-circular cross-section in rotor 704 sized to receive cable 706A.

As shown in FIG. 39, a straight portion 715 of cable 706A extends between pulley 708A and rotor 704, and defines an axis 715A that makes an angle "A" with axis 107. Pulley 708A is positioned relative to rotor 704 such that angle "A" is preferably within 30%, more preferably within 15%, most preferably within 5% of the value given by expression 3 from above, where t is the thickness of the piece of flexible material (in this particular embodiment, cable 706A). If the thickness of the piece of flexible material is relatively small in comparison to the diameter D, A can be approximated by assuming t is zero, reducing relationship 3 to relationship 4.

In operation, when rotor 704 is rotated counterclockwise (when viewing transmission 700 from the right in FIG. 39), cable 706A winds around rotor 704. As cable 706A winds around rotor 704, the five portions of cable 706A shown in FIG. 40 spanning 1) between pulley 708A and 708B, 2) between pulley 708B and 708C, 3) between 708C and 708D, 4) between 708D and 708E, and 5) between 708E and support 702 all shorten in length, drawing carriage 710 toward the left of FIG. 39. The lead l of piece of flexible material 706A around rotor 704 (as well as the helical groove of surface 716A of rotor 704) is preferably within 30%, more preferably within 15%, most preferably within 5% of:

$$\sqrt{\frac{\pi^2(D+d)^2}{N^2-1}}$$

The above will be referred to as expression 5, where:
D is the diameter of rotor 704 at the bottom of surface 716A of the helical groove of rotor 704, measured at the base of the groove as shown for helical groove 116A in FIG. 6.

If rotor 704 doesn't have a helical groove, the outside diameter of rotor 704 is used instead.

d is termed the "thickness" of pieces of flexible material 706A and 706B, equal to their diameter if they are cables, or equal to their thickness if they are of a rectangular (or other) cross-section.

N is the number of portions of piece of flexible material 716A between the first and second plurality of pulleys (and support 702) on the left side of FIGS. 38 and 39. In transmission system 700, N is equal to 5 (5 portions between five pulleys and support 702). Other embodiments may have different numbers portions of pieces of flexible material between the first and second plurality of pulleys (and the support).

If the thickness of the piece of flexible material is relatively small in comparison to the diameter D, expression 5 can be reduced to:

$$\sqrt{\frac{\pi^2 D^2}{N^2 - 1}}$$

The above will be referred to as expression 6.

The components above carriage 710 to be pulled toward the left of FIG. 38. To pull carriage 710 to the right of FIG. 39, cable 706B and pulleys 709A, 709B, 709C, 709D, and 709E are added. Cable 706B is coupled to rotor 704 near the left side of FIG. 39, then helically wound counterclockwise (when viewing transmission 700 from the right in FIG. 39) around surface 716A of rotor 704 with a lead l, then wrapped around pulley 709A, then wrapped around the pulley 709B, then wrapped around pulley 709C, then wrapped around pulley 709D, then wrapped around pulley 709E, then coupled to support 702 via a stop 738B. Surface 716A in this particular embodiment is the concave inside surface of a semi-circular groove in rotor 704 sized to receive cables 706A and 706B.

As shown in FIG. 39, a straight portion 717 of cable 706B extends between pulley 709A and rotor 704, and defines an axis 717A that makes an angle "B" with axis 107. Pulley 709A is positioned relative to rotor 704 such that B is preferably within 30%, more preferably within 15%, most preferably within 5% of the value given by expression 3 from above, where t is the thickness of the piece of flexible material (in this particular embodiment, cable 706B). If the thickness of the piece of flexible material is relatively small in comparison to the diameter D, B can be approximated by assuming t is zero, reducing relationship 3 to relationship 4.

The lead l of piece of flexible material 706B around rotor 704 is preferably within 30%, more preferably within 15%, most preferably within 5% of expression 5. If the thickness of the piece of flexible material 706B is relatively small in comparison to the diameter D, expression 5 can be reduced to expression 6.

In operation, as rotor 704 is rotated counterclockwise, the cable portions on the left of FIG. 39 contract while the cable portions on the right of FIG. 39 lengthen. Similarly, when rotor 704 is rotated clockwise, the cable portions on the right of FIG. 39 contract while the cable portions on the left of FIG. 39 lengthen.

FIG. 40 illustrates a partial top view of transmission system 700, showing axes 364, 365, 366, 367, and 368 defined by the five portions of cable 706A on the left of FIG. 39. Axes 364, 365, 366, 367, and 368 are all parallel to axis of rotation 107. The corresponding axes of the portions of cable 706B on the right of FIG. 39 are also all parallel to axis of rotation 107. Both sets of portions are parallel to axis of rotation 107 for the same reasons discussed above that cables 106A and 106B are parallel to axis of rotation 107 in transmission system 100.

FIG. 41 illustrates a cross-sectional view of transmission system 700, the cross-section taken as shown in FIG. 39. FIG. 42 is a top view of pieces of flexible material 706A and 706B.

Figure 71:
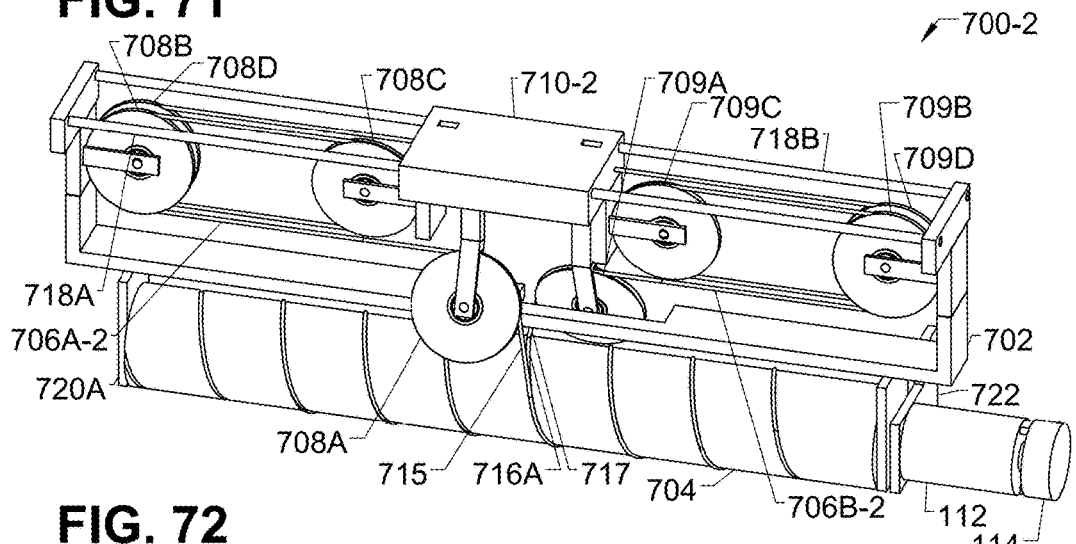
FIG. 71 is a perspective view of transmission system 700-2.
Figure 72:
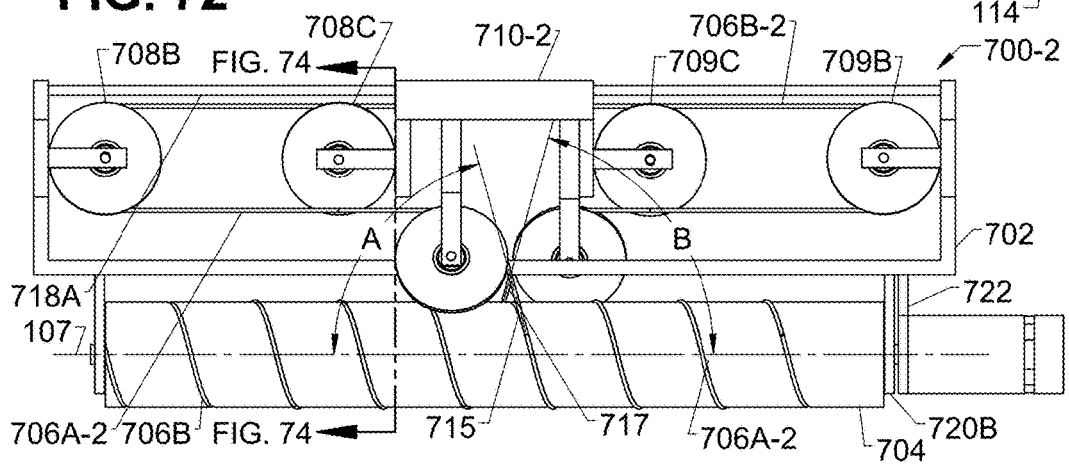
FIG. 72 is a side view of transmission system 700-2 showing the plane and direction of the cross-section of FIG. 74.
Figure 73:
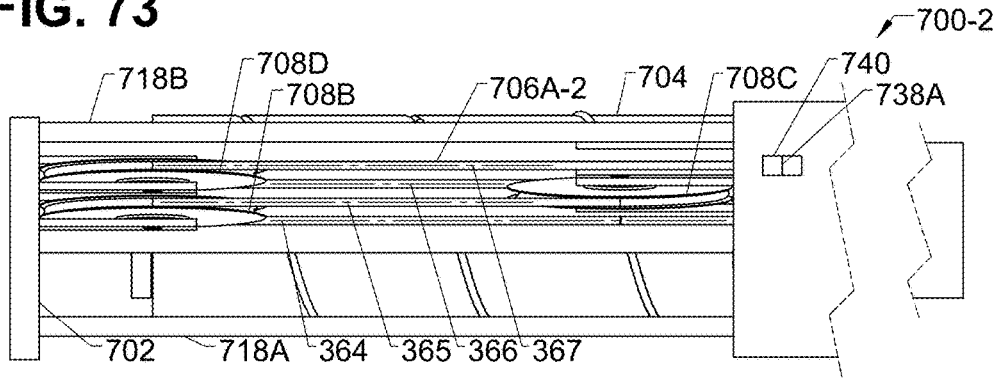
FIG. 73 is a top view of transmission 700-2 with a cut to save space.
Figure 74:
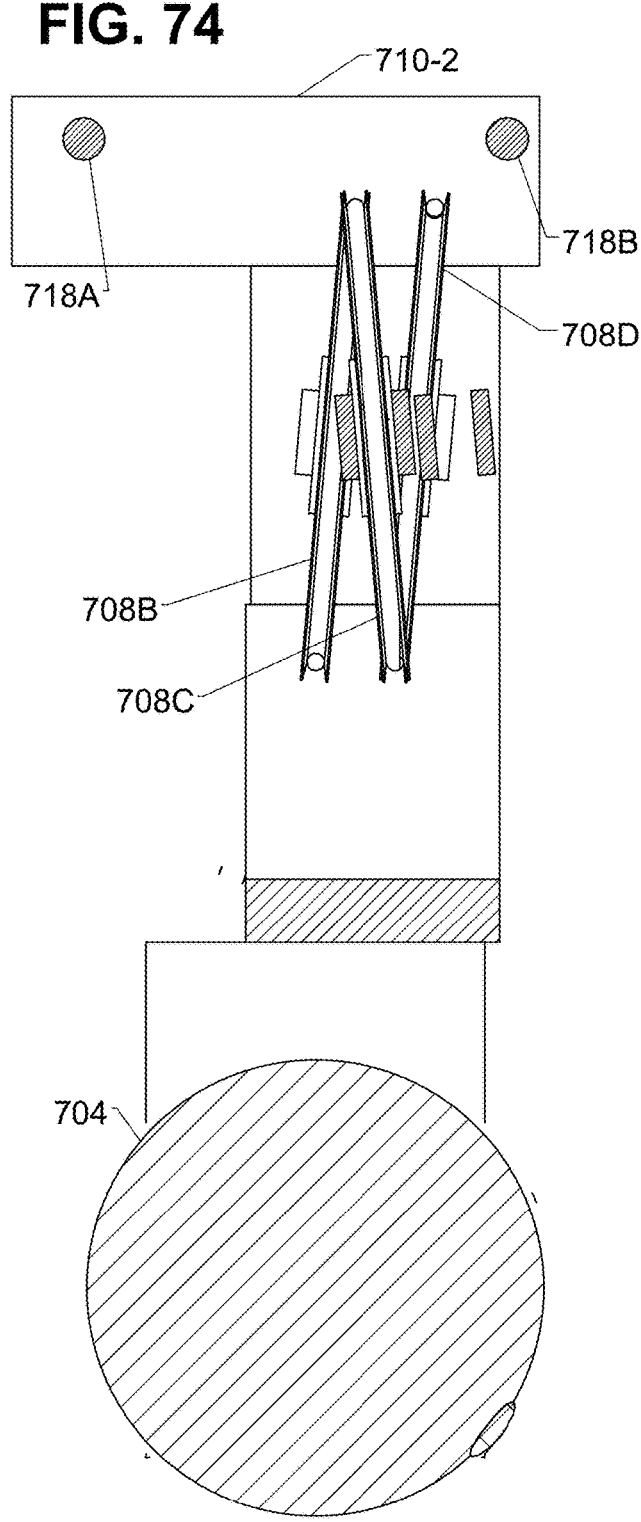
FIG. 74 is a cross-section of transmission system 700-2 showing the set of pulleys for piece of flexible material 706A.
Figure 75:
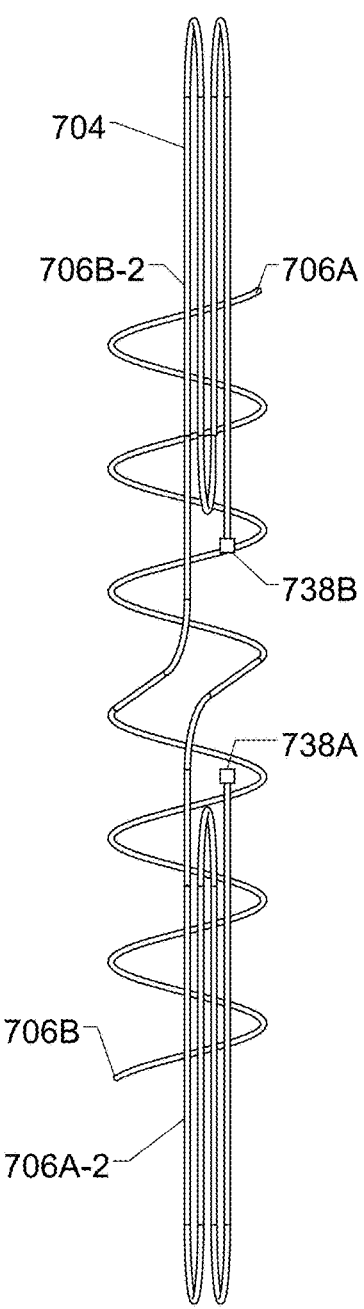
FIG. 75 is a top view of pieces of flexible material 706A and 706B.

FIG. 71 illustrates a transmission system 700-2. Transmission system 700-2 is similar to transmission system 700, but with ends of pieces of flexible material 706A-2 and 706B-2 coupled to the carriage instead of the support (as were pieces of flexible material 706A and 706B of transmission system 700). FIG. 71 is a perspective view of transmission system 700-2. FIG. 72 is a side view of transmission system 700-2. FIG. 73 is a partial top view of transmission system 700-2. FIG. 74 is a cross-sectional view of transmission system 700-2, taken as shown in FIG. 72. FIG. 75 is a top view of pieces of flexible material 706A-2 and 706B-2 of transmission system 700-2. As shown in FIG. 71, transmission system 700-2 comprises support 702, a first plurality of pulleys coupled to support 702, a piece of flexible material 706A-2 (in this particular embodiment, a cable 706A-2), rotor 704, a carriage 710-2, and a second plurality of pulleys coupled to carriage 710-2. The first plurality of pulleys comprises pulley 708B and pulley 708D. Rotor 704 is coupled via blocks 720A and 720B to support 702 such that rotor 704 can rotate about axis of rotation 107 relative to support 702. Motor mount 722 supports motor 112, the shaft of which is coupled to rotor 704 such that when the shaft of motor 112 rotates, rotor 704 rotates. Rotor 704 has surface 716 for supporting piece of flexible material 706A at diameter D about axis of rotation 107. Carriage 710-2 is coupled to support 702 such that carriage 710-2 is constrained to slide parallel to axis of rotation 107 of rotor 704. The second plurality of pulleys comprises pulley 708A and pulley 708C. Cable 706A-2 is coupled to rotor 704 near the right side of FIG. 71, then helically wound clockwise (when viewing transmission 700-2 from the right in FIG. 71) around surface 716A of rotor 704 with a lead l, then wrapped around pulley 708A, then wrapped around the pulley 708B, then wrapped around pulley 708C, then wrapped around pulley 708D, then coupled to carriage 710-2 via stop 738A (which is hidden from view in FIG. 71, but visible in FIG. 73). Surface 716A in this particular embodiment is the concave inside surface of a semi-circular groove in rotor 704 sized to receive cable 706A-2. Cable 706B-2 is similarly routed on the right side of FIG. 71 and coupled with stop 738B to carriage 710-2 as well. Because there are four portions of cables 706A-2 on the left side of FIG. 71 and four portions of cable 706B-2 on the right side of FIG. 71, N in relationships 5 and 6 from above is equal to 4 instead of 5.

Figure 76:
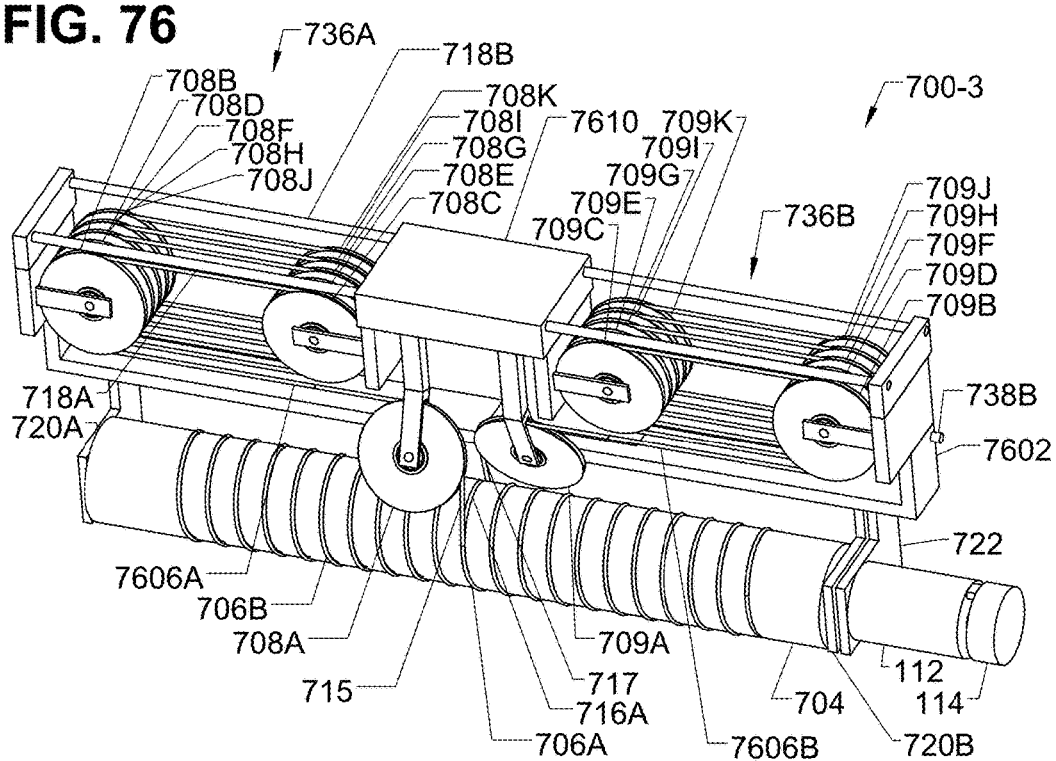
FIG. 76 is a perspective view of transmission system 700-3.

FIG. 76-80 illustrates a transmission system 700-3. Transmission system 700-3 is similar to transmission system 700, but with additional pulleys in both the first and second plurality of pulleys. As shown in FIG. 76, transmission system 700-3 comprises a support 7602, a first plurality of pulleys coupled to support 7602, pieces of flexible material 7606A and 7606B (in this particular embodiment, cables 7606A and 7606B), rotor 704, a carriage 7610, and a second plurality of pulleys coupled to carriage 7610. The first plurality of pulleys comprises a pulley 708B, 708D, 708F, 708H, and a pulley 708J. Rotor 704 is coupled via blocks 720A and 720B to support 702 such that rotor 704 can rotate about axis of rotation 107 relative to support 702. Motor mount 722 supports motor 112, the shaft of which is coupled to rotor 704 such that when the shaft of motor 112 rotates, rotor 704 rotates. Rotor 704 has surface 716A (in this particular embodiment, the concave portion of a groove in rotor 704) for supporting piece of flexible material 7606A at a diameter D about axis of rotation 107. Carriage 7610 is coupled to support 7602 such that carriage 7610 is constrained to slide parallel to axis of rotation 107 of rotor 704. The second plurality of pulleys comprises pulleys 708A, 708C, 708E, 708G, 708I, and 708K. Cable 7606A is coupled to rotor 704 near the right side of FIG. 77, then helically wound clockwise (when viewing transmission 700 from the right in FIG. 77) around surface 716A of rotor 704 with a lead l, then wrapped around pulley 708A, then wrapped around the pulley 708B, then wrapped around pulley 708C, then wrapped around pulley 708D, then wrapped around pulley 708E, then coupled to support 702 via a stop 738A (which is hidden from view in FIG. 76, but visible on the left side of FIG. 77). Surface 716A in this particular embodiment is the concave inside surface of a helical groove of semi-circular cross-section in rotor 704 sized to receive cable 706A.

Transmission system 700-3 comprises support 7602, rotor 704, a first plurality of pulleys coupled a first pulley assembly comprising piece of flexible material 706A and a first plurality of pulleys 708A-708K, a second pulley assembly comprising piece of flexible material 706B and pulleys 709A-709K, and a carriage 710. Rotor 704 is coupled to support 702 via blocks 720A and 720B such that rotor 704 can rotate relative to support 702 about axis 107 defined by rotor 704 (axis 107 is shown in FIG. 39). Carriage 710 slides back and forth parallel to axis 107. Second pulley 708A, third pulley 708C, as well as pulleys 708E, 708G, 708I, 708K, 709C, 709E, 709G, 709I, and 709K are coupled to carriage 710 such that they can rotate relative to carriage 710. First pulley 708B, fourth pulley 708D, as well as pulleys 708F, 708H, 708J, 709B, 709D, 709F, 709H, and 709J are coupled to support 702 such that they can rotate relative to support 702.

Pieces of flexible material 706A and 706B are comprised of steel cable in transmission system 700-3, although in alternative embodiments a different material or alternatively a belt could be used. Rotor 704 has a helical groove 716 to help guide pieces of flexible material 7606A and 7606B. In transmission system 700-3, helical groove 716 is right-handed, although in other embodiments a left-handed helical groove could be used. When viewing rotor 704 in the direction along axis 107 from rotor 704 toward motor 112, piece of flexible material 7606B is coupled to rotor 704 on the left side of FIG. 39, then wound clockwise around rotor 704, then wrapped around pulley 709A, then wrapped around pulley 709B, then pulley 709C, then pulley 709D, then pulley 709E, then pulley 709E, then pulley 709F, then pulley 709G, then pulley 709H, then pulley 709I, then pulley 709J, then pulley 709K, then coupled to support 702 via a cable stop 738B. In some embodiments, a tensioner may be added to pull on cable stop 738B so as to tension piece of flexible material 706B. Similarly, when viewing rotor 704 in the direction along axis 107 from rotor 704 toward motor 112, piece of flexible material 706A is coupled to rotor 704 on the right side of FIG. 39, then wound counterclockwise around rotor 704, then wrapped around 708A, then wrapped around pulley 708B, then pulley 708C, then pulley 708D, then pulley 708E, then pulley 708F, then pulley 708G, then pulley 708H, then pulley 708I, then pulley 708J, then pulley 708K, then coupled to support 702 via a cable stop 738A.

Figure 77:
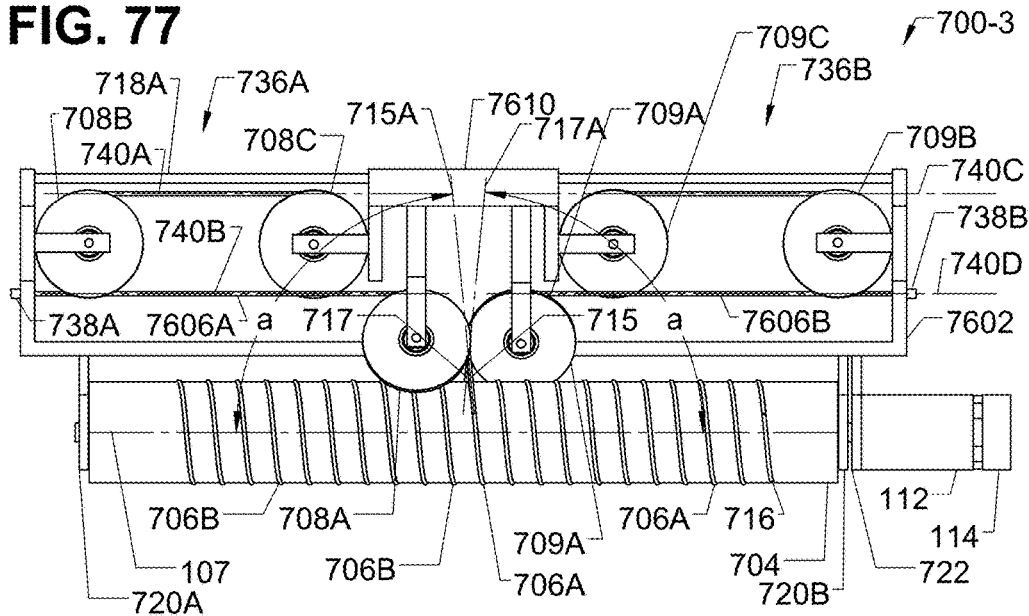
FIG. 77 is a side view of transmission system 700-3.

Referring to FIG. 77, carriage 710 stays substantially parallel to axis 107 as it moves along shafts 718A and 718B (in this embodiment, carriage 710 has two holes which closely fit around shafts 718A and 718B). Each portion of a piece of flexible material between two pulleys defines an axis, such as axes 740A and 740B of piece of flexible material 7606A on the left side of FIG. 77, and axes 740C and 740D of piece of flexible material 706B on the right side of FIG. 77. The pulleys of transmission system 700 are sized and positioned such that these axes are substantially parallel with axis 107 and remain so throughout the travel of carriage 710. FIG. 80 is a top view of pieces of flexible material 706A and 706B, showing how each portion between pulleys is substantially parallel to axis 107.

As shown in FIG. 77, a portion 715 of piece of flexible material 706A defines an axis 715A, and a portion 717 of piece of flexible material 706B defines an axis 717A. Axes 715A and 717A define an angle "a" relative to axis 107. Angle "a" is preferably within 30% of the helix angle of helical groove 716 of rotor 704, more preferably "a" is within 15% of the helix angle of helical groove 716 of rotor 704, most preferably "a" is within 5% of the helix angle of helical groove 716 of rotor 704.

In operation, rotation of rotor 704 in a clockwise direction (when viewing rotor 704 in the direction along axis 107 from rotor 704 toward motor 112) causes piece of flexible material 706A to wind around rotor 704, shortening each portion of piece of flexible material 706A between pulleys 708A through 708K and between pulley 708K and support 702, causing carriage 710 to be pulled toward the left of FIG. 77. Simultaneously, the clockwise rotation of rotor 704 causes piece of flexible material 706B to unwind from rotor 704, lengthening each portion of piece of flexible material 706B between pulleys 709A through 709K and between pulley 709K and support 702. Portion 715 of piece of flexible material 706A and portion 717 of piece of flexible material 706B move toward the left of FIG. 77 during the shortening of the portions of flexible 706A and the lengthening of the portions of piece of flexible material 706B. The lead of pieces of flexible material 706A and 706B as they are wound around rotor 704 (as well as helical groove 716 of rotor 704, if present) is preferably within 30% of l from the following equation, more preferably within 15% of l from the following equation, most preferably within 5% of l from the following equation:

$$l = \sqrt{\frac{\pi^2(D+t)^2}{N^2-1}}$$

Where:

D is the diameter of rotor 704 at the bottom of helical groove 716, measured at the base of the groove as shown for helical groove 116A in FIG. 6. If rotor 704 doesn't have a helical groove, the outside diameter of rotor 704 is used instead.

t is termed the "thickness" of pieces of flexible material 706A and 706B, equal to their diameter if they are cables, or equal to their thickness if they are of a rectangular cross-section.

N is the number of portions of piece of flexible material 716A between pulleys on the left side of FIGS. 38 and 39. In transmission system 700, N is equal to 11 (10 portions between the two sets of five pulleys and support 702, and the 11th portion between pulleys 708A and 708B). Other embodiments may have different numbers of pulleys and hence different numbers of portions of pieces of flexible material.

FIG. 78 is a side view of transmission system 700-3 showing the plane and direction of the cross-section of FIG. 79. FIG. 79 is a cross-section of transmission system 700-3 showing the set of pulleys for piece of flexible material 706A. As shown in FIG. 79, each pulley is at an angle "b" relative to the next pulley. This advantageously allows identical pulleys to be used for all 10 pulleys (other embodiments may use different numbers of pulleys). Preferably the angle "b" is less than 90 degrees, more preferably less than 45 degrees, most preferably less than 22.5 degrees. FIG. 80 is a top view of pieces of flexible material 7606A and 7606B.

Figure 43:
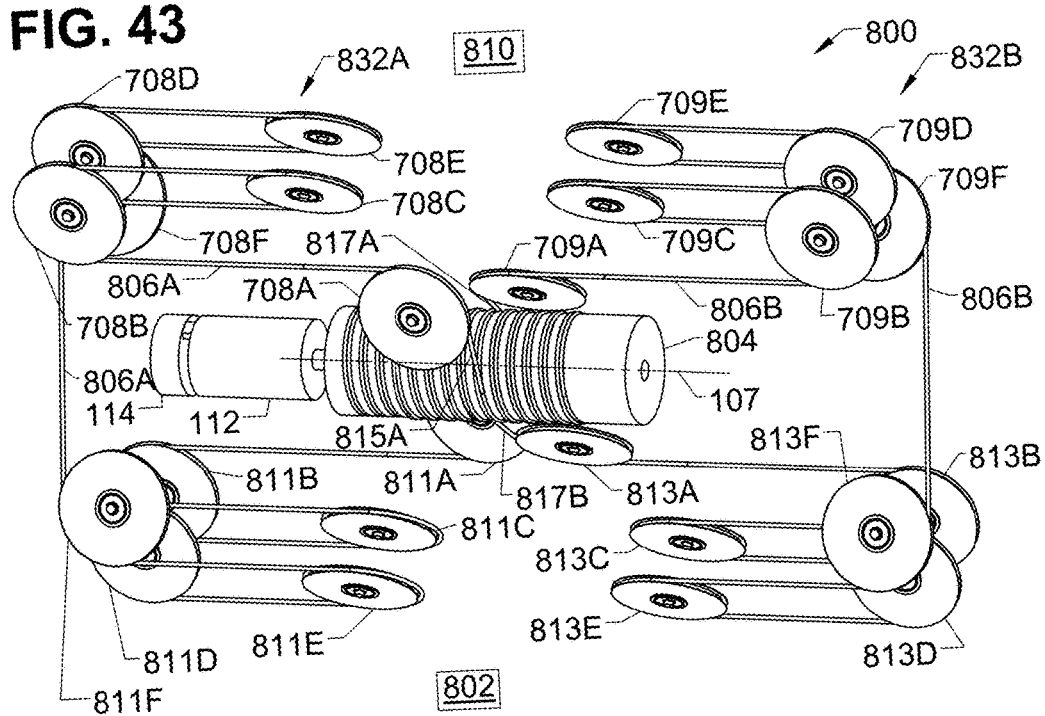
FIG. 43 is a perspective view of transmission system 800.
Figure 44:
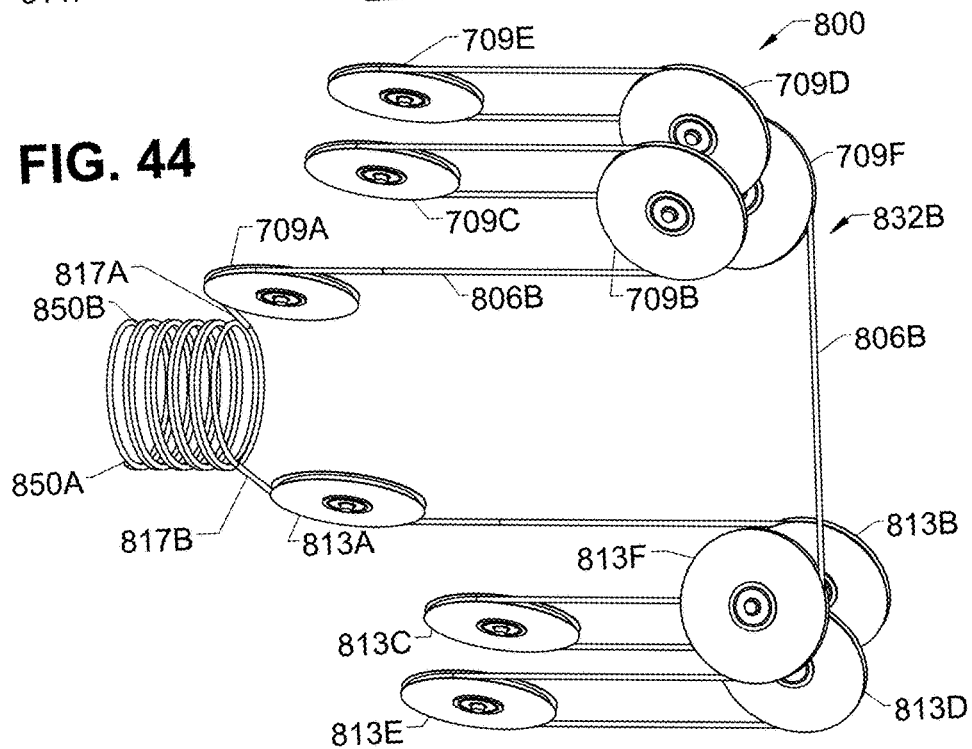
FIG. 44 is a perspective view of pulley assembly 832B of transmission system 800.
Figure 45:
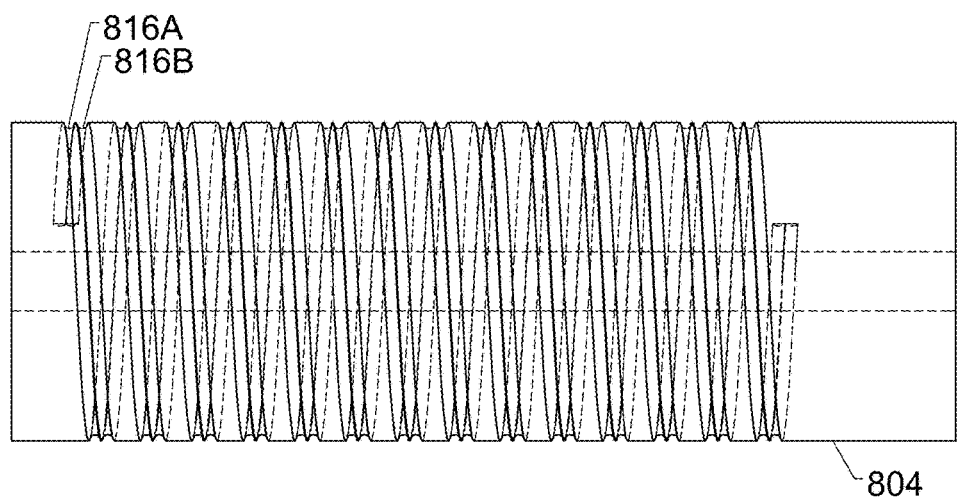
FIG. 45 is a side view of rotor 804 with hidden lines visible.
Figure 46:
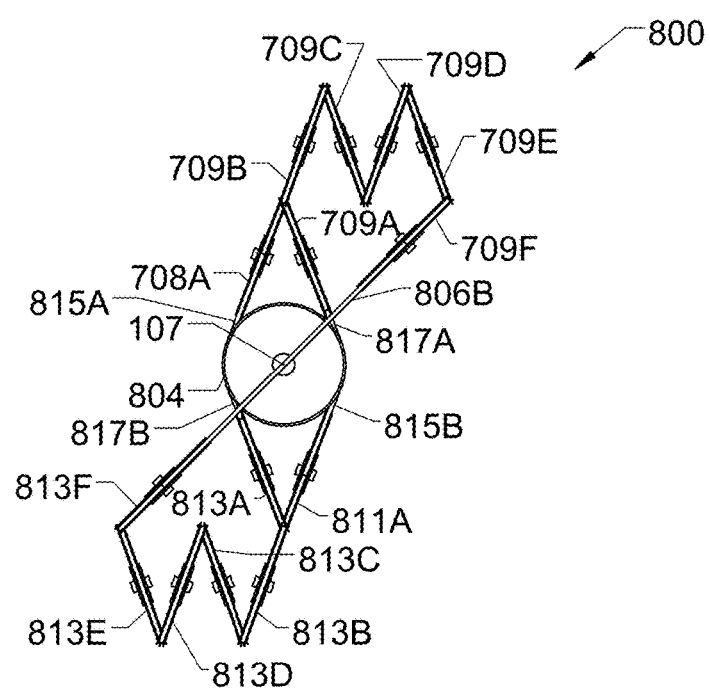
FIG. 46 is a front view of transmission system 800.

FIG. 43 is a perspective view of a transmission system 800. Transmission system 800 comprises a support 802, a rotor 804, a first pulley assembly 832A comprising piece of flexible material 806A, pulleys 708A-708F and pulleys 811A-811F, a second pulley assembly 832B comprising piece of flexible material 806B, pulleys 709A-709F and pulleys 813A-813F, and a carriage 810. FIG. 44 is a perspective view of pulley assembly 832B of transmission system 800, taken from the same direction as FIG. 43 (note that rotor 804 is not shown in FIG. 44 to reveal more detail for piece of flexible material 806B, but it would be oriented and positioned relative to piece of flexible material 806B in the same way as it is in FIG. 43). FIG. 45 is a side view of rotor 804 with hidden lines visible. FIG. 46 is a front view of transmission system 800. Support 802 and carriage 810 are represented schematically in FIG. 43. Pulleys 708A, 708C, 708E, 811C, 811E, 813C, 813E, 709A, 709C, and 709E are coupled to carriage 810 such that they can each rotate relative to carriage 810. Motor 112 is coupled to support 802. Rotor 804 is coupled to support 802 such that it can rotate about axis of rotation 107. Pulleys 811B, 811D, 811F, 708B, 708D, 708F, 709B, 709D, 709F, 813B, 813D, and 813F are coupled to support 802 such that they can each rotate relative to support 802. Carriage 810 is coupled to support 802 such that it can slide back and forth along axis 107.

In transmission system 700, tension on pieces of flexible material 706A and 706B pulled on rotor 704 from one side, producing a sideload on rotor 704. Advantageously, in transmission system 800, tension on pieces of flexible material 806A and 806B may substantially reduce such sideloads on rotor 804. As may be seen in FIG. 46, equal tension on portions 815A and 815B would tend to exert a torque on rotor 804, but substantially little or no net force (assuming the tensions on portions 815A and 815B are substantially the same). The tensions on portions 815A and 815B are advantageously equalized because they are eventually connected together by the portion of piece of flexible material 806A extending between pulleys 708F and 811F, as shown on the left side of FIG. 43. Similarly, equal tensions on portions 817A and 817B in FIG. 46 would tend to exert a torque on rotor 804, but substantially little or no net force as well. The tensions on portions 817A and 817B are also equalized because they are eventually connected together by the portion of piece of flexible material 806B extending between pulleys 709F and 813F, as shown on the right side of FIG. 43.

Pulleys 708A, 708C, 708E, 709A, 709C, 709E, 811A, 811C, 811E, 813A, 813C, AND 813E are rotably coupled to carriage 810 such that they can rotate relative to carriage 810. The remaining pulleys are rotably coupled to support 802. Motor 112 is coupled to rotor 804 such when the shaft of motor 112 rotates, rotor 804 rotates with it.

Pieces of flexible material 806A and 806B are steel cables in transmission system 800, although in alternative embodiments other materials or cross-sections, such as a belt, could be used.

FIG. 45 is a side view of rotor 804 showing grooves 816A and 816B used to guide pieces of flexible material 806A and 806B. As shown in FIG. 45, rotor 804 has two helical grooves 816A and 816B. Helical grooves 816A and 816B are both right-handed, although in other embodiments left-handed helical grooves could be used.

As shown in FIGS. 43 and 44, starting at end 850A, cable 806B is coupled to rotor 804 toward the left side of FIG. 43, then wound counterclockwise around rotor 804 (when viewing rotor 804 in the direction from rotor 804 toward motor 112) in helical groove 816A, then wrapped around pulley 813A, then pulley 813B, then pulley 813C, then pulley 813D, then pulley 813E, then pulley 813F, then pulley 709F, then pulley 709E, then pulley 709D, then pulley 709C, then pulley 709B, then pulley 709A, then wound clockwise around rotor 804 (when viewing rotor 804 in the direction from rotor 804 toward motor 112) in helical groove 816B, then coupled to rotor 804 at end 850B.

As shown in FIG. 43, cable 806A is coupled to rotor 804 toward the right side of FIG. 43, then wound clockwise around rotor 804 (when viewing rotor 804 in the direction from rotor 804 toward motor 112) in helical groove 816A, then wrapped around pulley 811A, then pulley 811B, then pulley 811C, then pulley 811D, then pulley 811E, then pulley 811F, then pulley 708F, then pulley 708E, then pulley 708D, then pulley 708C, then pulley 708B, then pulley 708A, then wound counterclockwise around rotor 804 (when viewing rotor 804 in the direction from rotor 804 toward motor 112) in helical groove 816B, then coupled to rotor 804.

Referring to FIG. 44, in operation, rotation of rotor 804 in a clockwise direction (when viewing rotor 804 in the direction along axis 107 from rotor 804 toward motor 112) causes piece of flexible material 806B to wind around rotor 804, shortening each portion of piece of flexible material 806B between pulleys 709A through 709F and between pulley 813A through 813F, causing pulleys 709A, 709C, 709E, 813A, 813C, and 813E (and thus carriage 810) to be pulled toward the right of FIG. 38. Referring to FIG. 43, simultaneously piece of flexible material 806A is unwinds from rotor 804, lengthening each portion of piece of flexible material 806A between pulleys 708A through 708F and between 811A through 811F. Rotation of rotor 804 in a counterclockwise direction causes piece of flexible material 806B to unwind from rotor 804, and also causes piece of flexible material 806A to wind around rotor 804, causing pulleys 708A, 708C, 708E, 811A, 811C, and 811E (and thus carriage 810) to be pulled toward the left of FIG. 43. FIG. 44 shows the routing of cable 806B in pulley assembly 832B of transmission system 800.

Figure 47:
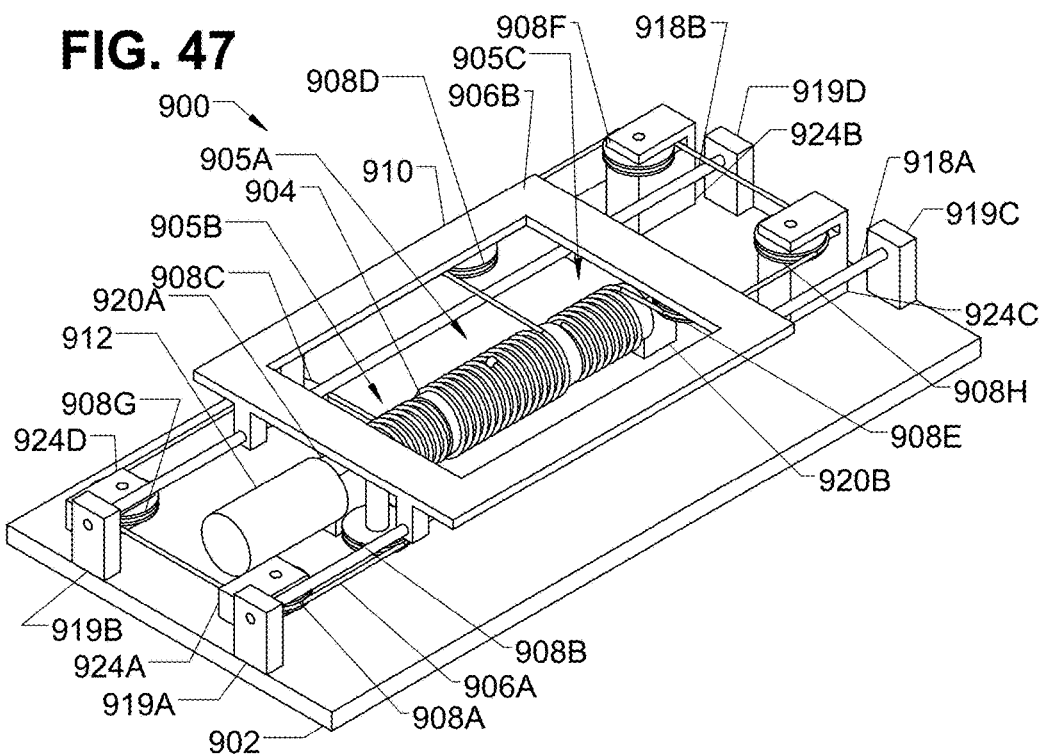
FIG. 47 is an isometric perspective view of transmission system 900.
Figure 53:
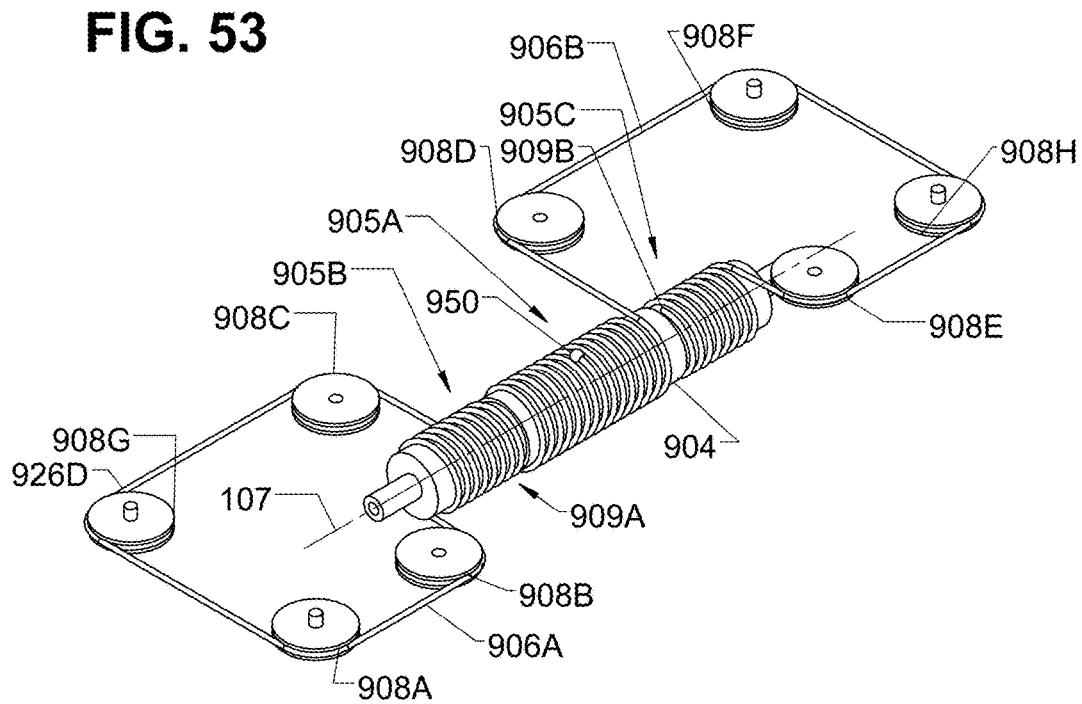
FIG. 53 is a perspective view of rotor 904, pieces of flexible material 906A and 906B, and pulleys 908A, 908B, 908C, 908D, 908E, 908F, 908G, 908H.

FIG. 47 is a perspective view of a transmission system 900, comprising a support 902, a rotor 904, a single piece of flexible material comprised of pieces of flexible material 906A and 906B, pulleys 908A, 908B, 908C, 908D, 908E, 908F, 908G, 908H, and a carriage 910. Rotor 904 is comprised of differing portions supporting pieces of flexible material 906A and 906B at two differing diameters, a diameter D at center portion 905A and a diameter d at the two outermost portions 905B and 905C. Piece of flexible material 906A (of the single piece of flexible material) is coupled to portion 905B near the transition between portion 905B and 905A, then wound counterclockwise (when viewing FIG. 53 from the left along axis 107) around portion 905B so as to form a right-handed helix, then wrapped around pulley 908B, then around a pulley 908A, then around 908G, then around 908C, then wound counterclockwise around portion 905A so as to form a left-handed helix, then coupled to rotor 904 via a stop 950 which rests in a cavity 952. Piece of flexible material 906B (of the single piece of flexible material) then continues from the other side of stop 950 counterclockwise around portion 905A so as to form a left-handed helix, then wrapped around pulley 908D, then pulley 908F, then pulley 908H, then pulley 908E, then wrapped counterclockwise around portion 905C so as to form a right-handed helix, then coupled to rotor 904 near the transition between portion 905C and portion 905A. Advantageously, a single large piece of flexible material (in this particular embodiment, a cable) comprised of two smaller pieces of flexible material 906A and 906B is used. As shown in FIG. 53, the ends of the single large piece of flexible material are end 909A (visible underneath rotor 904 near the transition between portions 905A and 905B) and end 909B (visible on top of rotor 904 near the transition between portions 905A and 905C). Ends 909A and 909B are coupled to rotor 904. A piece of flexible material spans between two points at which the flexible material is coupled to an object; hence, the single large piece of flexible material spans between end 909A and 909B. The single large piece of flexible material is comprised of two smaller pieces of flexible material: a first piece of flexible material 906A between end 909A and stop 950 (which couples the piece of flexible material to rotor 904), and a second piece of flexible material 906B between end 909B and stop 950 (which couples the piece of flexible material to rotor 904). In this particular embodiment, the single large piece of flexible material is a cable comprising pieces of cable 906A and 906B. In an alternative embodiment, pieces of flexible material 906A and 906B could instead be two separate pieces of flexible material, each using its own stop to couple to rotor 905, instead of sharing stop 950. Likewise, in the other embodiments of the present disclosure, a single large piece of flexible material coupled at its ends to a rotor can be used in place of two pieces of flexible material by coupling a point between the two ends to the rotor as well, creating two pieces of flexible material on either side of the point, as is done in transmission system 900.

Figure 48:
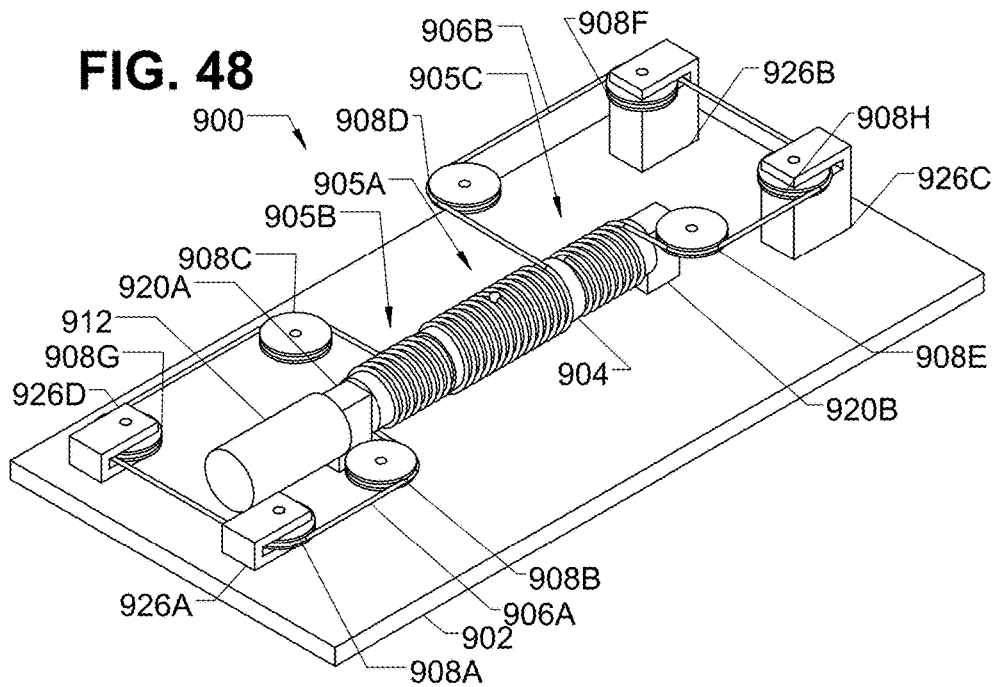
FIG. 48 is an isometric perspective view of transmission system 900 with carriage 910 and associated components hidden.
Figure 49:
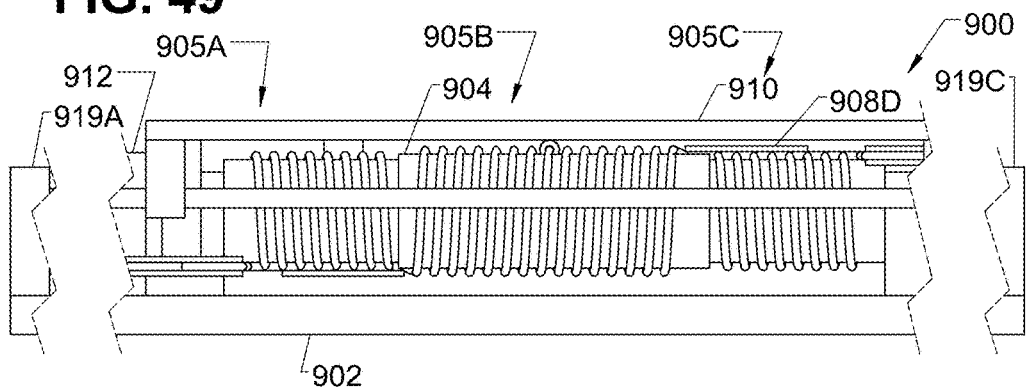
FIG. 49 is a side view of transmission system 900.
Figure 50:
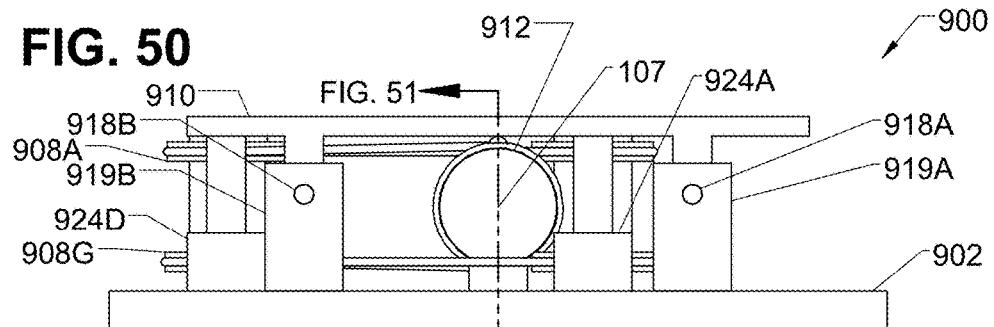
FIG. 50 is a front view of transmission system 900.
Figure 51:
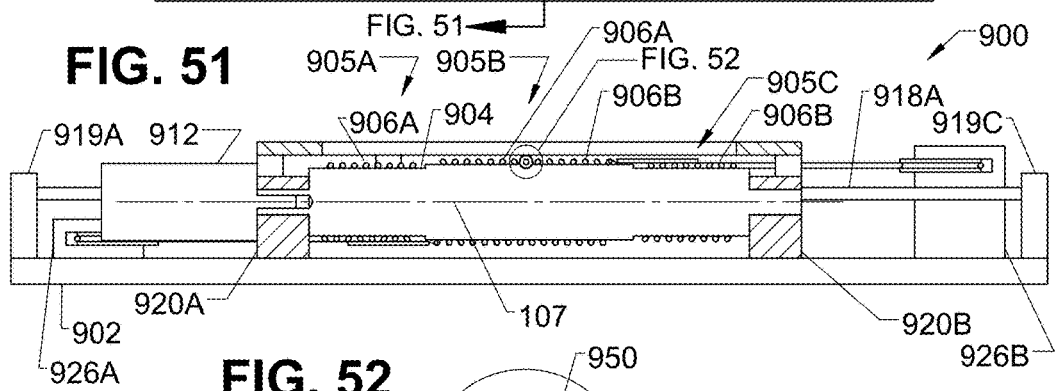
FIG. 51 is a cross-sectional side view of transmission system 900.
Figure 52:
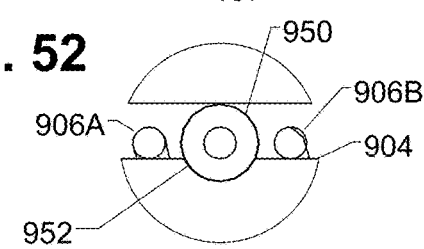
FIG. 52 is a detailed cross-sectional side view of a portion of FIG. 51.

The orientation of pulleys 908A, 908B, 908C, 908D, 908E, 908F, 908G, 908H produce a relatively low profile. FIG. 48 is a perspective view of transmission system 900 with carriage 910 hidden. The housing of a motor 912 is coupled to block 920A, while the shaft of motor 912 is coupled to rotor 904 such that when the shaft turns, rotor 904 turns (and vice versa). FIG. 49 is a side view of transmission system 900, while FIG. 50 is a front view of transmission system 900. FIG. 51 is a cross-sectional view of transmission system 900. FIG. 52 is a detailed view of a portion of FIG. 51 showing how pieces of cable 906A and 906B are coupled to rotor 904. The piece of cable comprised of pieces of cable 906A and 906B has a spherical stop 950 that rests in a cavity 952 in rotor 904 such that spherical stop 950 is constrained from moving relative to rotor 904 when the piece of cable comprised of pieces of cable 906A and 906B is tensioned. FIG. 53 shows the piece of cable comprised of pieces of cable 906A and 906B, along with pulleys 908A, 908B, 908C, 908D, 908E, 908F, 908G, 908H and rotor 904.

Pulleys 908A, 908F, 908H, and 908G are coupled to support 902 via pulley holders 924A, 924B, 924C, and 924D such that pulleys 908A, 908F, 908H, and 908G can rotate relative to support 902. Pulleys 908B, 908C, 908D, and 908E are coupled to carriage 910 such that they can rotate relative to carriage 910. Rotor 904 is comprised of first cylindrical portion 905A, second cylindrical portion 905B, and third cylindrical portion 905C. As shown in FIG. 52, cable segments 906A and 906B are coupled via a stop 950 (secured to the cable) to rotor 904. First cylindrical portion 905A and third cylindrical portion 905C are the same diameter.

Also of note, as can be seen in FIG. 49, is the fact that the outermost cylindrical portions of rotor 904 (portions 905A and 905C) have the piece of cable wrapped in a right-handed helix while the innermost portion (905B) has the piece of cable wrapped in a left-handed helix.

Figure 56:
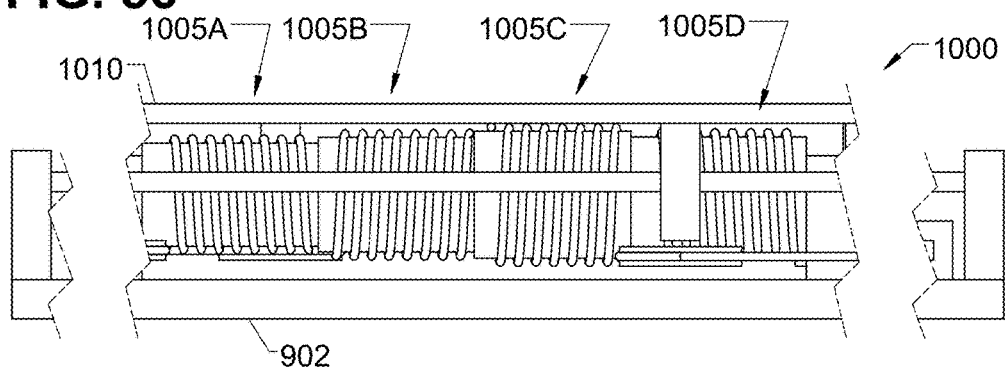
FIG. 56 is a side view of transmission system 1000 with two breaks to save space.
Figure 57:
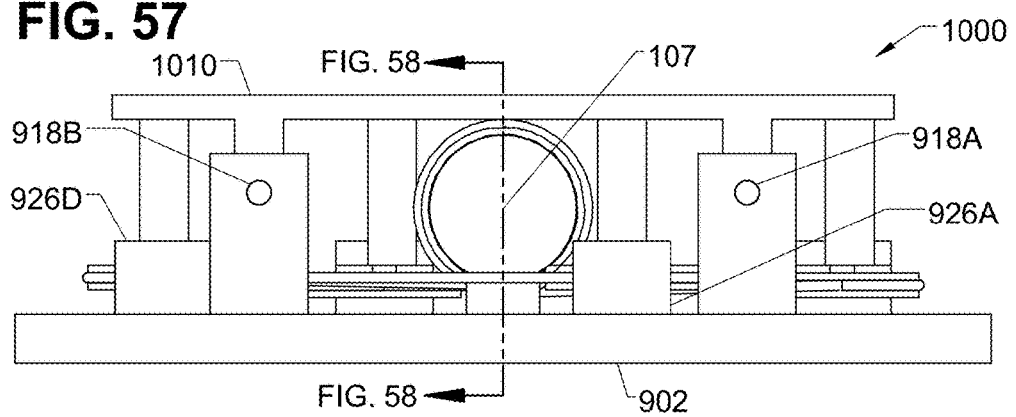
FIG. 57 is a front view of transmission system 1000.

FIG. 54 is a perspective view of a transmission system 1000, comprising support 902, a rotor 1004, a single piece of flexible material comprised of pieces of flexible material 1006A and 1006B, pulleys 908A, 908B, 908C, 908D, 908E, 908F, 908G, 908H, and a carriage 1010. FIG. 55 is a perspective view of transmission 1000 with carriage 1010 hidden. FIG. 56 is a side view of transmission system 1000, while FIG. 57 is a front view of transmission system 1000. Rotor 1004 is comprised of differing portions 1005A, 1005B, 1005C, and 1005D supporting pieces of flexible material 1006A and 1006B at four different diameters. As shown in FIG. 55, piece of flexible material 1006A is coupled to portion 1005A near the transition between portion 1005A and 1005B, then wound counterclockwise (when viewing FIG. 55 from the left along axis 107) around portion 905A so as to form a right-handed helix, then wrapped around pulley 908B, then around a pulley 908A, then around 908G, then around 908C, then wound counterclockwise (when viewing FIG. 55 from the left along axis 107) around portion 1005B so as to form a left-handed helix, then coupled to rotor 1004. Piece of flexible material 906B is coupled to rotor 1004 on portion 1005C near the transition between portions 1005C and 1005B, then wound counterclockwise (when viewing FIG. 55 from the left along axis 107) around portion 1005C so as to form a left-handed helix, then wrapped around pulley 908D, then pulley 908F, then pulley 908H, then pulley 1008E, then wrapped counterclockwise (when viewing FIG. 55 from the left along axis 107) around portion 905C so as to form a right-handed helix, then coupled to rotor 904 on portion 1005D near the transition between portion 1005C and portion 1005D.

Figure 58:
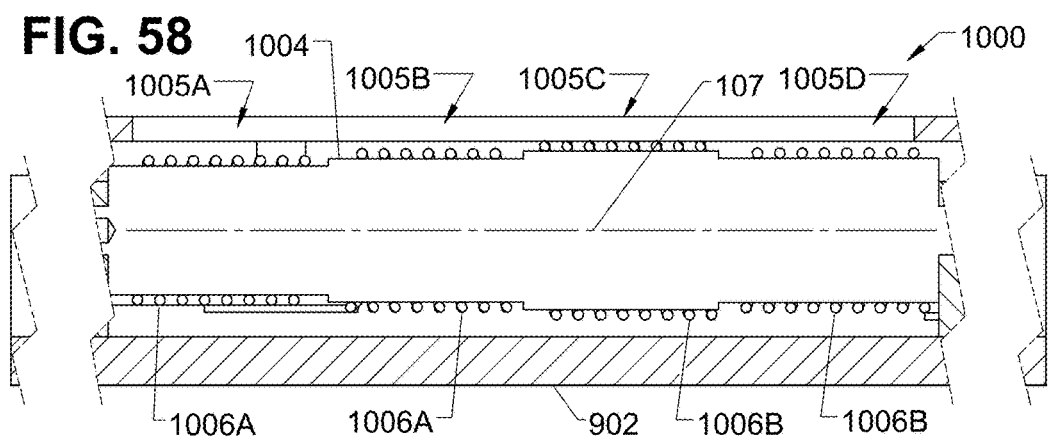
FIG. 58 is a side cross-sectional view of transmission system 1000.

As can be seen in FIG. 58, which is a cross-sectional view of transmission system 1000, rotor 1004 has first cylindrical portion 1005A, second cylindrical portion 1005B, third cylindrical portion 1005C, and fourth cylindrical portion 1005D. The difference between the diameter of first cylindrical portion 1005A and the diameter of second cylindrical portion 1005B is equal to the difference between the diameter of third cylindrical portion 1005C and fourth cylindrical portion 1005D. As can be seen in FIG. 58, portion 1005B of rotor 1004 supports piece of flexible material 1006A at a larger diameter D than portion 1005A, which supports piece of flexible material 1006A at a diameter d. Expression 2 may be used to calculate D given d and l. Similarly, portion 1005C of rotor 1004 supports piece of flexible material 1006B at a large diameter D2 than portion 1005D, which supports piece of flexible material 1006B at a diameter d2. Expression 2 may be used to calculate D2 given d2 and l.

In an alternative embodiment, the difference between the diameter of first cylindrical portion 1005A and the diameter of second cylindrical portion 1005B differs slightly from the difference between the diameter of third cylindrical portion 1005C and fourth cylindrical portion 1005D. By doing so, the tensions in pieces of flexible material 1006A and 1006B will vary based on the position of carriage 1010, which may be useful in certain circumstances.

As can be seen in FIG. 56, the outermost cylindrical portions of rotor 1004 (portions 1005A and 1005D) have the pieces of flexible material wrapped in a right-handed helix while the innermost portions (1005B and 1005C) have the pieces of cable wrapped in a left-handed helix.

Figure 62:
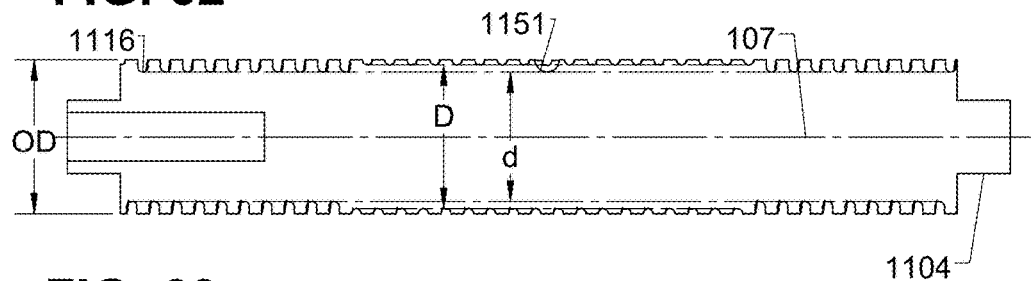
FIG. 62 is a cross-sectional side view of the rotor of transmission system 1100.
Figure 63:
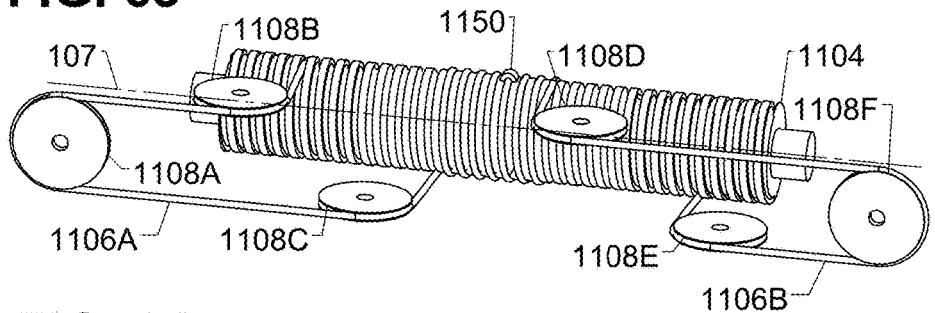
FIG. 63 is a perspective view of the rotor 1104, piece of flexible material 1106A, and pulleys 1108A, 1108B, 1108C, 1108D, 1108E, and 1108F.
Figure 64:
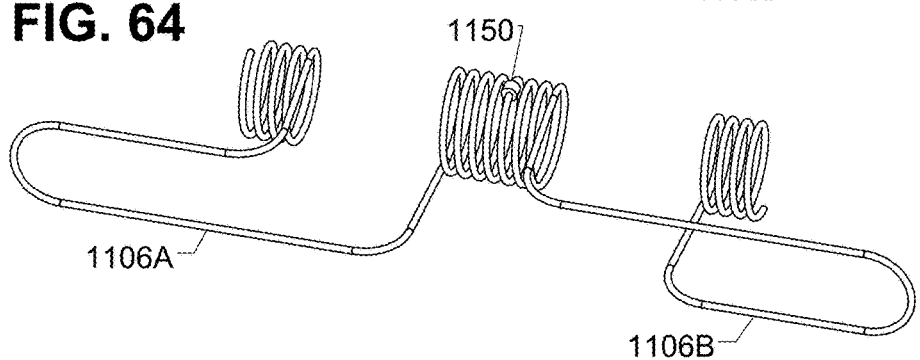
FIG. 64 is a perspective view of the piece of flexible material 1106A of transmission system 1100.

FIGS. 61-64 illustrate an exemplary transmission system 1100. As shown in FIGS. 61-64, transmission system 1100 comprises support 102, pulleys 1108A and 1108F coupled to support 102, a single piece of flexible material comprised of piece of flexible material 1106A and piece of flexible material 1106B, a rotor 1104, a carriage 1110, and pulleys 1108B, 1108C, 1108D, and 1108E coupled to the carriage. Rotor 1104 is coupled to support 102 via blocks 120A and 120B such that rotor 1104 can rotate about axis of rotation 107 relative to support 102. Advantageously, the embodiment of FIGS. 61-64 employs a single piece of flexible material comprised of two smaller pieces of flexible material 1106A and 1106B. Furthermore, rotor 1104 has only a single helical groove. As shown in FIG. 62, the helical groove deepens at either end of rotor 1104, such that the single piece of flexible material is supported at a diameter D about the axis of rotation 107 near the center of rotor 1104 and supported at a diameter d toward either end of rotor 1104. As can be seen in FIG. 63, piece of flexible material 1106B is coupled to rotor 1104 on the right side of FIG. 63, then wound clockwise along rotor 1104 (when viewed from the right in FIG. 63 along axis 107), then wrapped around pulley 1108E, then around 1108F, then around 1108D, then wound clockwise (when viewed from the right in FIG. 63 along axis 107) along rotor 1104, then coupled to a stop 1150, which rests in a cavity 1151 in rotor 1104. From the other side of stop 1150, piece of flexible material 1106A is wound clockwise (when viewed from the right in FIG. 63 along axis 107) around rotor 1104, then is wrapped around pulley 1108C, then around pulley 1108A, then around pulley 1108B, then wound clockwise (when viewed from the right in FIG. 63 along axis 107) around rotor 1104, then coupled to rotor 1104.

Figure 65:
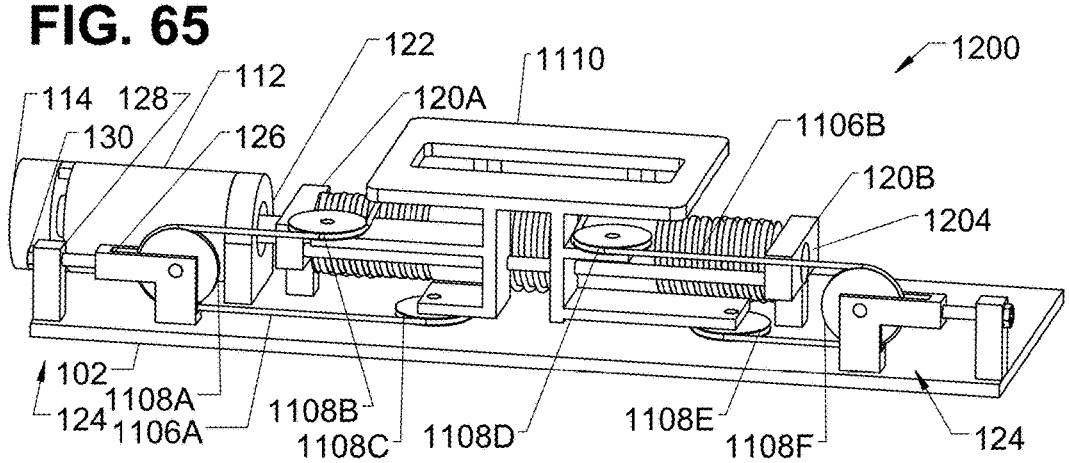
FIG. 65 is a perspective view of transmission system 1200.
Figure 66:
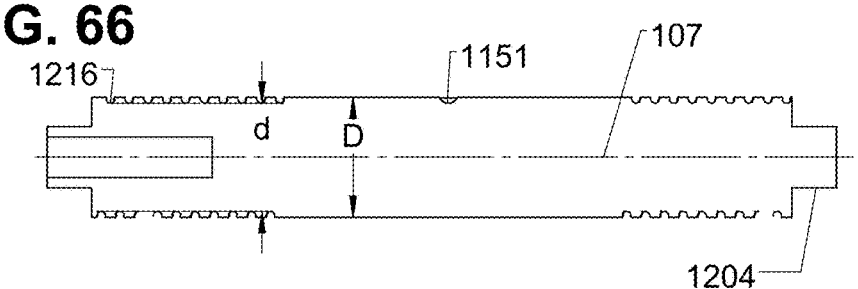
FIG. 66 is a cross-sectional side view of the rotor of transmission system 1200.
Figure 67:
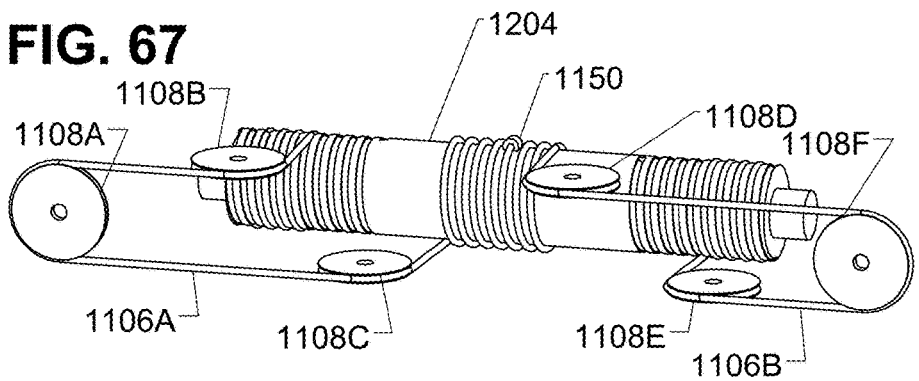
FIG. 67 is a perspective view of the rotor, piece of flexible material 1106A, and pulleys 1108A, 1108B, 1108C, 1108D, 1108E, and 1108F.

FIGS. 65-67 illustrate an exemplary transmission system 1200. As shown in FIGS. 65-67, transmission system 1200 comprises support 102, pulleys 1108A and 1108F coupled to support 102, a single piece of flexible material comprised of pieces of flexible material 1106A and 1106B (in this particular embodiment, pieces of cable 1106A and 1106B), a rotor 1204, carriage 1110, and pulleys 1108B, 1108C, 1108D, and 1108E coupled to the carriage. Rotor 1204 is coupled to support 102 via blocks 120A and 120B such that rotor 1204 can rotate about axis of rotation 107 relative to support 102. As can be seen in FIG. 67, piece of flexible material 1106B is coupled to rotor 1204 on the right side of FIG. 63, then wound clockwise (when viewed from the right in FIG. 67) along rotor 1204, then wrapped around pulley 1108E, then around 1108F, then around 1108D, then wound clockwise along rotor 1204 (when viewed from the right in FIG. 67), then coupled to a stop 1150, which rests in a cavity 1151 in rotor 1204. From the other side of stop 1150, piece of flexible material 1106A is wound clockwise around rotor 1204, then is wrapped around pulley 1108C, then around pulley 1108A, then around pulley 1108B, then wound clockwise (when viewed from the right in FIG. 67) around rotor 1104, then coupled to rotor 1204.

Advantageously, the embodiment of FIGS. 65-67 employs a single piece of flexible material comprised of two smaller pieces of flexible material 1106A and 1106B. Also, as shown in FIG. 66, a helical groove on each side of rotor 1204 support the piece of flexible material at a diameter d about axis of rotation 107, while the center of rotor 1204 is not grooved and supports the piece of flexible material at a diameter D about axis of rotation 107.

Figure 81:
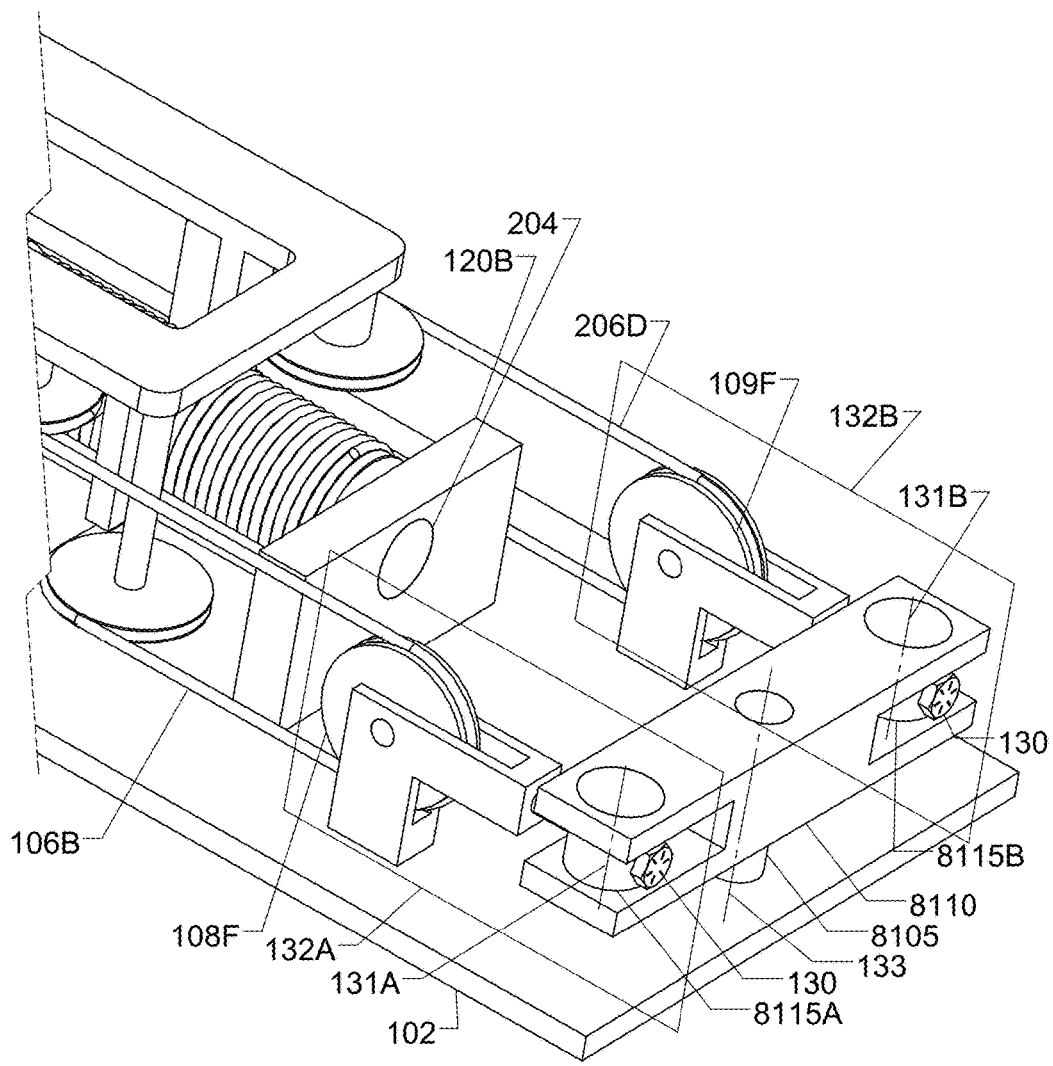
FIG. 81 illustrates a partial perspective view of an alternative embodiment of the transmission system 200.

FIG. 81 illustrates a partial perspective view of an alternative embodiment of the transmission system 200. Tensioner support 128 is removed from each tensioner assembly 124 of transmission system 200. In place of each tensioner support, a link 8110 is coupled to support 102 via a pin 8105 such that it can rotate about a link axis 133 relative to support 102. Pulley 108F is coupled to link 8110 via a rotating support 8115A. Rotating support 8115A looks like a cylinder with a hole drilled perpendicular to the axis of the cylinder and at the center of the cylinder, allowing adjusting screw 130 to pass through it and thread into pulley holder 126. Rotating support 8115A can rotate relative to link 8110 around an axis 131A. Similarly, pulley 109F is coupled to link 8110 via a rotating support 8115B, which can rotate relative to link 8110 around an axis 131B. Link 8110 can rotate around axis 133 relative to support 102 on pin 8105. Axis 131A is the same distance from axis 133 as axis 131B is. The two adjusting screws 130 (one coupled between link 8110 and pulley 108F, the other coupled between link 8110 and pulley 109F) couple pulleys 108F and 109F to link 8110. Pulley 108F defines a plane 132A down its center, such that the portion of piece of flexible material 106B around pulley 108F is split into two equal portions by plane 132A. Similarly, pulley 109F defines a plane 132B down its center, such that the portion of piece of flexible material 206D around pulley 109F is split into two equal portions by plane 132B. The distance between axis 130 of pin 8105 and plane 132A is equal to the distance between link axis 133 and plane 132B. That is, link 8110 is coupled between first plane 132A and second plane 132B such that the link axis 133 is equidistant to the first and second planes 132A and 132B. The tension in piece of flexible material 106B causes a first torque about link axis 133, which is counteracted by the tension in piece of flexible material 206D, which causes a second torque in a direction opposite that of the first torque about link axis 133. Therefore, link 8110 serves to equalize the tension in pieces of flexible material 106B and 206D because it can rotate slightly so as to equalize tension on pulleys 108F and 109F. The same arrangement can be applied to pulleys 108A and 109A in transmission system 200 by lengthening support 102 and pieces of flexible material 106A and 206C, then moving pulleys 108A and 109B further away from carriage 210, such that link 8110 will clear motor 112 and position sensor 114.

FIG. 82 illustrates a schematic top view of an alternative embodiment of transmission system 200. Support 102 is replaced with support 8202, which has additional room for components. Pins 8208A and 8208B are coupled to support 102 such that they are fixed relative to support 102. Pulleys 8206A and 8206B are coupled to pins 8208A and 820B respectively such that they can each rotate relative to support 8202. A piece of flexible material 8204 connects each pulley holder 126 coupled to pulleys 108F and 109F. In operation, tension on piece of flexible material 106B creates tension on piece of flexible material 8204 that is counterbalanced by tension on piece of flexible material 8204 due to tension on piece of flexible material 206D. Therefore, tension on pieces of flexible material 106B and 206D are equalized. Tension on cables 106A and 206C could similarly be balanced by a balancing pulley coupled to the support 8202 such that it can rotate relative to support 8202, first pulley holder 126 coupled to pulley 108A, second pulley holder 126 coupled to pulley 109A, and a piece of flexible material coupled to the first pulley holder, wrapped around the balancing pulley, then coupled to the second pulley holder.

FIG. 83 illustrates a schematic top view of an alternative embodiment of transmission system 200 differing from that of FIG. 82. Support 102 is replaced with support 8202, which has additional room for components. Pin 8208 is coupled to support 102 such that it is fixed relative to support 102. Pulley 8206 is coupled to pin 8208 such that it can rotate relative to support 8202. A piece of flexible material 8205 connects each pulley holder 126 coupled to pulleys 108F and 109F. In operation, tension on piece of flexible material 106B creates tension on piece of flexible material 8205 that is counterbalanced by tension on piece of flexible material 8205 due to tension on piece of flexible material 206D. Therefore, tension on pieces of flexible material 106B and 206D are equalized.

The above exemplary embodiments may be used in reverse; that is, the term "rotary-to-linear" transmission does not preclude using such a transmission system to convert linear motion to rotary motion. For example, in the first embodiment, mechanical work applied to carriage 110 can be used to backdrive transmission system 100 so as to rotate motor 112, making it act as a generator. As another example, it may be desirable to use the embodiments to convert the linear motion of a gas pressing on a piston, or that of a linear motor, a pneumatic piston, a hydraulic piston, or other linear actuator driving the carriage, to the rotary motion of the rotor. A voice coil motor configured for linear movement could be used to drive the carriage back and forth, thereby creating rotational motion at the rotor.

Motor 112 or 912 may be replaced with another type of motor besides a conventional servo or stepper electromagnetic motor, such as a switched-reluctance motor, a voice coil motor configured for rotation, a piezo motor, an electrostatic motor, or a magnetostrictive motor (such as one based on the "inch-worm" principal). A passive component such as a damper or brake could replace motor 112 or 912. A sensor or other transducer, such as a position sensor (for example, a resolver or an encoder) or a velocity sensor, could be used alone or in place of motor 112 or 912 (instead of in addition to a motor).

Another piece of flexible material besides a piece of cable or a piece of belt may be used, for example a piece of filament, a piece of thread. A chain could be substituted for a piece of flexible material. It is contemplated that a piece of flexible material of glass fiber, carbon fiber, aramid fiber, or other composite material, or even a piece of flexible material comprising carbon nanotubes could be used.

When grooves are used in a rotor, the grooves may be semicircular, rectangular, half of a racetrack shape, or trapezoidal in cross-section.

Parts such as supports or rotors could be made from common engineering materials such as aluminum, steel, die cast zinc, or 3D-printed or injection molded plastic, or more exotic materials such as injection-molded metal, carbon fiber, carbon fiber reinforced injection molded plastic, titanium, magnesium, PEEK, and so on. Supports such as support 102 could be shaped differently, or be part of another assembly such as the leg or arm of a robot, or the shell or housing of a prosthetic or rehabilitation device.

Embodiments other than those described above or shown in the drawings will become apparent to those skilled in the art with the benefit of this disclosure. Accordingly, the invention is not limited to the exemplary embodiments described or shown in the drawings; instead, the full scope of the invention is defined by the appended claims.

The invention claimed is:

1. A transmission system comprising:
a support;
a first pulley coupled to the support;
a piece of flexible material;
a rotor coupled to the support such that the rotor can rotate about an axis of rotation relative to the support, the rotor having a first surface for supporting the piece of flexible material at a diameter D about the axis of rotation and a second surface for supporting the piece of flexible material at a diameter d about the axis of rotation, the diameter D differing from the diameter d;
a carriage coupled to the support such that the carriage is constrained to slide parallel to the axis of rotation of the rotor; and
second and third pulleys coupled to the carriage,
wherein the piece of flexible material is coupled to the rotor, then wound around the first surface of the rotor, then wrapped around the second pulley, then wrapped around the first pulley, then wrapped around the third pulley, then wound around the second surface of the rotor, then coupled to the rotor,
wherein the piece of flexible material has a first straight portion between the first pulley and the second pulley defining a first axis, the piece of flexible material also having a second straight portion between the first pulley and third pulley defining a second axis, the first and second axes both being parallel to the axis of rotation,
wherein the first surface for supporting the piece of flexible material at a diameter D about the axis of rotation and the second surface for supporting the piece of flexible material at a diameter d about the axis of rotation are intertwined so as to form a double helix about the axis of rotation.

2. A transmission system comprising:
a support;
a first pulley coupled to the support;
a piece of flexible material;
a rotor coupled to the support such that the rotor can rotate about an axis of rotation relative to the support, the rotor having a first surface for supporting the piece of flexible material at a diameter D about the axis of rotation and a second surface for supporting the piece of flexible material at a diameter d about the axis of rotation, the diameter D differing from the diameter d;
a carriage coupled to the support such that the carriage is constrained to slide parallel to the axis of rotation of the rotor;
second and third pulleys coupled to the carriage;
a fourth pulley coupled to the support such that the carriage is positioned between the first pulley and the fourth pulley;
fifth and sixth pulleys coupled to the carriage; and
a second piece of flexible material coupled to the rotor, then wound around the first surface of the rotor, then wrapped around the fifth pulley, then wrapped around the fourth pulley, then wrapped around the sixth pulley, then wound around the second surface of the rotor, then coupled to the rotor, the second piece of flexible material having a third portion between the fourth pulley and the fifth pulley defining a third axis, the piece of flexible material also having a fourth portion between the fourth pulley and the sixth pulley defining a fourth axis, the third and fourth axes both being parallel to the axis of rotation,
wherein the piece of flexible material is coupled to the rotor, then wound around the first surface of the rotor, then wrapped around the second pulley, then wrapped around the first pulley, then wrapped around the third pulley, then wound around the second surface of the rotor, then coupled to the rotor, wherein the piece of flexible material has a first straight portion between the first pulley and the second pulley defining a first axis, the piece of flexible material also having a second straight portion between the first pulley and third pulley defining a second axis, the first and second axes both being parallel to the axis of rotation, wherein the piece of flexible material and the second piece of flexible material belong to a single piece of flexible material.

3. The transmission system of claim 2, wherein the single piece of flexible material is a cable, the piece of flexible material is a piece of the cable, and the second piece of flexible material is a second piece of the cable.

4. A transmission system comprising:
a support;
a first pulley coupled to the support;
a piece of flexible material;
a rotor coupled to the support such that the rotor can rotate about an axis of rotation relative to the support, the rotor having a first surface for supporting the piece of flexible material at a diameter D about the axis of rotation and a second surface for supporting the piece of flexible material at a diameter d about the axis of rotation, the diameter D differing from the diameter d, the first surface for supporting the piece of flexible material at diameter D about the axis of rotation intertwined with the second surface for supporting the piece of flexible material at diameter d about the axis of rotation so as to form a double helix;
a carriage coupled to the support such that the carriage is constrained to slide parallel to the axis of rotation relative to the support; and
second and third pulleys coupled to the carriage,
wherein the piece of flexible material is coupled to the rotor, then wound around the first surface of the rotor, then wrapped around the second pulley, then wrapped around the first pulley, then wrapped around the third pulley, then wound around the second surface of the rotor, then coupled to the rotor.

5. The transmission of claim 4, the rotor having a first helical groove about the axis of rotation and a second helical groove about the axis of rotation, the first helical groove having a first inside surface, the second helical groove having a second inside surface, the first surface being the first inside surface of the first helical groove and the second surface being the second inside surface of the second helical groove.

6. The transmission system of claim 4, wherein the rotor has a third surface for supporting the piece of flexible material at a diameter D about the axis of rotation and a fourth surface for supporting the piece of flexible material at a diameter d about the axis of rotation, the diameter D differing from the diameter d, further comprising:
a seventh pulley coupled to the support;
eighth and ninth pulleys coupled to the carriage;
a third piece of flexible material coupled to the rotor, then wound around the third surface of the rotor, then wrapped around the eighth pulley, then wrapped around the seventh pulley, then wrapped around the ninth pulley, then wound around the fourth surface of the rotor, then coupled to the rotor,
a tenth pulley coupled to the support such that the carriage is positioned between the seventh pulley and the tenth pulley;
eleventh and twelfth pulleys coupled to the carriage; and
a fourth piece of flexible material coupled to the rotor, then wound around the third surface of the rotor, then wrapped around the eleventh pulley, then wrapped around the tenth pulley, then wrapped around the twelfth pulley, then wound around the fourth surface of the rotor, then coupled to the rotor.

7. The transmission system of claim 4, wherein the flexible material is helically wound around the rotor with a lead l and the diameter D is within 5% of the value given by:

$$\frac{\sqrt{4l^2 + 4l\sqrt{\pi^2 d^2 + l^2}} + \pi^2 d^2}{\pi}.$$

* * * * *